(12) United States Patent
Hirata et al.

(10) Patent No.: US 12,436,375 B2
(45) Date of Patent: Oct. 7, 2025

(54) OBSERVATION SYSTEM AND OBSERVATION DEVICE

(71) Applicant: Evident Corporation, Nagano (JP)

(72) Inventors: Tadashi Hirata, Nagano (JP); Shintaro Takahashi, Nagano (JP)

(73) Assignee: Evident Corporation, Nagano (JP)

( * ) Notice: Subject to any disclaimer, the term of this patent is extended or adjusted under 35 U.S.C. 154(b) by 178 days.

(21) Appl. No.: 18/217,589

(22) Filed: Jul. 2, 2023

(65) Prior Publication Data

US 2024/0012230 A1    Jan. 11, 2024

(30) Foreign Application Priority Data

Jul. 7, 2022    (JP) ................................ 2022-109955

(51) Int. Cl.
| | |
|---|---|
| G02B 21/18 | (2006.01) |
| G02B 3/06 | (2006.01) |
| G02B 21/26 | (2006.01) |
| G02B 21/36 | (2006.01) |
| G02B 3/00 | (2006.01) |

(52) U.S. Cl.
CPC .............. *G02B 21/18* (2013.01); *G02B 3/06* (2013.01); *G02B 21/26* (2013.01); *G02B 21/362* (2013.01); *G02B 21/367* (2013.01); *G02B 2003/0093* (2013.01)

(58) Field of Classification Search
CPC ....... G02B 21/26; G02B 21/362; G02B 21/18
See application file for complete search history.

(56) References Cited

U.S. PATENT DOCUMENTS

2019/0333215 A1* 10/2019  Ariga .................... C12M 1/34
2021/0141203 A1*  5/2021  Shumate ............. G02B 21/361

FOREIGN PATENT DOCUMENTS

WO    2016/158782 A1    10/2016

\* cited by examiner

*Primary Examiner* — Thanh Luu
(74) *Attorney, Agent, or Firm* — Scully, Scott, Murphy & Presser, P.C.

(57) ABSTRACT

An observation system includes a mounting table on which a sample container is placed, a surface light source that is disposed in one of two regions divided by the mounting table and has a light emitting plane, an observation optical system disposed in the other thereof, a conveyance mechanism moving the observation optical system in a direction orthogonal to an optical axis of the observation optical system to change an observation position, and a controller controlling a light emission pattern defined by a light emitting region where light is emitted on the light emitting plane. The controller executes first light emission pattern control in which the light emission pattern is changed according to the observation position, or, alternatively, second light emission pattern control in which the light emission pattern is switched between a plurality of periodic light emission patterns having phases different from each other.

7 Claims, 47 Drawing Sheets

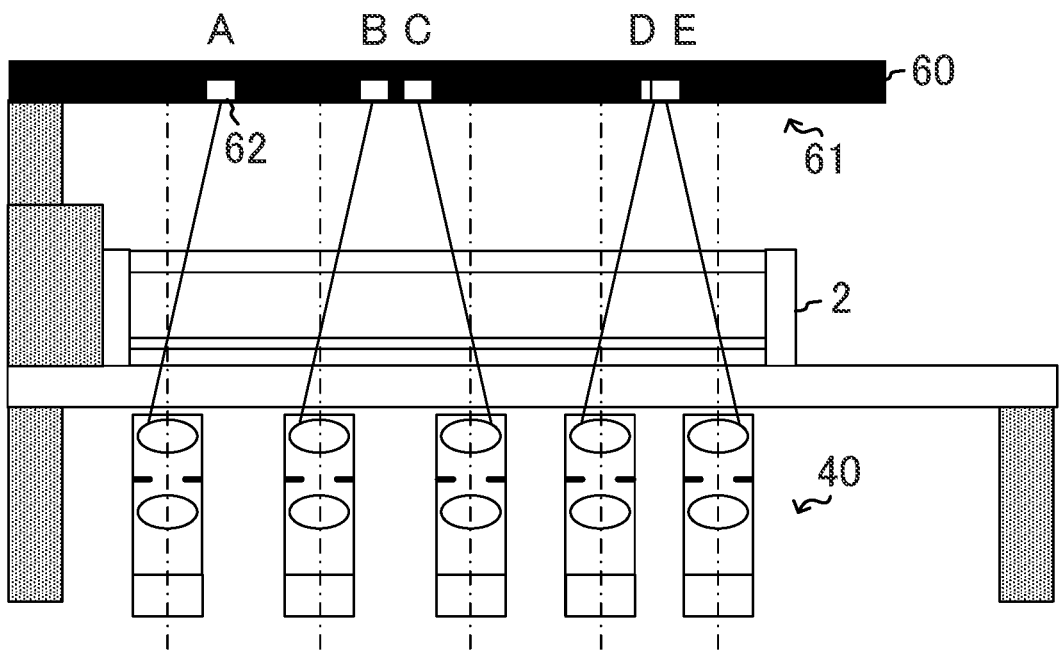
FIG. 5
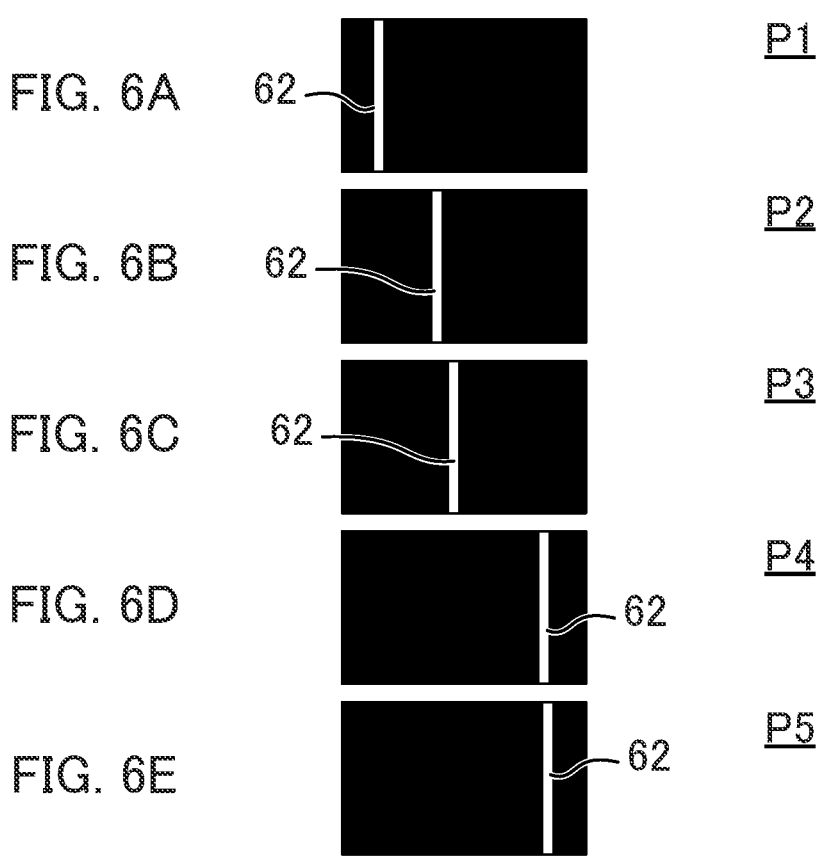
FIG. 6A
FIG. 6B
FIG. 6C
FIG. 6D
FIG. 6E

FIG. 7A
FIG. 7B
FIG. 7C
FIG. 7D
FIG. 7E
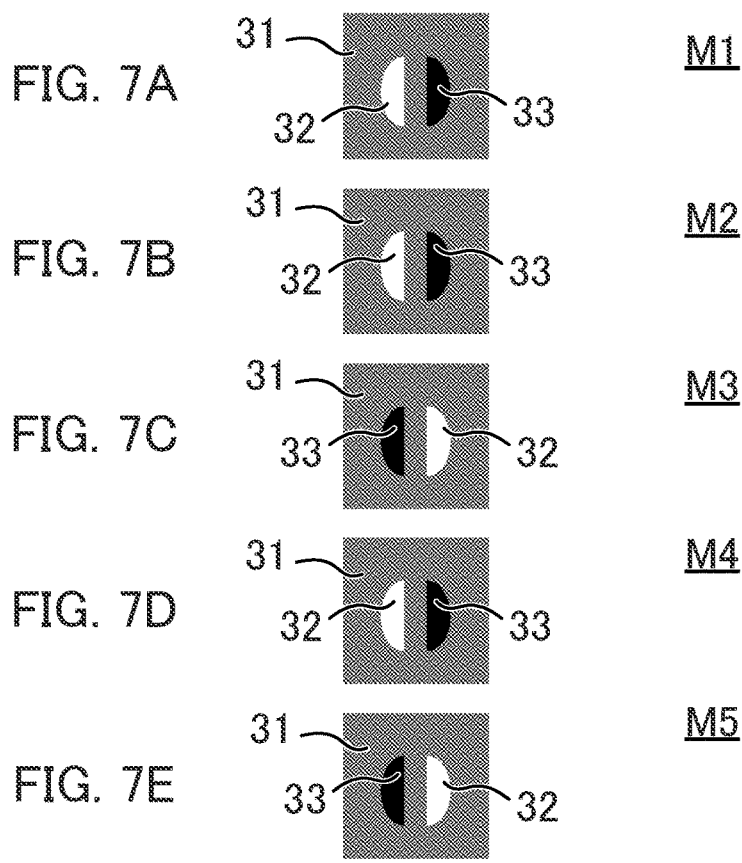
FIG. 8
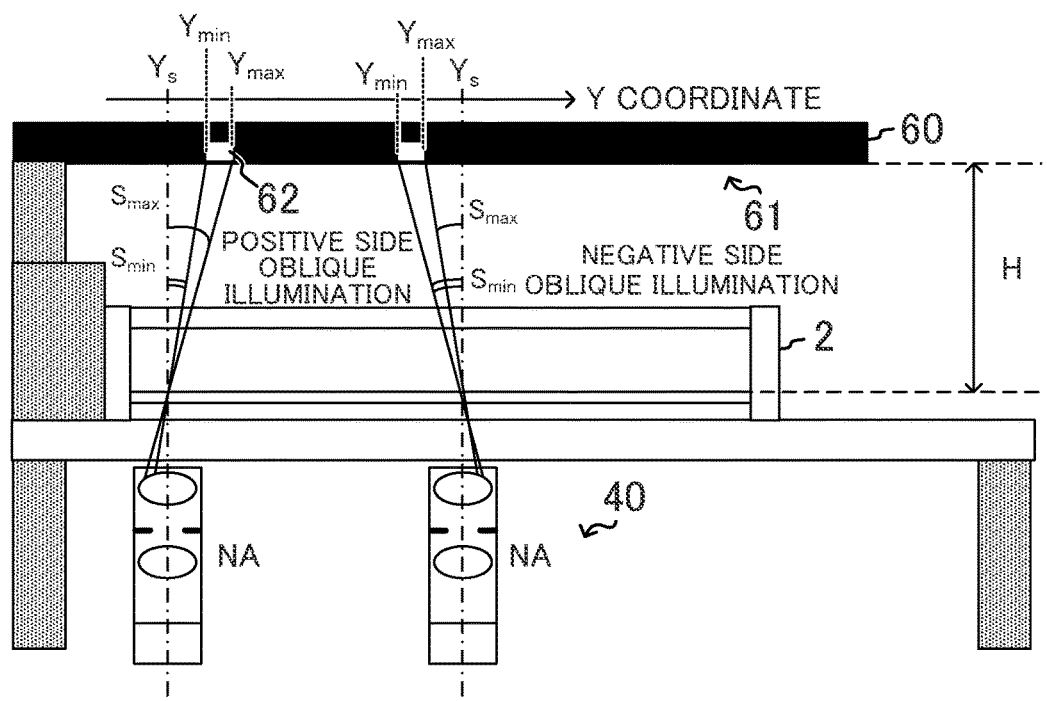

| OBLIQUE DIRECTION BRIGHT PART POSITION | $Y_{min}$ | $Y_{max}$ | ACTUAL FIELD OF VIEW CENTER | ACTUAL FIELD OF VIEW MINIMUM | ACTUAL FIELD OF VIEW MAXIMUM | $Y_s$ | $S_{min}$ | $S_{max}$ | (1) | (2) | (3) | (4) |
|---|---|---|---|---|---|---|---|---|---|---|---|---|
| POSITIVE SIDE 1 | 11 | 24 | 4 | 2.95 | 5.05 | 2.95 | 0.13 | 0.33 | TRUE | TRUE | | |
|  |  |  |  |  |  | 5.05 | 0.10 | 0.30 | TRUE | TRUE | | |
| POSITIVE SIDE 2 | 37 | 50 | 30 | 28.95 | 31.05 | 28.95 | 0.13 | 0.33 | TRUE | TRUE | | |
|  |  |  |  |  |  | 31.05 | 0.10 | 0.30 | TRUE | TRUE | | |
| POSITIVE SIDE 3 | 63 | 76 | 56 | 54.95 | 57.05 | 54.95 | 0.13 | 0.33 | TRUE | TRUE | | |
|  |  |  |  |  |  | 57.05 | 0.10 | 0.30 | TRUE | TRUE | | |
| NEGATIVE SIDE 4 | 62 | 75 | 82 | 80.95 | 83.05 | 80.95 | −0.30 | −0.10 | | | TRUE | TRUE |
|  |  |  |  |  |  | 83.05 | −0.33 | −0.13 | | | TRUE | TRUE |

| OBLIQUE DIRECTION BRIGHT PART POSITION | $Y_{min}$ | $Y_{max}$ | ACTUAL FIELD OF VIEW CENTER | ACTUAL FIELD OF VIEW MINIMUM | ACTUAL FIELD OF VIEW MAXIMUM | $Y_s$ | $S_{min}$ | $S_{max}$ | (1) | (2) | (3) | (4) |
|---|---|---|---|---|---|---|---|---|---|---|---|---|
| POSITIVE SIDE 1 | 11 | 24 | 4 | 2.95 | 5.05 | 2.95 | 0.13 | 0.33 | TRUE | TRUE | | |
| | | | | | | 5.05 | 0.10 | 0.30 | TRUE | TRUE | | |
| NEGATIVE SIDE 2 | 10 | 23 | 30 | 28.95 | 31.05 | 28.95 | −0.30 | −0.10 | | | TRUE | TRUE |
| | | | | | | 31.05 | −0.33 | −0.13 | | | TRUE | TRUE |
| NEGATIVE SIDE 3 | 36 | 49 | 56 | 54.95 | 57.05 | 54.95 | −0.30 | −0.10 | | | TRUE | TRUE |
| | | | | | | 57.05 | −0.33 | −0.13 | | | TRUE | TRUE |
| NEGATIVE SIDE 4 | 62 | 75 | 82 | 80.95 | 83.05 | 80.95 | −0.30 | −0.10 | | | TRUE | TRUE |
| | | | | | | 83.05 | −0.33 | −0.13 | | | TRUE | TRUE |

| OBLIQUE DIRECTION BRIGHT PART POSITION | Ymin | Ymax | ACTUAL FIELD OF VIEW CENTER | ACTUAL FIELD OF VIEW MINIMUM | ACTUAL FIELD OF VIEW MAXIMUM | $Y_s$ | $S_{min}$ | $S_{max}$ | (1) | (2) | (3) | (4) |
|---|---|---|---|---|---|---|---|---|---|---|---|---|
| POSITIVE SIDE 1 | 11 | 100 | 4 | 2.95 | 5.05 | 2.95 | 0.13 | 0.85 | TRUE | TRUE | | |
| | | | | | | 5.05 | 0.10 | 0.85 | TRUE | TRUE | | |
| POSITIVE SIDE 2 | 37 | 100 | 30 | 28.95 | 31.05 | 28.95 | 0.13 | 0.76 | TRUE | TRUE | | |
| | | | | | | 31.05 | 0.10 | 0.75 | TRUE | TRUE | | |
| POSITIVE SIDE 3 | 63 | 100 | 56 | 54.95 | 57.05 | 54.95 | 0.13 | 0.60 | TRUE | TRUE | | |
| | | | | | | 57.05 | 0.10 | 0.58 | TRUE | TRUE | | |
| NEGATIVE SIDE 4 | 0 | 75 | 82 | 80.95 | 83.05 | 80.95 | −0.80 | −0.10 | | | TRUE | TRUE |
| | | | | | | 83.05 | −0.81 | −0.13 | | | TRUE | TRUE |

FIG. 16

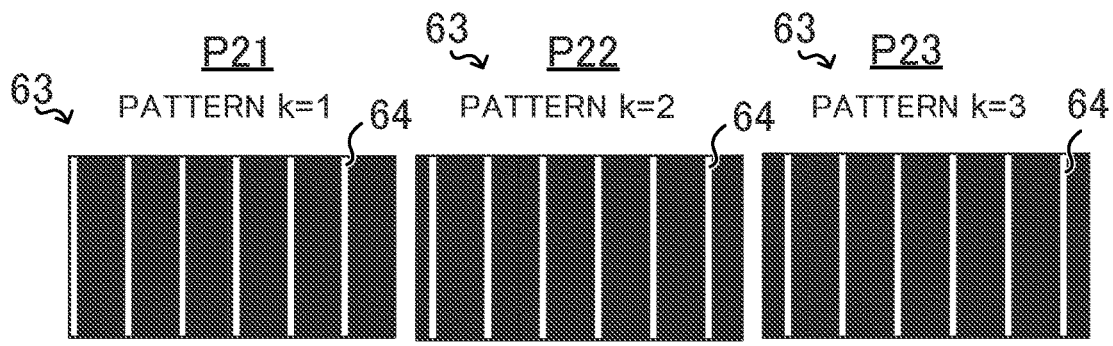
FIG. 26A  FIG. 26B  FIG. 26C
FIG. 26F  FIG. 26E  FIG. 26D
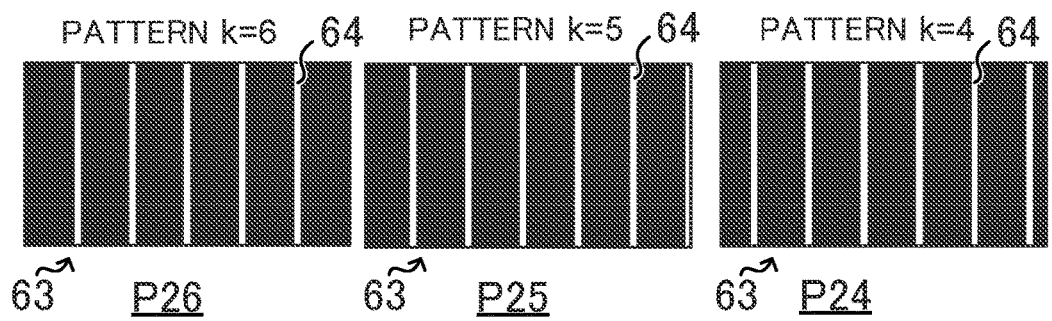
FIG. 27

PROJECTION PATTERNS (UNIT: mm)

T5

| M | 0 | | 1 | | 2 | | 3 | | 4 | | 5 | |
|---|---|---|---|---|---|---|---|---|---|---|---|---|
| k | $Y_{0,k,min}$ | $Y_{0,k,max}$ | $Y_{1,k,min}$ | $Y_{1,k,max}$ | $Y_{2,k,min}$ | $Y_{2,k,max}$ | $Y_{3,k,min}$ | $Y_{3,k,max}$ | $Y_{4,k,min}$ | $Y_{4,k,max}$ | $Y_{4,k,min}$ | $Y_{4,k,max}$ |
| 1 | −39.0 | −32.5 | 0.0 | 6.5 | 39.0 | 45.5 | 78.0 | 84.5 | 117.0 | 123.5 | 156.0 | 162.5 |
| 2 | −32.5 | −26.0 | 6.5 | 13.0 | 45.5 | 52.0 | 84.5 | 91.0 | 123.5 | 130.0 | 162.5 | 169.0 |
| 3 | −26.0 | −19.5 | 13.0 | 19.5 | 52.0 | 58.5 | 91.0 | 97.5 | 130.0 | 136.5 | 169.0 | 175.5 |
| 4 | −19.5 | −13.0 | 19.5 | 26.0 | 58.5 | 65.0 | 97.5 | 104.0 | 136.5 | 143.0 | 175.5 | 182.0 |
| 5 | −13.0 | −6.5 | 26.0 | 32.5 | 65.0 | 71.5 | 104.0 | 110.5 | 143.0 | 149.5 | 182.0 | 188.5 |
| 6 | −6.5 | 0.0 | 32.5 | 39.0 | 71.5 | 78.0 | 110.5 | 117.0 | 149.5 | 156.0 | 188.5 | (190) |

FIG. 28

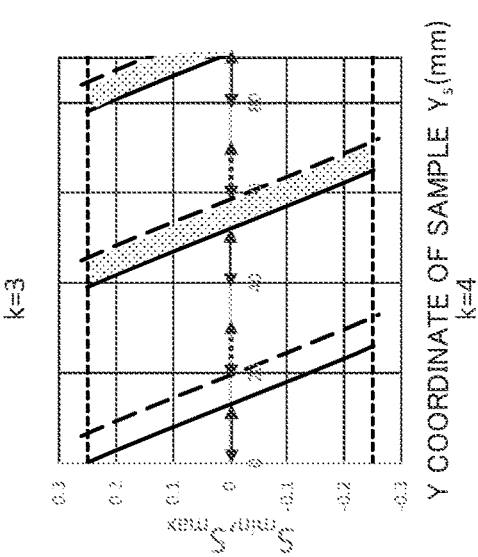
FIG. 29A    FIG. 29B    FIG. 29C
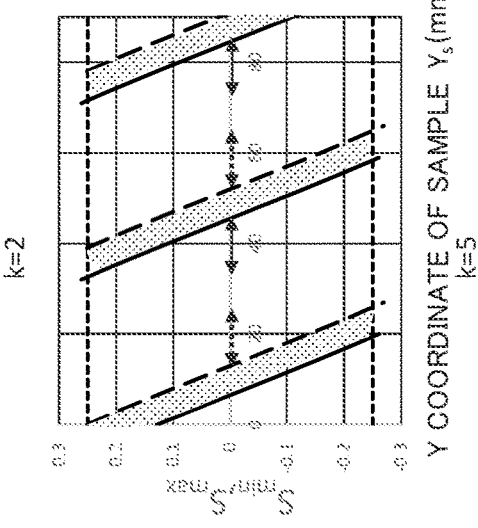
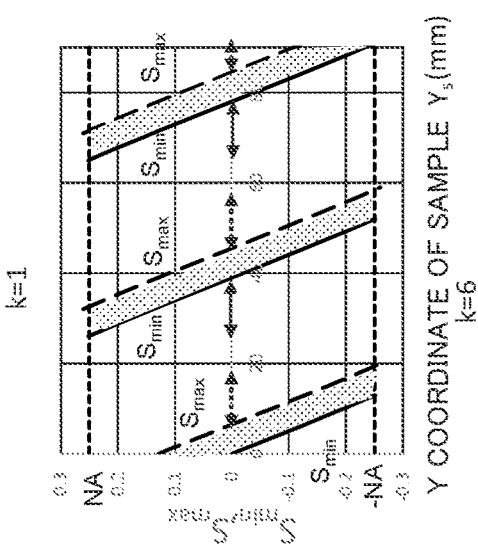
FIG. 29D    FIG. 29E    FIG. 29F <u>T6</u>

| $\dfrac{2NA}{\sqrt{1-NA^2}} < \dfrac{P-d}{H}$ | $0 < \dfrac{|\delta|}{H} < \dfrac{NA}{\sqrt{1-NA^2}}$ | $0 < \dfrac{d}{H} < \dfrac{NA}{\sqrt{1-NA^2}}$ | $N > \dfrac{P\sqrt{1-NA^2}}{H \cdot NA}$ |
|---|---|---|---|
| 0.516<0.65 | 0<0.130<0.258 | 0<0.130<0.258 | 6>3.02 |
| TRUE | TRUE | TRUE | TRUE |

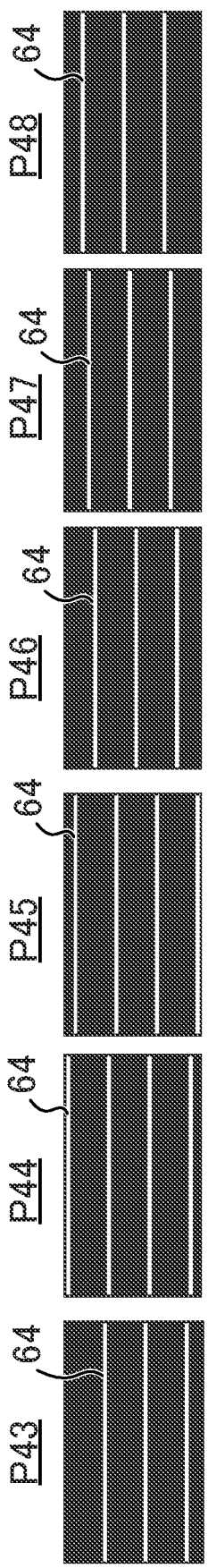
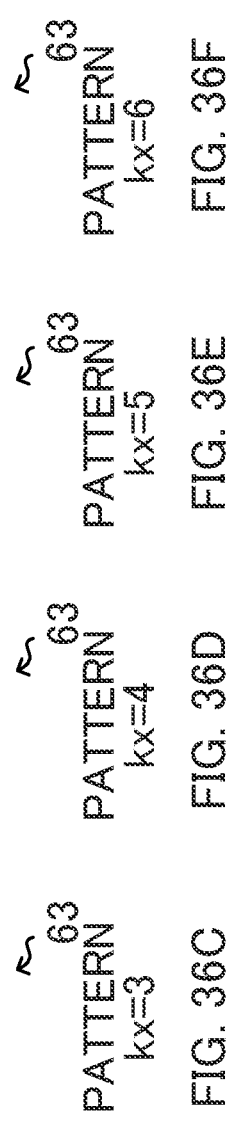
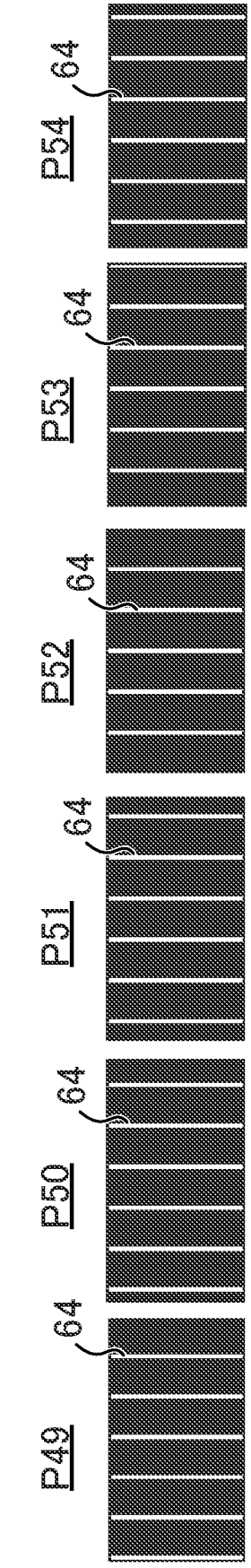
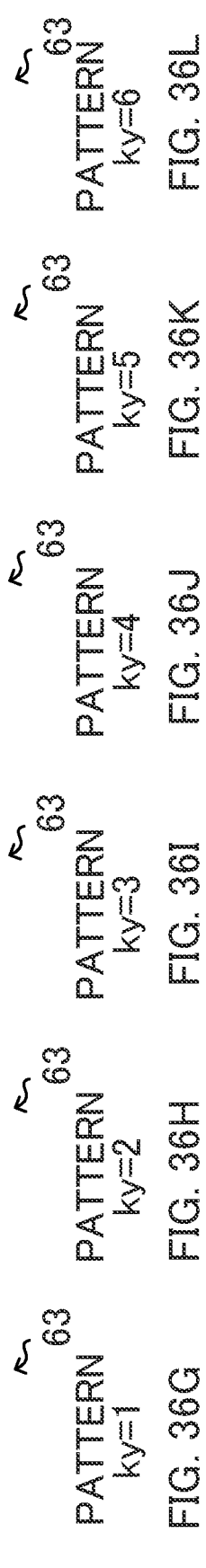
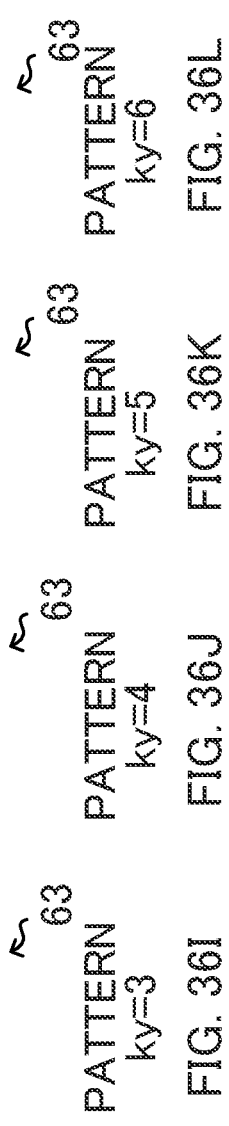

T7

| SAMPLE SIDE | ACTUAL FIELD OF VIEW (mm) | | | IMAGE SIZE (PIXEL) | |
|---|---|---|---|---|---|
| NA | X DIRECTION | Y DIRECTION | DIAGONAL | X DIRECTION | Y DIRECTION |
| 0.25 | 2.8 | 2.1 | 3.5 | 2048 | 1536 |
| | Px (mm) | dx (mm) | $\delta$ x(mm) | Nx | $\delta$ x0 (mm) |
| | 39 | 6.5 | 6.5 | 6 | −26 |
| H (mm) | Py (mm) | dy (mm) | $\delta$ y(mm) | Ny | $\delta$ y0 (mm) |
| 50 | 39 | 6.5 | 6.5 | 6 | −39 |

PROJECTION PATTERNS  X DIRECTION  (UNIT: mm)

| kx \ L | 0 | | 1 | | 2 | | 3 | |
|---|---|---|---|---|---|---|---|---|
| | $X_{0,kx,min}$ | $X_{0,kx,max}$ | $X_{1,kx,min}$ | $X_{1,kx,max}$ | $X_{2,kx,min}$ | $X_{2,kx,max}$ | $X_{3,kx,min}$ | $X_{3,kx,max}$ |
| 1 | −26.0 | −19.5 | 13.0 | 19.5 | 52.0 | 58.5 | 91.0 | 97.5 |
| 2 | −19.5 | −13.0 | 19.5 | 26.0 | 58.5 | 65.0 | 97.5 | 104.0 |
| 3 | −13.0 | −6.5 | 26.0 | 32.5 | 65.0 | 71.5 | 104.0 | 110.5 |
| 4 | −6.5 | 0.0 | 32.5 | 39.0 | 71.5 | 78.0 | 110.5 | 117.0 |
| 5 | 0.0 | 6.5 | 39.0 | 45.5 | 78.0 | 84.5 | 117.0 | (110.0) |
| 6 | 6.5 | 13.0 | 45.5 | 52.0 | 84.5 | 91.0 | | |

FIG. 38

PROJECTION PATTERNS Y DIRECTION (UNIT: mm)

T9

| ky | 0 | | 1 | | 2 | | 3 | | 4 | | 5 | |
|---|---|---|---|---|---|---|---|---|---|---|---|---|
| | $Y_{0,ky,min}$ | $Y_{0,ky,max}$ | $Y_{1,ky,min}$ | $Y_{1,ky,max}$ | $Y_{2,ky,min}$ | $Y_{2,ky,max}$ | $Y_{3,ky,min}$ | $Y_{3,ky,max}$ | $Y_{4,ky,min}$ | $Y_{4,ky,max}$ | $Y_{4,ky,min}$ | $Y_{4,ky,max}$ |
| 1 | −39.0 | −32.5 | 0.0 | 6.5 | 39.0 | 45.5 | 78.0 | 84.5 | 117.0 | 123.5 | 156.0 | 162.5 |
| 2 | −32.5 | −26.0 | 6.5 | 13.0 | 45.5 | 52.0 | 84.5 | 91.0 | 123.5 | 130.0 | 162.5 | 169.0 |
| 3 | −26.0 | −19.5 | 13.0 | 19.5 | 52.0 | 58.5 | 91.0 | 97.5 | 130.0 | 136.5 | 169.0 | 175.5 |
| 4 | −19.5 | −13.0 | 19.5 | 26.0 | 58.5 | 65.0 | 97.5 | 104.0 | 136.5 | 143.0 | 175.5 | 182.0 |
| 5 | −13.0 | −6.5 | 26.0 | 32.5 | 65.0 | 71.5 | 104.0 | 110.5 | 143.0 | 149.5 | 182.0 | 188.5 |
| 6 | −6.5 | 0.0 | 32.5 | 39.0 | 71.5 | 78.0 | 110.5 | 117.0 | 149.5 | 156.0 | 188.5 | (190) |

| $\frac{2NA}{\sqrt{1-NA^2}} < \frac{P_x - d_x}{H}$ | $0 < \frac{|\delta_x|}{H} < \frac{NA}{\sqrt{1-NA^2}}$ | $0 < \frac{d_x}{H} < \frac{NA}{\sqrt{1-NA^2}}$ | $N_x > \frac{P_x\sqrt{1-NA^2}}{H \cdot NA}$ |
|---|---|---|---|
| 0.516<0.65 | 0<0.130<0.258 | 0<0.130<0.258 | 6>3.02 |
| TRUE | TRUE | TRUE | TRUE |

| $\frac{2NA}{\sqrt{1-NA^2}} < \frac{P_y - d_y}{H}$ | $0 < \frac{|\delta_y|}{H} < \frac{NA}{\sqrt{1-NA^2}}$ | $0 < \frac{d_y}{H} < \frac{NA}{\sqrt{1-NA^2}}$ | $N_y > \frac{P_y\sqrt{1-NA^2}}{H \cdot NA}$ |
|---|---|---|---|
| 0.516<0.65 | 0<0.130<0.258 | 0<0.130<0.258 | 6>3.02 |
| TRUE | TRUE | TRUE | TRUE |

FIG. 42

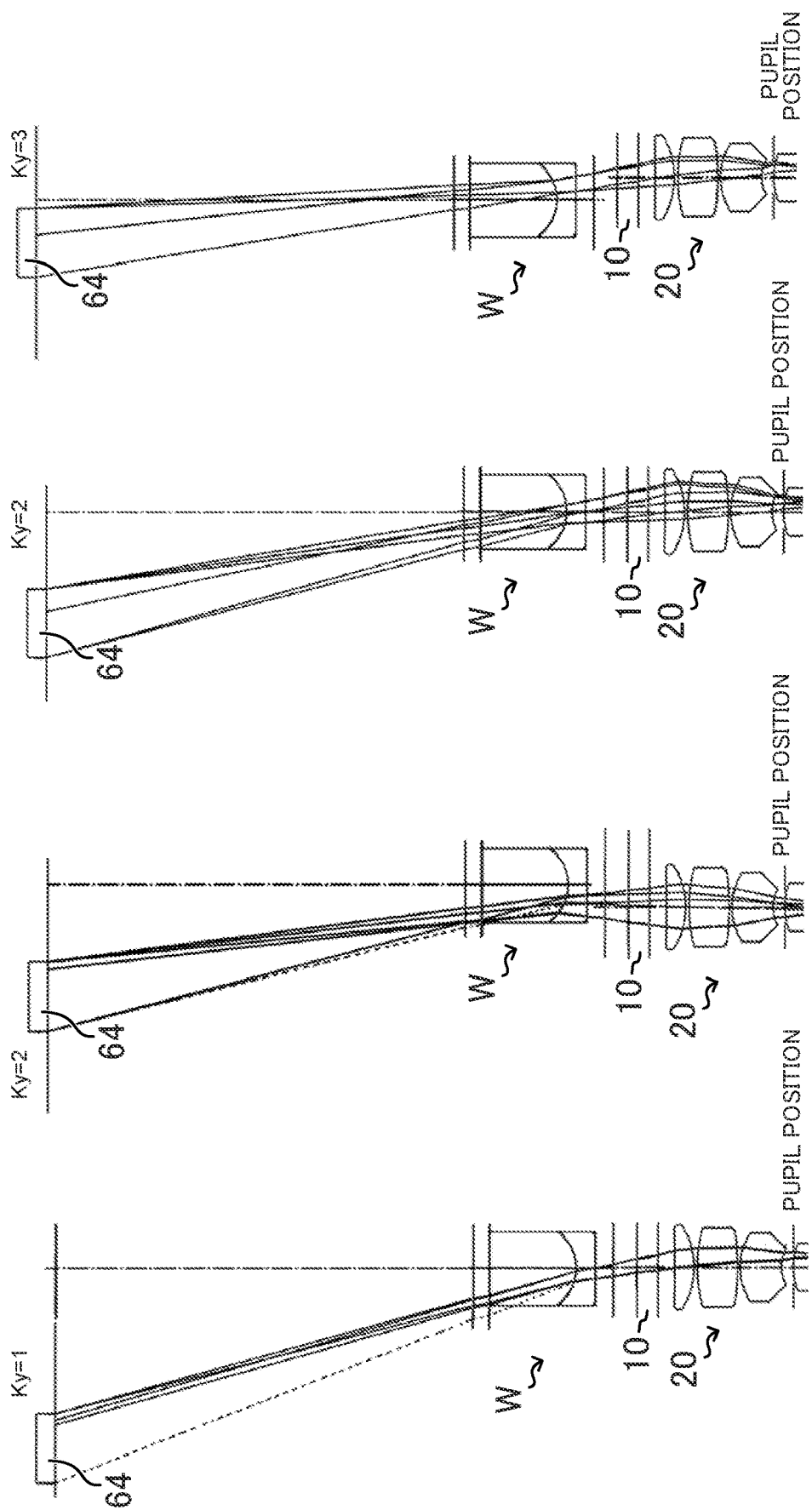

T12

| $0 < \|Y_1\| < \frac{D \cdot NA}{\sqrt{1-NA^2}}$ | $\frac{D \cdot NA}{\sqrt{1-NA^2}} < \|Y_2\| < P - \frac{D \cdot NA}{\sqrt{1-NA^2}}$ | $0.5 < \frac{D}{F_l} \leq 1$ |
|---|---|---|
| 0<0.1<0.155 | 0.155<0.2<0.445 | 0.5<0.591<1 |
| TRUE | TRUE | TRUE |

T13

| PATTERN | $Y_{0,p}$ | $\frac{D \cdot NA}{\sqrt{1-NA^2}} - \frac{d}{2} < Y_{0+}$ | $\frac{d}{2} < Y_{0+} < P - \frac{D \cdot NA}{\sqrt{1-NA^2}} - \frac{d}{2}$ | $\frac{-D \cdot NA}{\sqrt{1-NA^2}} - \frac{d}{2} < Y_{0-} < \frac{-D \cdot NA}{\sqrt{1-NA^2}} + \frac{d}{2}$ | $-P + \frac{D \cdot NA}{\sqrt{1-NA^2}} + \frac{d}{2} < Y_{0-} < -\frac{d}{2}$ | $< P - \frac{D \cdot NA}{\sqrt{1-NA^2}}$ | $0.5 < \frac{D}{F_t} \leq 1$ |
|---|---|---|---|---|---|---|---|
| UPPER LIMIT | | 1.049 | 0.5 | −2.049 | −2.751 | 0 | 0.5 |
| LOWER LIMIT | | 2.049 | 2.751 | −1.049 | −0.5 | 3.251 | 1 |
| 1 | −1.6 | FALSE | FALSE | TRUE | TRUE | TRUE | 0.592 TRUE |
| 2 | −0.8 | FALSE | FALSE | FALSE | TRUE | | |
| 3 | 0 | FALSE | TRUE | FALSE | FALSE | | |
| 4 | 0.8 | TRUE | TRUE | FALSE | FALSE | | |
| 5 | 1.6 | FALSE | TRUE | FALSE | FALSE | | |
| 6 | 2.4 | | | | | | |

FIG. 64

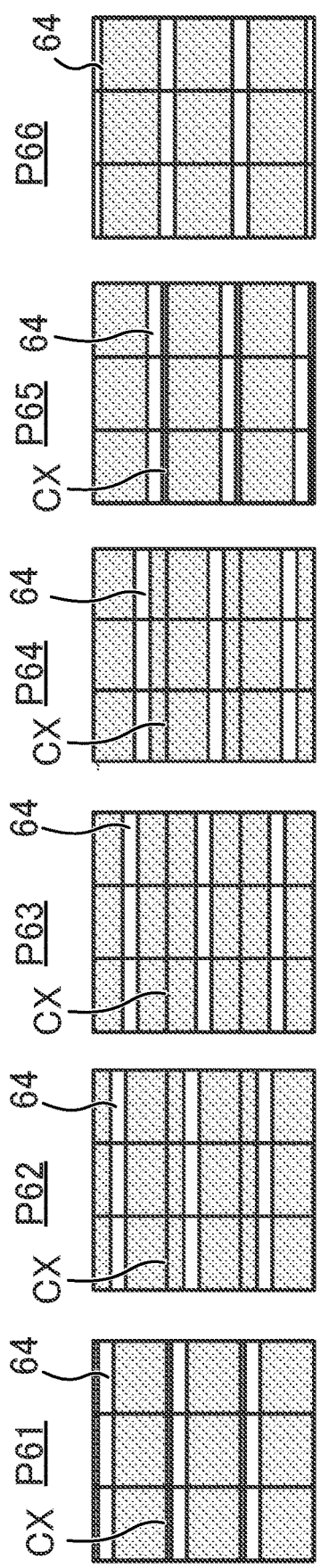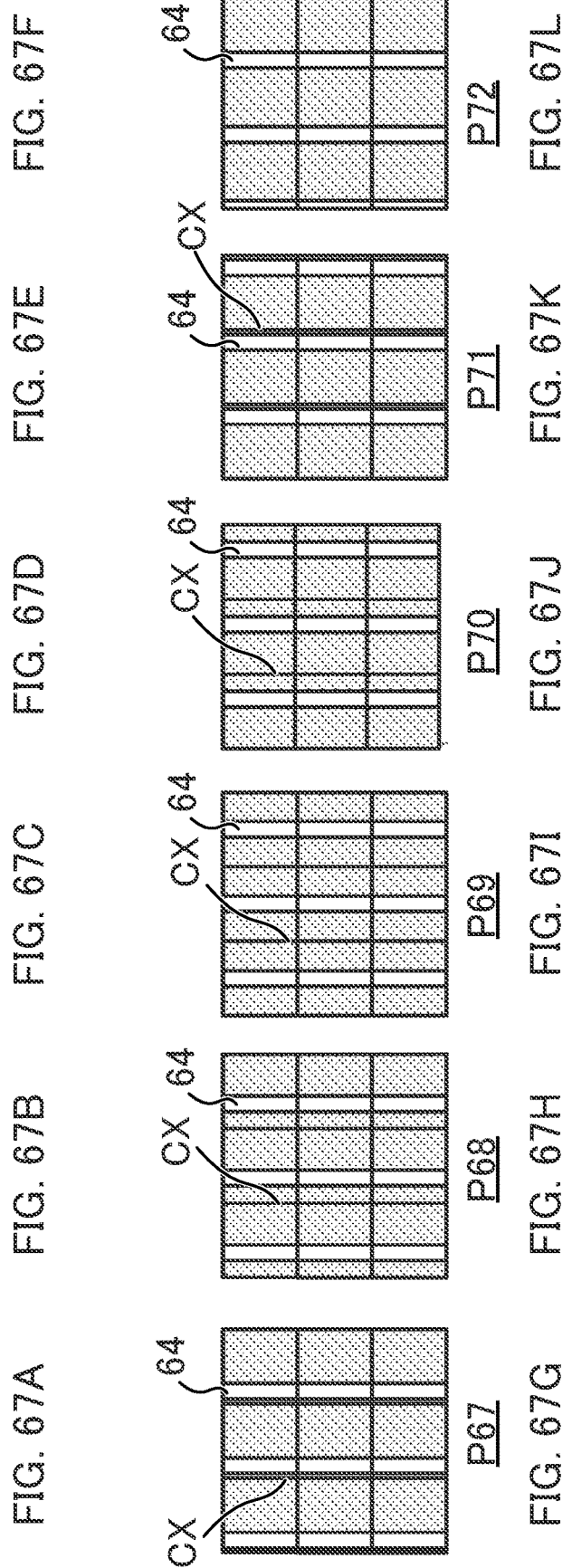

T14

| PATTERN | $X_{0P}$ | $\frac{D \cdot NA}{\sqrt{1-NA^2}} - \frac{d}{2} < X_{0+} < \frac{D \cdot NA}{\sqrt{1-NA^2}} + \frac{d}{2}$ | $\frac{d}{2} < X_{0+} < P - \frac{D \cdot NA}{\sqrt{1-NA^2}} - \frac{d}{2}$ | $\frac{-D \cdot NA}{\sqrt{1-NA^2}} - \frac{d}{2} < X_{0-} < \frac{-D \cdot NA}{\sqrt{1-NA^2}} + \frac{d}{2}$ | $-P + \frac{D \cdot NA}{\sqrt{1-NA^2}} + \frac{d}{2} < X_{0-} < -\frac{d}{2}$ | $0 < d < P - \frac{D \cdot NA}{\sqrt{1-NA^2}}$ | $0.5 < \frac{D}{F_i} \leq 1$ |
|---|---|---|---|---|---|---|---|
| UPPER LIMIT | | 1.049 | 0.5 | −2.049 | −2.751 | 0 | 0.5 |
| LOWER LIMIT | | 2.049 | 2.751 | −1.049 | −0.5 | 3.251 | 1 |
| 1 | −1.6 | FALSE | FALSE | TRUE | TRUE | 1 / TRUE | 0.592 / TRUE |
| 2 | −0.8 | FALSE | FALSE | FALSE | TRUE | | |
| 3 | 0 | FALSE | FALSE | FALSE | FALSE | | |
| 4 | 0.8 | FALSE | TRUE | FALSE | FALSE | | |
| 5 | 1.6 | TRUE | TRUE | FALSE | FALSE | | |
| 6 | 2.4 | FALSE | TRUE | FALSE | FALSE | | |

FIG. 68

| PATTERN | $y_{0,p}$ | $\frac{D \cdot NA}{\sqrt{1-NA^2}} - \frac{d}{2} < y_{0+} < \frac{D \cdot NA}{\sqrt{1-NA^2}} + \frac{d}{2}$ | $\frac{d}{2} < y_{0+} < P - \frac{D \cdot NA}{\sqrt{1-NA^2}} - \frac{d}{2}$ | $-\frac{D \cdot NA}{\sqrt{1-NA^2}} - \frac{d}{2} < y_{0-} < -\frac{D \cdot NA}{\sqrt{1-NA^2}} + \frac{d}{2}$ | $-P + \frac{B \cdot NA}{\sqrt{1-NA^2}} + \frac{d}{2} < y_{0-} < -\frac{d}{2}$ | $0 < d < P - \frac{D \cdot NA}{\sqrt{1-NA^2}}$ | $0.5 < \frac{D}{F_l} \leq 1$ |
|---|---|---|---|---|---|---|---|
| UPPER LIMIT |  | 1.049 | 0.5 | −2.049 | −2.751 | 0 | 0.5 |
| LOWER LIMIT |  | 2.049 | 2.751 | −1.049 | −0.5 | 3.251 | 1 |
| 1 | −1.6 | FALSE | FALSE | TRUE | TRUE | 1 | 0.592 |
| 2 | −0.8 | FALSE | FALSE | FALSE | TRUE | TRUE | TRUE |
| 3 | 0 | FALSE | FALSE | FALSE | FALSE |  |  |
| 4 | 0.8 | FALSE | TRUE | FALSE | FALSE |  |  |
| 5 | 1.6 | TRUE | TRUE | FALSE | FALSE |  |  |
| 6 | 2.4 | FALSE | TRUE | FALSE | FALSE |  |  |

OBSERVATION SYSTEM AND OBSERVATION DEVICE

CROSS REFERENCE TO RELATED APPLICATIONS

This application is based upon and claims the benefit of priority from prior Japanese Patent Applications No. 2022-109955, filed Jul. 7, 2022, the entire contents of which are incorporated herein by this reference.

FIELD OF THE INVENTION

Background of the Invention

The disclosure herein relates to an observation system and an observation device.

Description of the Related Art

For example, an observation device for observing cells contained in a culture container as described in WO 2016/158782 A is known. With the observation device, it is possible to photograph and observe the cells in the container only by placing the container on a stage of the observation device.

SUMMARY OF THE INVENTION

An observation system according to an aspect of the present invention includes a mounting table on which a sample container is placed, a surface light source that is disposed in one of two regions divided by the mounting table and has a light emitting plane, an observation optical system disposed in the other of the two regions, a conveyance mechanism that is configured to move the observation optical system in a direction orthogonal to an optical axis of the observation optical system to change an observation position at which a bottom surface of a housing portion of the sample container and the optical axis intersect, and a controller that is configured to control a light emission pattern defined by a light emitting region where light is emitted on the light emitting plane. The controller executes first light emission pattern control in which the light emission pattern is changed according to the observation position, or, alternatively, second light emission pattern control in which the light emission pattern is switched between a plurality of periodic light emission patterns having phases different from each other.

An observation device according to an aspect of the present invention includes a mounting table on which a sample container is placed, a light emitting unit that is disposed in one of two regions divided by the mounting table and has a light emitting region including a plurality of fringe regions that is aligned in a first direction at regular intervals on an emission surface, an observation optical system disposed in the other of the two regions, and a conveyance mechanism that is configured to move, in the other of the two regions, the observation optical system in a direction orthogonal to an optical axis of the observation optical system to change an observation position at which a bottom surface of a housing portion of the sample container and the optical axis intersect. The light emitting unit includes a surface light source having a light emitting plane, and a lenticular lens that is disposed between the mounting table and the surface light source and is provided with a plurality of cylindrical lens elements aligned in the first direction at same intervals as the plurality of fringe regions. The observation device satisfies the following conditional expressions.

$$0 < |Y_1| < \frac{D \cdot NA}{\sqrt{1-NA^2}} \quad (38)$$

$$\frac{D \cdot NA}{\sqrt{1-NA^2}} < |Y_2| < P - \frac{D \cdot NA}{\sqrt{1-NA^2}} \quad (39)$$

$$0.5 < \frac{D}{F_l} < 1 \quad (40)$$

$Y_1$ represents a shortest distance in the first direction between a curved surface central axis of the cylindrical lens element and the fringe region closest to the cylindrical lens element. $Y_2$ represents a maximum distance in the first direction between the curved surface central axis of the cylindrical lens element and the fringe region closest to the cylindrical lens element. NA represents a numerical aperture on an object side of the observation optical system. P represents a pitch of the plurality of fringe regions. D represents an air-converted length of a distance between the emission surface and the lenticular lens. $F_l$ represents a focal length of the lenticular lens.

BRIEF DESCRIPTION OF THE DRAWINGS

The present invention will be more apparent from the following detailed description when the accompanying drawings are referenced.

FIG. 5 is an explanatory view for movement of a light emitting region according to an observation position;

FIGS. 6A to 6E are explanatory views for switching between light emission patterns according to an observation position;

FIGS. 7A to 7E are diagrams illustrating images acquired for each observation position;

FIG. 8 is an explanatory view for parameters;

FIG. 11 is a table illustrating a parameter value of a system in each light emission pattern illustrated in FIG. 10 and applicability of a predetermined condition;

FIG. 13 is a table illustrating a parameter value of a system in each light emission pattern illustrated in FIG. 12 and applicability of a predetermined condition;

FIG. 16 is a table illustrating a parameter value of a system in each light emission pattern illustrated in FIG. 14 and applicability of a predetermined condition;

FIGS. 26A to 26F are diagrams illustrating specific examples of a plurality of periodic light emission patterns;

FIG. 27 is a table illustrating parameter values of a system;

FIG. 28 is a table illustrating details of the plurality of periodic light emission patterns illustrated in FIGS. 26A to 26F;

FIGS. 29A to 29F are graphs for explaining an illumination state on a specimen surface in each of the plurality of periodic light emission patterns illustrated in FIGS. 26A to 26F;

FIGS. 31A to 31J are explanatory views for switching between a plurality of periodic light emission patterns according to a third embodiment;

FIGS. 36A to 36L are diagrams illustrating specific examples of a plurality of periodic light emission patterns;

FIG. 37 is a table illustrating parameter values of a system;

FIG. 38 is a table illustrating details of a plurality of first periodic light emission patterns among the plurality of periodic light emission patterns illustrated in FIGS. 36A to 36L;

FIG. 39 is a table illustrating details of a plurality of second periodic light emission patterns among the plurality of periodic light emission patterns illustrated in FIGS. 36A to 36L;

FIG. 41 is a table illustrating applicability of a predetermined condition regarding a first periodic light emission pattern of a system;

FIG. 42 is a table illustrating applicability of a predetermined condition regarding a second periodic light emission pattern of a system;

FIGS. 45A to 45D are light ray diagrams of light incident on a well from a fringe light emitting region in a second periodic light emission pattern;

FIG. 64 is a table illustrating applicability of a predetermined condition of a system in a periodic light emission pattern;

FIGS. 67A to 67L are diagrams illustrating specific examples of a plurality of periodic light emission patterns;

FIG. 68 is a table illustrating applicability of a predetermined condition of a system in a first periodic light emission pattern;

FIG. 69 is a table illustrating applicability of a predetermined condition of a system in a second periodic light emission pattern.

DETAILED DESCRIPTION OF THE PREFERRED EMBODIMENTS

In order to observe a cell as a phase object with high contrast, it is desirable to employ oblique illumination. However, in general, the oblique illumination is achieved only in a relatively narrow range with respect to the size of the entire container. For this reason, in a case where an observation optical system is shifted in order to observe various regions in the container, the observation position is easily out of a region where the oblique illumination is achieved.

To address this, it is conceivable to shift an illumination optical system together with the shift of the observation optical system and to move the region itself where the oblique illumination is achieved. However, this countermeasure arises other problems. For example, in a case where the oblique illumination is realized by transmitted illumination, a mechanical structure for linking the shift of the observation optical system and the illumination optical system that are placed on the opposite sides with the container interposed therebetween increases in complexity, resulting in the increase in size of the observation device.

Embodiments of the present invention are described below.

First Embodiment

Figure 1:
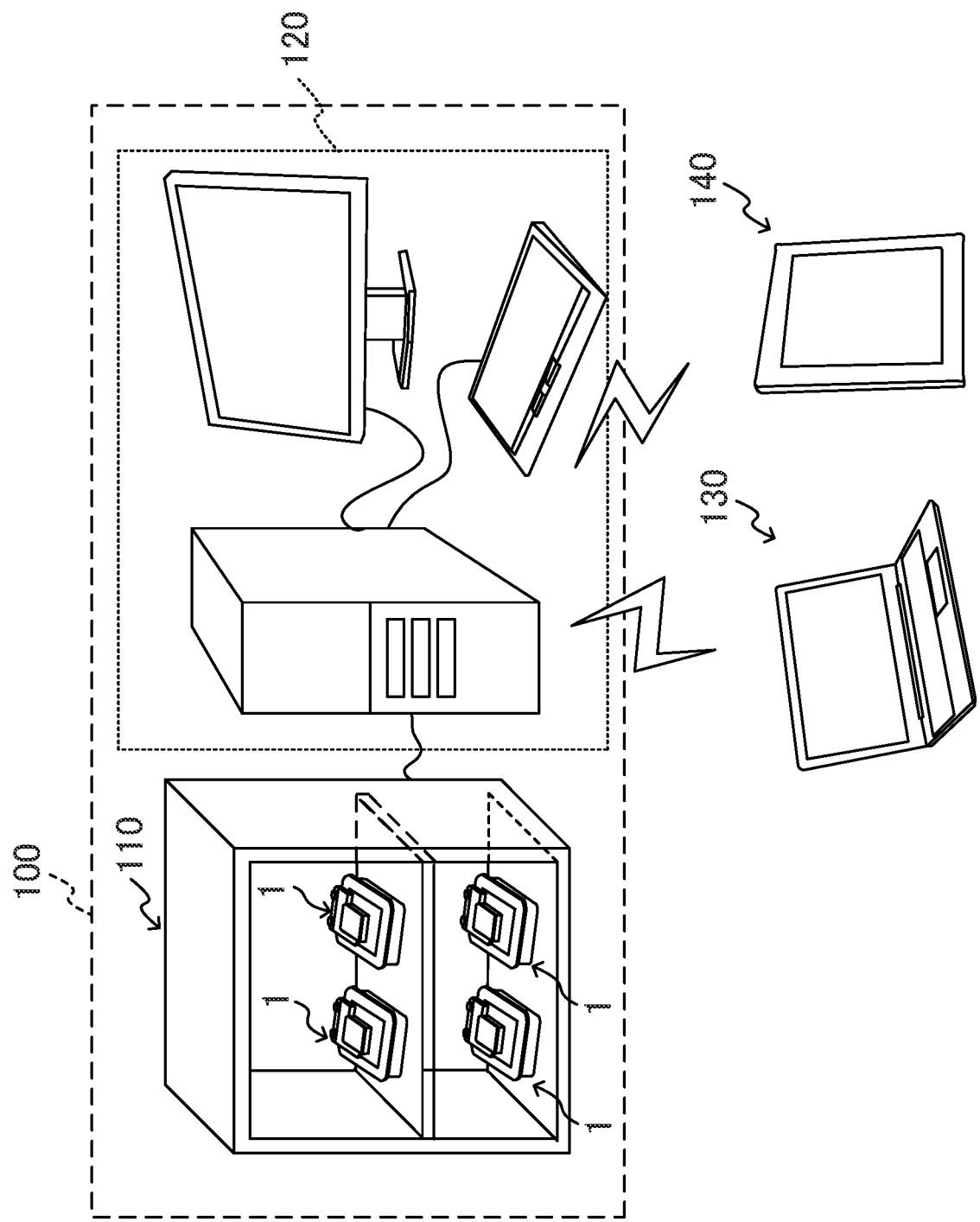
FIG. 1 is a diagram illustrating the configuration of a system according to a first embodiment.
Figure 2:
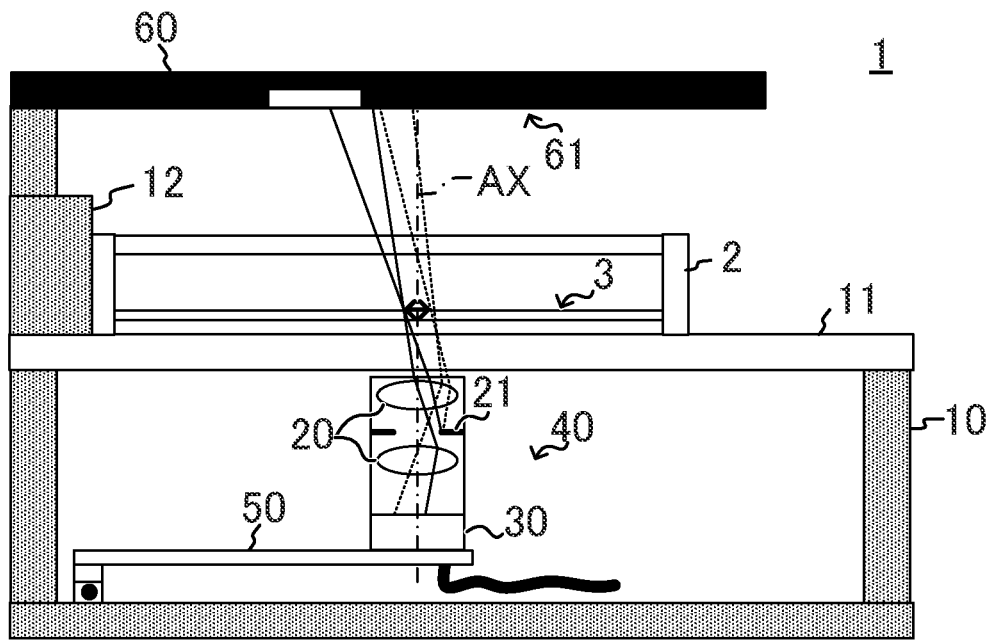
FIG. 2 is a diagram illustrating the configuration of an observation device according to the first embodiment.
Figure 3:
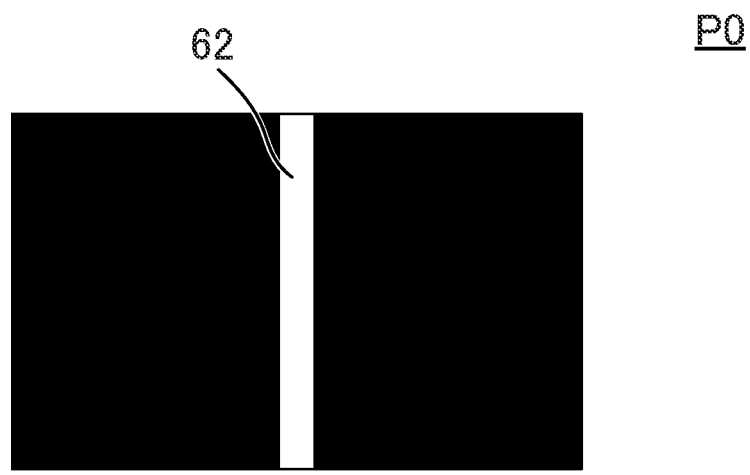
FIG. 3 is a diagram illustrating a light emission pattern.
Figure 4:
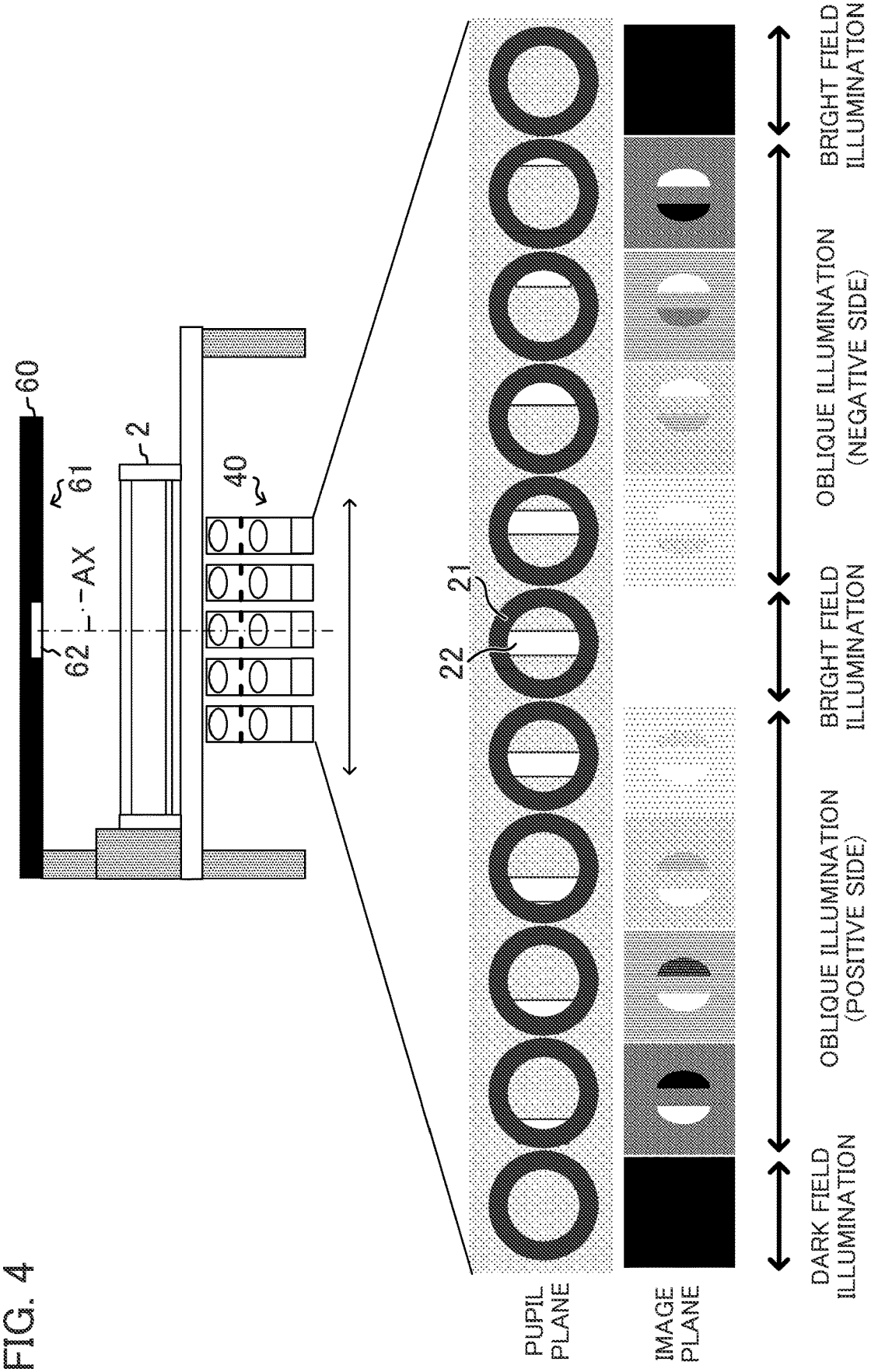
FIG. 4 is an explanatory view for an illumination state of a pupil plane and an image that change according to an observation position.

FIG. 1 is a diagram illustrating the configuration of a system 100 according to the present embodiment. FIG. 2 is a diagram illustrating the configuration of an observation device 1 according to the present embodiment. FIG. 3 is a diagram illustrating a light emission pattern. FIG. 4 is an explanatory view for an illumination state of a pupil plane and an image that change according to an observation position. FIG. 5 is an explanatory view for movement of a light emitting region according to an observation position. FIGS. 6A to 6E are explanatory views for switching between light emission patterns according to an observation position. FIGS. 7A to 7E are diagrams illustrating images acquired for each observation position. The system 100 will be described below with reference to FIGS. 1 to 7E.

The system 100 illustrated in FIG. 1 is an observation system for observing a sample contained in a container 2 while being cultured. The sample to be observed is a transparent phase object and is, for example, any cultured cell. The container 2 may be any container (hereinafter, also referred to as a sample container) that contains a sample therein. The container 2 is a petri dish, for example, but may be another culture container such as a flask or a multi-well plate.

The system 100 includes one or more observation devices 1 that acquire an image of the sample cultured in the container 2 and a control device 120 that controls the observation device 1. Each observation device 1 and the control device 120 are required to exchange data mutually. Accordingly, each observation device 1 and the control device 120 may be communicably connected by wire as illustrated in FIG. 1 or may be communicably connected wirelessly.

The observation device 1 is an imaging device that captures an image of the sample contained in the container 2 from below the container 2. In order to capture an image of the sample without taking out the sample from an incubator 110, for example, the observation device 1 is used in a state of being disposed in the incubator 110 as illustrated in FIG. 1. More specifically, as illustrated in FIG. 2, the observation device 1 is disposed in the incubator 110 in a state where the container 2 is placed on a mounting table 11 of the observation device 1, and captures an image of the sample in the container 2 according to an instruction from the control device 120.

As illustrated in FIG. 2, the observation device 1 includes a box-shaped housing 10 having the transparent mounting table 11 where the container 2 is disposed as an upper surface, and a positioning member 12 for positioning the container 2 at a predetermined position on the mounting table 11 with respect to the observation device 1. The observation device 1 further includes an observation unit 40 including an observation optical system 20 and an imaging element 30, a conveyance mechanism 50, and a surface light source 60.

The observation unit 40 and the conveyance mechanism 50 are provided inside the housing 10. On the other hand, the surface light source 60 is provided outside the housing 10. Stated differently, the surface light source 60 is placed in one of two regions divided by the mounting table 11, whereas the observation optical system 20 of the observation unit 40 is placed in the other of the two regions.

The observation unit 40 is a unit in which the observation optical system 20 and the imaging element 30 are integrated. The observation optical system 20 is an optical system that gathers light from a bottom surface 3 of a housing portion of the container 2 to concentrate the light into the imaging element 30, and the observation optical system 20 includes an aperture stop 21 at a pupil position. The observation optical system 20 is telecentric on its object side such that a change in focus position causes no change in imaging magnification. The imaging element 30 is an image sensor, and examples thereof include a charge-coupled device (CCD) image sensor and a complementary MOS (CMOS) image sensor without being particularly limited thereto.

The conveyance mechanism 50 is a device that moves the observation unit 40 in the housing 10, and the observation unit 40 is fixed to the conveyance mechanism 50. The conveyance mechanism 50 moves the observation unit 40 relative to the container 2 in a direction orthogonal to the optical axis AX of the observation optical system 20. The conveyance mechanism 50 changes the relative position of the observation unit 40 with respect to the container 2 to thereby change a position (hereinafter, referred to as an observation position) at which the bottom surface 3 of the housing portion of the container 2 and the optical axis of the observation optical system 20 intersect.

The observation unit 40 is capable of moving in the direction orthogonal to the optical axis AX of the observation optical system 20, more specifically, in the X and Y directions that are orthogonal to each other and are also parallel to the mounting table 11. The observation unit 40 may further move in the Z direction orthogonal to both the X and Y directions.

The surface light source 60 is a surface light source having a light emitting plane 61. The surface light source 60 is, for example, a display device having a plurality of pixels, and forms various light emission patterns by controlling light emitted from each of the plurality of pixels.

Each of the units operate under the control of the control device 120, so that the observation device 1 acquires an image of the sample. Specifically, the surface light source 60 emits light according to an instruction from the control device 120, and the surface light source illuminates the sample on the bottom surface 3 from above the container 2. The light that has transmitted through the sample is condensed on the imaging element 30 by the observation optical system 20. In accordance with an instruction from the control device 120, the imaging element 30 captures an image of the sample to acquire the image of the sample. The image acquired by the observation device 1 is output to the control device 120.

The control device 120 controls the observation device 1. The observation device 1 is required to include one or more processors and one or more non-transitory computer-readable media. For example, the observation device 1 may be a general-purpose computer. The one or more processors are each a hardware electric circuit including, for example, a central processing unit (CPU), a graphics processing unit (GPU), or a digital signal processor (DSP), and execute a program stored in the one or more non-transitory computer-readable media, so that programmed processing is performed. The one or more processors may include, for example, an application specific integrated circuit (ASIC) or a field-programmable gate array (FPGA).

The control device 120 configured as described above transmits an instruction for image acquisition to the observation device 1 disposed in the incubator 110 and then receives the image acquired by the observation device 1. The control device 120 may display the image acquired by the observation device 1 in a display device included in the control device 120. The system 100 may thus function as an observation system for a user to observe a sample being cultured.

The control device 120 may communicate with a client terminal (client terminal 130, client terminal 140) illustrated in FIG. 1, and may display the image acquired by the observation device 1 on a display device provided in the client terminal. It is only required that the client terminal has a display, and the client terminal may be, for example, a desktop computer, a laptop computer, a tablet, or a smartphone.

Meanwhile, in order to visualize a sample as a phase object with high contrast to allow a cell or the like to be recognized, it is desirable to form an image of the sample by condensing light having entered the sample at a proper angle, namely, to achieve oblique illumination. However, in general, the oblique illumination is achieved only in a relatively narrow range. Therefore, under a certain illumination environment (specific light emission pattern, for example), when the observation position is changed, the oblique illumination easily deviates from the range where the oblique illumination is achieved at the changed observation position. Thus, a large area in the container cannot be observed with good contrast.

The following description provides an example of the case where the control device 120 controls the surface light source 60 to emit light in a light emission pattern P0 having a rectangular light emitting region 62 around the approximate center of the light emitting plane 61 as illustrated in FIG. 3. Note that the light emission pattern is a spatial pattern defined by the light emitting region 62 where light is emitted on the light emitting plane 61. The light emission pattern is controlled by the control device 120.

In this case, as illustrated in FIG. 4, in a case where the observation unit 40 (that is, the observation position) is located directly below the light emitting region 62, an illumination region 22 is formed at the center of the pupil on the pupil plane on which the aperture stop 21 is set, and bright field illumination is achieved. For this reason, no shading is generated in the image of the sample as the phase object, and the sample cannot be observed with good contrast. By shifting the observation unit 40 (observation position) from directly below the light emitting region 62 to some extent, oblique illumination is achieved and shading is generated in the image of the sample, so that the sample can be observed. However, if the observation unit 40 (observation position) is shifted too much from directly below the light emitting region 62, no light enters the pupil plane, which results in dark field illumination, so that the sample cannot be observed again.

To address this, in the system 100, the control device 120 executes light emission pattern control of changing the light emission pattern according to the observation position so that the oblique illumination is achieved at the observation position determined by the position of the observation unit 40. Specifically, the control device 120 executes the light emission pattern control so as to change at least one of the position and the width of the light emitting region 62 of the surface light source 60 according to the observation position. Hereinafter, the light emission pattern control for controlling the light emission pattern according to the observation position is referred to as first light emission pattern control, and is distinguished from light emission pattern control (second light emission pattern control) that does not depend on the observation position described later.

In the example illustrated in FIG. 5, when the observation unit 40 is moved to the first position from the left side, the control device 120 changes the position of the light emitting region 62 to a position A illustrated in FIG. 5 to thereby change the light emission pattern of the surface light source 60 to a light emission pattern P1 illustrated in FIG. 6A. Similarly, when the observation unit 40 is moved to the second, third, fourth, and fifth positions from the left side, the control device 120 changes the position of the light emitting region 62 to a position B, a position C, a position D, and a position E illustrated in FIG. 5, respectively to thereby change the light emission pattern of the surface light source 60 to a light emission pattern P2, a light emission pattern P3, a light emission pattern P4, and a light emission pattern P5 illustrated in FIGS. 6B to 6E.

As a result, in the system 100, oblique illumination is achieved at each observation position, which enables images with high contrast, such as images M1 to M5 illustrated in FIGS. 7A to 7E, to be obtained. The images M1 to M5 are images of the sample obtained at the first to fifth positions from the left, respectively. The sample is, for example, a circular cell placed on the optical axis, and a bright part 32 and a dark part 33 are generated with respect to a background 31, so that the shape of the cell can be recognized. Incidentally, the image M1, the image M2, and the image M4 are images obtained by oblique illumination from the positive side, and the image M3 and the image M5 are images obtained by oblique illumination from the negative side.

FIG. 8 is an explanatory view for parameters. Hereinafter, conditions that are desirably satisfied by the system 100 in the first light emission pattern control will be described with reference to FIG. 8.

First, the definition of parameters related to the first light emission pattern control will be described. NA represents the numerical aperture on the object side of the observation optical system 20. H represents the air-converted length of a distance between the light emitting plane 61 and the observation position. $Y_s$ represents a Y coordinate of the observation position. $Y_{min}$ and $Y_{max}$ are Y coordinates of both ends of the light emitting region 62, respectively, and $Y_{min} < Y_{max}$ is established. That is, $Y_{max}$ is the Y coordinate of the other end of the light emitting region 62 located on the positive side with respect to one end of the light emitting region 62 corresponding to $Y_{min}$, and $Y_{max}$ is the Y coordinate of the positive end of the light emitting region 62. $Y_{min}$ represents a Y coordinate of the negative end of the light emitting region 62. In this example, the Y coordinate is a coordinate in the Y direction in which the observation position changes.

$S_{min}$ represents a sine of the incident angle of the illumination light from one end (negative end) of the light emitting region 62 corresponding to $Y_{min}$ to the observation position. $S_{max}$ represents a sine of the incident angle of the illumination light from the other end (positive end) of the light emitting region 62 corresponding to $Y_{max}$ to the observation position.

In a case where the oblique illumination is applied to the observation position from the positive side, the system 100 desirably satisfies the following conditional expression.

$$0.2\ NA < S_{min} < 0.9\ NA \quad (1)$$

As a result, the illumination region 22 is formed at a position offset from the center of the pupil, so that the oblique illumination can be achieved at the observation position. In this case, it is desirable that the system 100 further satisfies the following conditional expression.

$$NA < S_{max} < 1 \quad (2)$$

As a result, the illumination region 22 reaches the end of the pupil, so that the sample can be illuminated at the maximum incident angle that can be realized by the observation optical system 20. Thus, the sample can be visualized with high contrast.

In a case where the oblique illumination is applied to the observation position from the negative side, the system 100 desirably satisfies the following conditional expression.

$$-0.9\ NA < S_{max} < -0.2\ NA \quad (3)$$

As a result, the illumination region 22 is formed at a position offset from the center of the pupil, so that the oblique illumination can be achieved at the observation position. In this case, it is desirable that the system 100 further satisfies the following conditional expression.

$$-1 < S_{min} < -NA \quad (4)$$

As a result, the illumination region 22 reaches the end of the pupil, so that the sample can be illuminated at the maximum incident angle that can be realized by the observation optical system 20. Thus, the sample can be visualized with high contrast.

The incident angle is represented by a positive value for a case where the illumination light is incident on the optical axis from the positive side, and is represented by a negative value for a case where the illumination light is incident on the optical axis from the negative side. Accordingly, $S_{min}$ and $S_{max}$ are defined by the following formulas.

$$S_{min} \equiv \frac{(Y_{min} - Y_s)}{\sqrt{(Y_{min} - Y_s)^2 + H^2}} \quad (5)$$

$$S_{max} \equiv \frac{(Y_{max} - Y_s)}{\sqrt{(Y_{max} - Y_s)^2 + H^2}} \quad (6)$$

Figure 9:
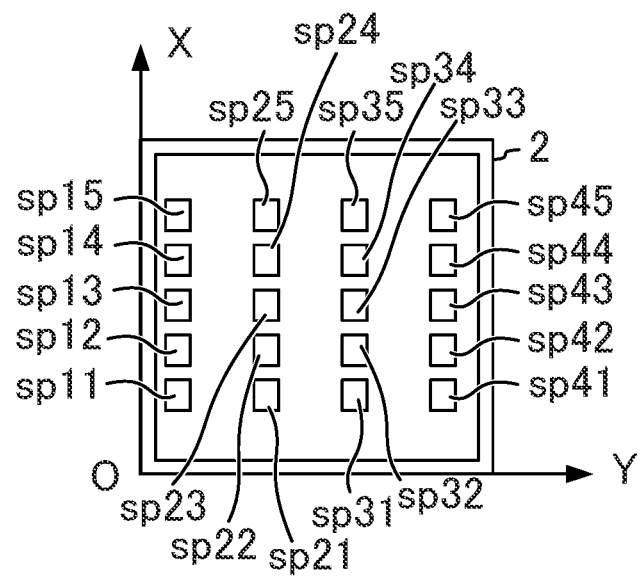
FIG. 9 is an explanatory view for the arrangement of observation positions.

FIG. 9 is an explanatory view for the arrangement of observation positions. The container 2 illustrated in FIG. 9 is a square petri dish and has a size of 87 mm×87 mm Three specific examples of the first light emission pattern control will be described. The first light emission pattern control is performed by the system 100 in a case where images of the sample are acquired at a total of 20 observation positions of 4×5 (sp11 to sp15, sp21 to sp25, sp31 to sp35, sp41 to sp45) in the container 2. In each of the specific examples, H is 60 mm, NA is 0.25, and the size of the actual field of view is 2.8 mm×2.1 mm.

Figure 10:
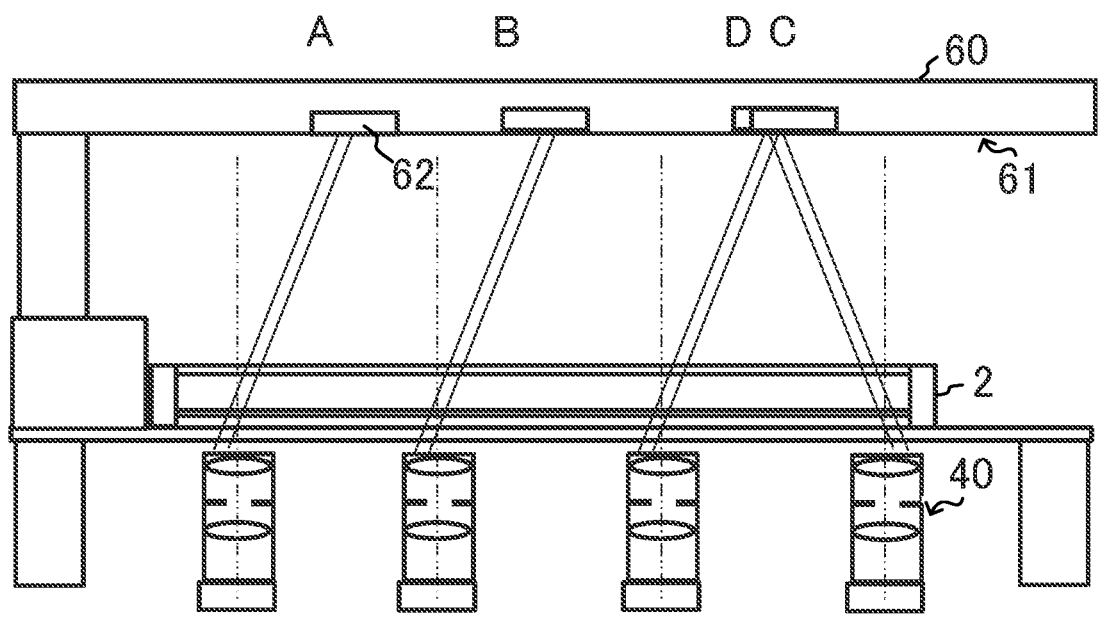
FIG. 10 is a diagram illustrating a specific example of the position of a light emitting region according to an observation position.

FIG. 10 is a diagram illustrating a specific example of the position of a light emitting region according to an observation position. FIG. 11 is a table T1 illustrating applicability of a predetermined condition and a parameter value of a system in each light emission pattern illustrated in FIG. 10. FIGS. 10 and 11 correspond to the first specific example, and illustrate an example of changing the position of the light emitting region 62.

Positions A, B, C, and D of the light emitting region 62 illustrated in FIG. 10 correspond to bright part positions 1, 2, 3, and 4 illustrated in FIG. 11, respectively. As illustrated in FIG. 11, in the first specific example, in a case where the observation position (sp11 to sp15, sp21 to sp25, sp31 to sp35) is observed, the system 100 satisfies the conditional expression (1) and the conditional expression (2) and the oblique illumination from the positive side is achieved. In a case where the observation position (sp41 to sp45) is observed, the system 100 satisfies the conditional expression (3) and the conditional expression (4) and the oblique illumination from the negative side is achieved.

Figure 12:
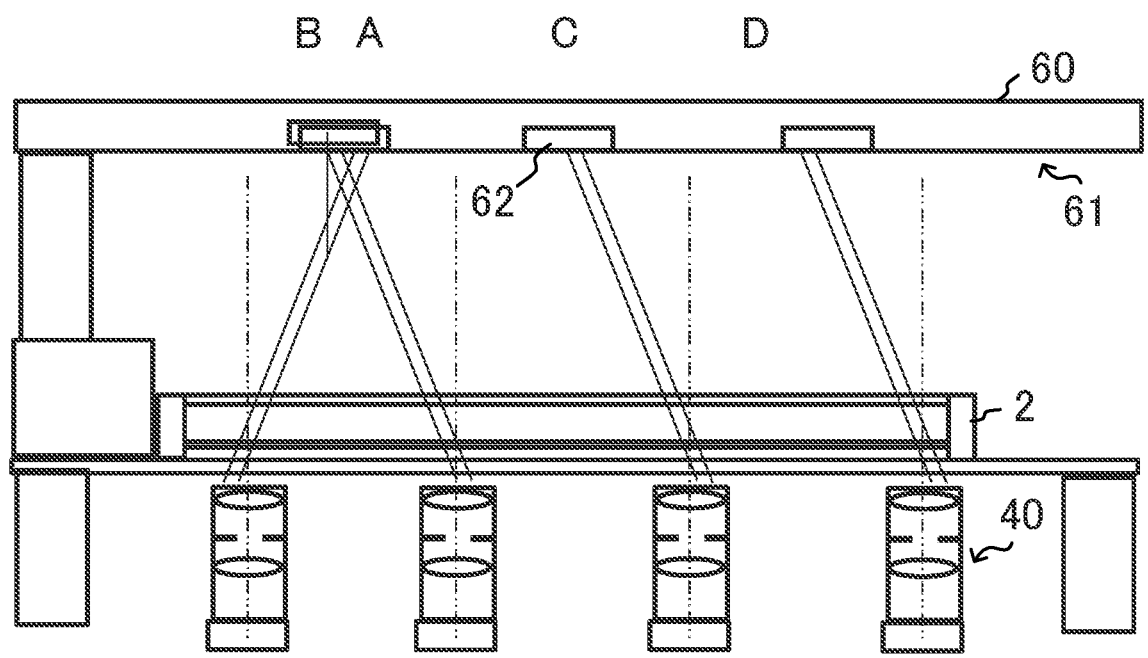
FIG. 12 is a diagram illustrating another specific example of the position of a light emitting region according to an observation position.

FIG. 12 is a diagram illustrating another specific example of the position of a light emitting region according to an observation position. FIG. 13 is a table T2 illustrating applicability of a predetermined condition and a parameter value of a system in each light emission pattern illustrated in FIG. 12. FIGS. 12 and 13 correspond to the second specific example, and illustrate an example of changing the position of the light emitting region 62. The second specific example is different from the first specific example in that oblique illumination from the negative side is prioritized.

Positions A, B, C, and D of the light emitting region 62 illustrated in FIG. 12 correspond to bright part positions 1, 2, 3, and 4 illustrated in FIG. 13, respectively. As illustrated in FIG. 13, in the second specific example, in a case where the observation position (sp11 to sp15) is observed, the system 100 satisfies the conditional expression (1) and the conditional expression (2) and the oblique illumination from the positive side is achieved. In a case where the observation position (sp21 to sp25, sp31 to sp35, sp41 to sp45) is observed, the system 100 satisfies the conditional expression (3) and the conditional expression (4) and the oblique illumination from the negative side is achieved.

Figure 14:
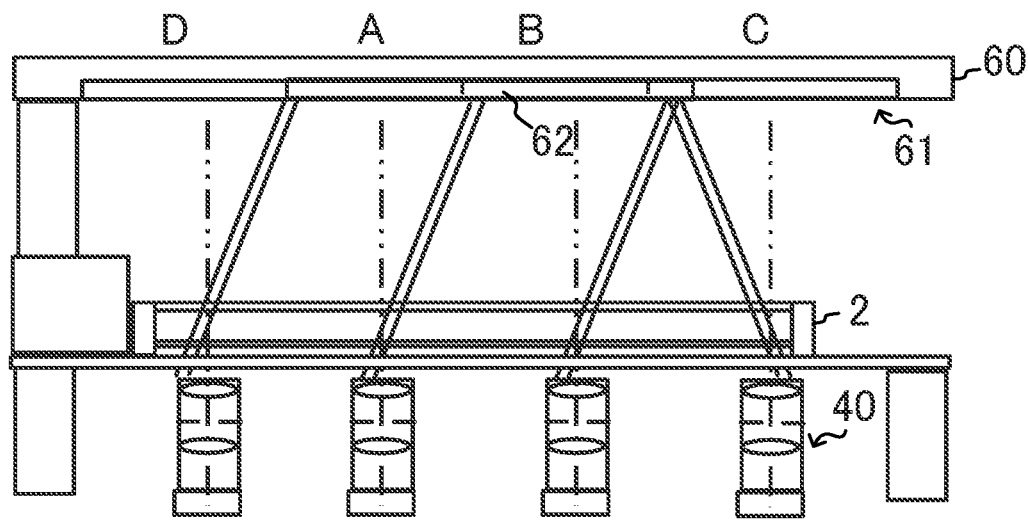
FIG. 14 is a diagram illustrating yet another specific example of the position of a light emitting region according to an observation position.
Figure 15A:
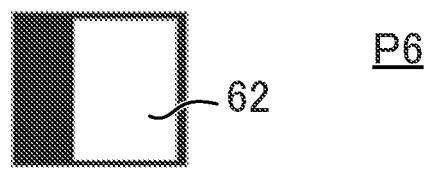
FIGS. 15A to 15D are diagrams illustrating light emission patterns corresponding to FIG. 14.
Figure 15B:
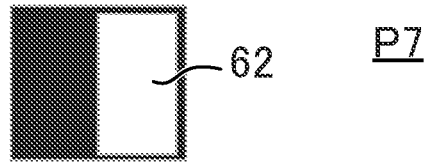
Figure 15C:
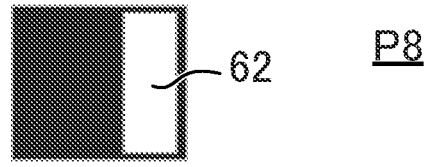
Figure 15D:

FIG. 14 is a diagram illustrating yet another specific example of the position of a light emitting region according to an observation position. FIGS. 15A to 15D are diagrams illustrating light emission patterns corresponding to FIG. 14. FIG. 16 is a table T3 illustrating applicability of a predetermined condition and a parameter value of a system in each light emission pattern illustrated in FIG. 14. FIGS. 14 to 16 correspond to the third specific example, and illustrate an example of changing the position and width of the light emitting region 62. The third specific example is different from the first specific example in that the control of the illumination light vignetted at the pupil is omitted as much as possible.

Positions A, B, C, and D of the light emitting region 62 illustrated in FIG. 14 correspond to a light emission pattern P6, a light emission pattern P7, a light emission pattern P8, and a light emission pattern P9 illustrated in FIGS. 15A to 15D respectively, and correspond to bright part positions 1, 2, 3, and 4 illustrated in FIG. 16, respectively. As illustrated in FIG. 16, in the third specific example, similarly to the first specific example, in a case where the observation position (sp11 to sp15, sp21 to sp25, sp31 to sp35) is observed, the system 100 satisfies the conditional expression (1) and the conditional expression (2) and the oblique illumination from the positive side is achieved. In a case where the observation position (sp41 to sp45) is observed, the system 100 satisfies the conditional expression (3) and the conditional expression (4) and the oblique illumination from the negative side is achieved.

In all of the three specific examples, the oblique illumination from the positive side is achieved at the observation positions (sp11 to sp15), and the oblique illumination from the negative side is achieved at the observation positions (sp41 to sp45). This is to prevent the illumination light from being vignetted on the wall surface of the container 2. Therefore, the oblique illumination may be applied from either the positive side or the negative side as long as the illumination light is not vignetted on the wall surface.

According to the system 100 of the first embodiment, since the oblique illumination is achieved at least at the observation position regardless of the observation position, it is possible to observe the sample in a large area of the container with high contrast.

Second Embodiment

A system according to the present embodiment (hereinafter, also simply referred to as the present system) is similar to the system 100 in that the observation device 1 and the control device 120 are included. The present system is different from the system 100 in that the control device 120 executes light emission pattern control (hereinafter, referred to as a second light emission pattern control) for switching the light emission pattern between a plurality of periodic light emission patterns having phases different from each other, instead of executing the light emission pattern control (first light emission pattern control) according to the observation position.

Figure 17:
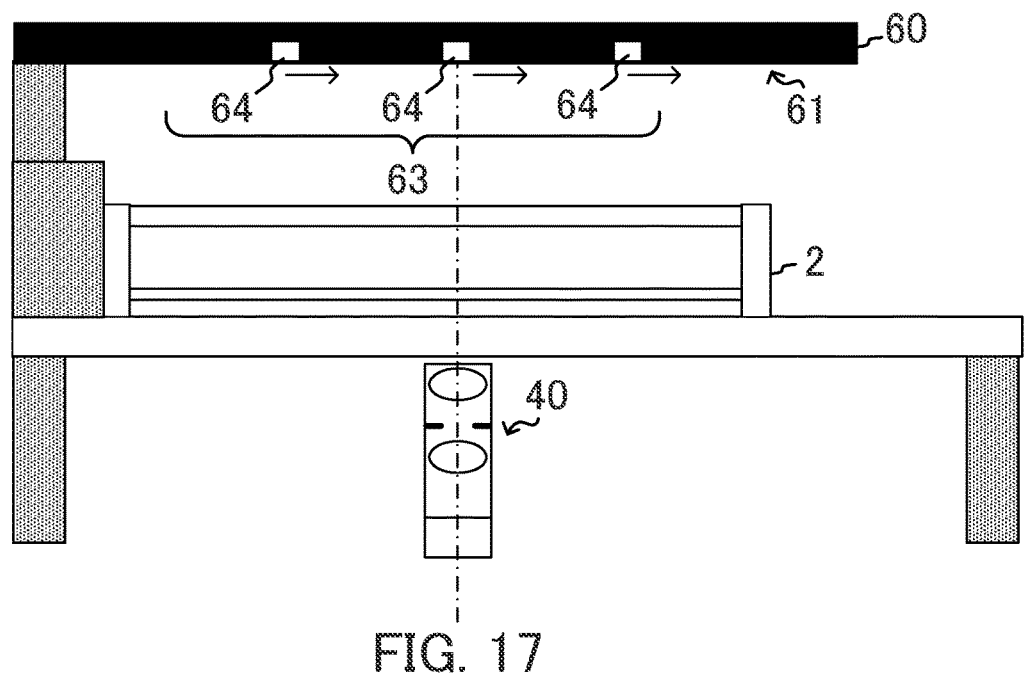
FIG. 17 is an explanatory view for light emission control in a system according to a second embodiment.

FIG. 17 is an explanatory view for light emission control in a system according to the present embodiment. FIGS. 18A to 18F are explanatory views for switching between a plurality of periodic light emission patterns. The second light emission pattern will be described below with reference to FIGS. 17 to 18F.

Figure 18A:
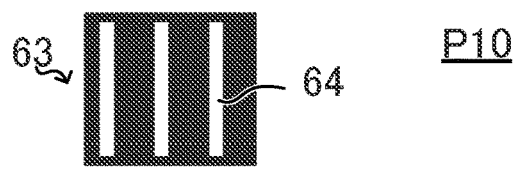
FIGS. 18A to 18F are explanatory views for switching between a plurality of periodic light emission patterns.
Figure 18B:
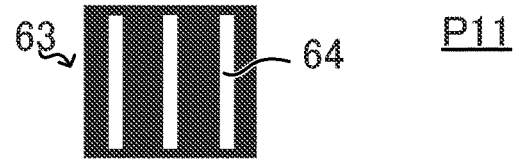
Figure 18C:
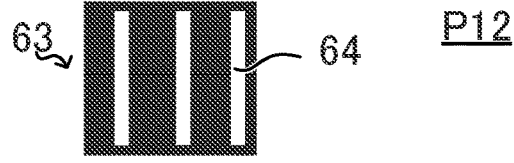
Figure 18D:
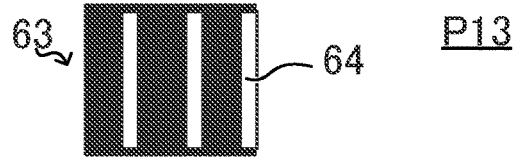
Figure 18E:
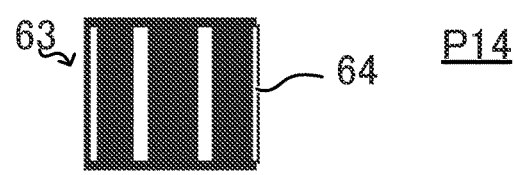
Figure 18F:
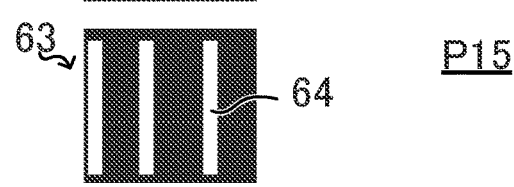

In the system according to the present embodiment, the control device 120 executes the second light emission pattern control so as to sequentially switch the light emission pattern to be formed on the light emitting plane 61 to the plurality of periodic light emission patterns at each observation position. The second light emission pattern control is performed by the control device 120 regardless of the observation position. As illustrated in FIGS. 17 to 18F, the periodic light emission pattern is a spatial pattern defined by a light emitting region 63 including a plurality of fringe regions 64 aligned in one direction (the Y direction, for example) at regular intervals.

As illustrated in FIGS. 18A to 18F, the control device 120 switches between the plurality of periodic light emission patterns (light emission pattern P10 to light emission pattern P15) having phases different from each other, so that it is possible to obtain a plurality of images of a sample acquired by the observation device 1 in different illumination states. Here, the expression that the phases are different means that the reference positions (for example, the position of the first fringe) of the fringe regions 64 are different.

As will be described later, by appropriately designing the plurality of periodic light emission patterns to be switched, one or more images acquired in a state where the oblique illumination is achieved are included in the plurality of acquired images regardless of the observation position. The present system thus eliminates the need for execution of different control for each observation position, and enables obtaining an image with high contrast only by executing a constant light emission pattern control (that is, the second light emission pattern control) regardless of the observation position.

Figure 19:
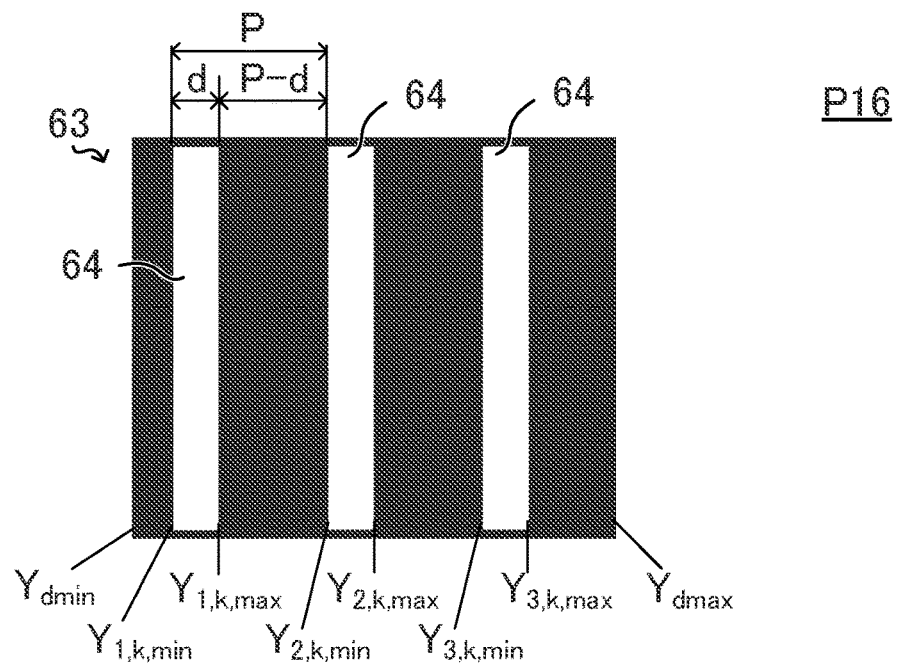
FIG. 19 is an explanatory view for parameters.
Figure 20:
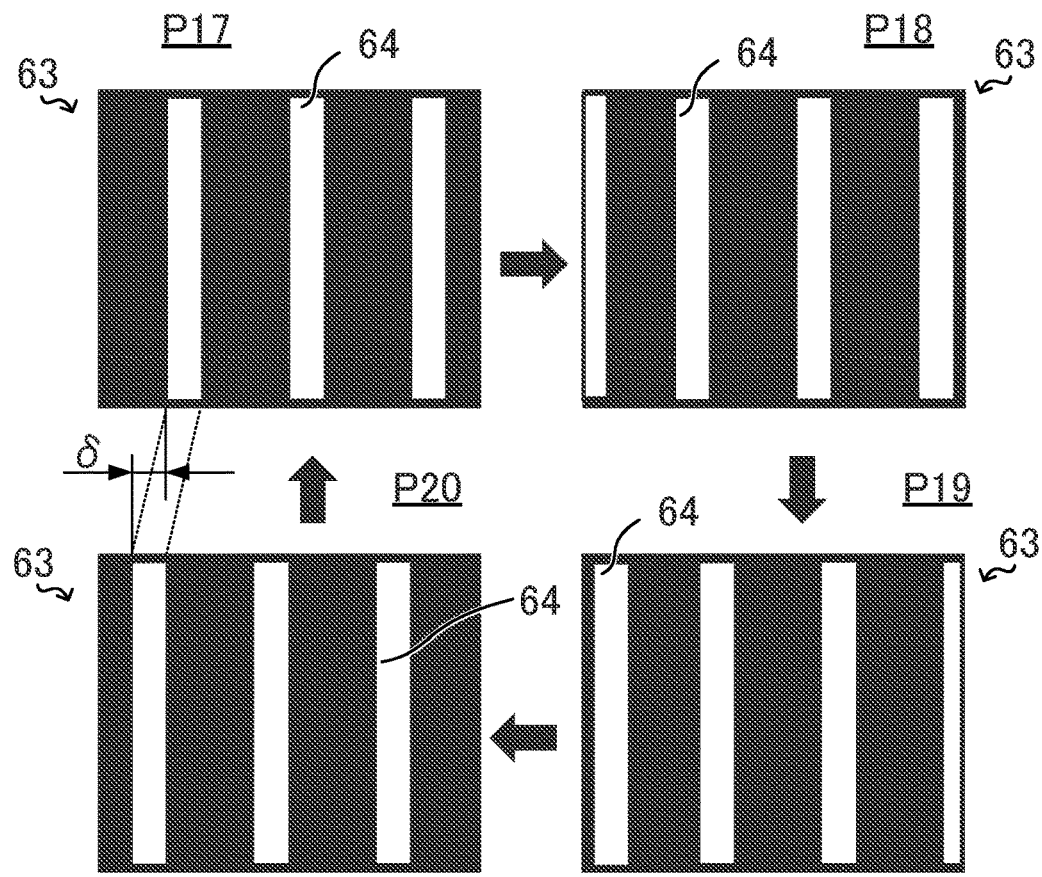
FIG. 20 is an explanatory view for a relationship between a plurality of periodic light emission patterns.

FIG. 19 is an explanatory view for parameters. FIG. 20 is an explanatory view for a relationship between a plurality of periodic light emission patterns. Hereinafter, conditions that are desirably satisfied by the present system in the second light emission pattern control will be described with reference to FIGS. 19 and 20.

First, the definition of parameters related to the second light emission pattern control will be described. NA represents the numerical aperture on the object side of the observation optical system 20. P represents a pitch of the plurality of fringe regions 64. d represents a width of each of the plurality of fringe regions 64. H represents the air-converted length of a distance between the light emitting plane 61 and the observation position. δ represents a distance on the light emitting plane 61 corresponding to a phase difference between the plurality of periodic light emission patterns. That is, δ corresponds to an amount of movement of the fringe region 64 caused at the time of switching between the periodic light emission patterns.

In this case, a Y coordinate $Y_{M,k,min}$ of the negative end and a Y coordinate $Y_{M,k,max}$ of the positive end of each fringe region 64 in the periodic light emission pattern (light emission pattern P16) illustrated in FIG. 19 are defined by the following formulas.

$$Y_{M,k,min} = \delta_0 + (k-1)\delta + M \cdot P \quad (7)$$

$$Y_{M,k,max} = Y_{M,k,min} + d \quad (8)$$

Here, M specifies a fringe region 64 of the plurality of fringe regions 64 included in the periodic light emission pattern, and is the fringe region number. k specifies a periodic light emission pattern of the plurality of periodic light emission patterns (for example, a light emission pattern P17 to a light emission pattern P19 illustrated in FIG. 20), and is the periodic light emission pattern number. $\delta_0$ represents a Y coordinate of the negative end of the first fringe region in the first periodic light emission pattern. $Y_{dmin}$ and $Y_{dmax}$ are the minimum Y coordinate and the maximum Y coordinate on the light emitting plane 61 respectively, and $Y_{dmin} < Y_{M,k,min} < Y_{dmax}$ and $Y_{dmin} < Y_{M,k,max} < Y_{dmax}$ are established.

The present system desirably satisfies the following conditional expression.

$$\frac{2NA}{\sqrt{1-NA^2}} < \frac{P-d}{H} \quad (9)$$

As a result, an interval (P−d) between the fringe regions 64 is appropriately set without becoming too narrow. This prevents simultaneous application of the oblique illumination to the observation position from two directions of the positive side and the negative side by the illumination light from two adjacent fringe regions 64. It is therefore possible to obtain an image with high contrast by oblique illumination. Incidentally, in a case where the oblique illumination is achieved from both the positive side and the negative side, the shading cancel each other, which makes it difficult to obtain an image with high contrast.

It is desirable that the present system further satisfies the following conditional expression.

$$0 < \frac{|\delta|}{H} < \frac{NA}{\sqrt{1-NA^2}} \quad (10)$$

As a result, the amount of movement of the fringe region 64 caused by the switching between the periodic light emission patterns is limited and appropriately set. Therefore, the oblique illumination is always achieved in any of the plurality of periodic light emission patterns. In a case where the amount of movement of the fringe region 64 is too large, the oblique illumination is not achieved in any of the periodic light emission patterns in some cases, which makes it difficult to obtain an image with high contrast.

It is desirable that the present system further satisfies the following conditional expression.

$$0 < \frac{d}{H} < \frac{NA}{\sqrt{1-NA^2}} \quad (11)$$

As a result, the width of the fringe region 64 is appropriately set without becoming too large. Therefore, since the illumination state at the observation position changes due to the switching between the plurality of periodic light emission patterns, it is possible to avoid unnecessary image capturing such as acquisition of the same image a plurality of times.

It is desirable that the present system further satisfies the following conditional expression. N is an integer of 1 or more.

$$|\delta| = \frac{P}{N} \quad (12)$$

As a result, as illustrated in FIG. 20, the same periodic light emission pattern occurs every N+1 times (every four times in the example of FIG. 20). Therefore, by performing switching at least N times (three times in the example of FIG. 20), it is possible to acquire an image at the observation position under the same condition no matter which periodic light emission pattern is started.

Figure 21:
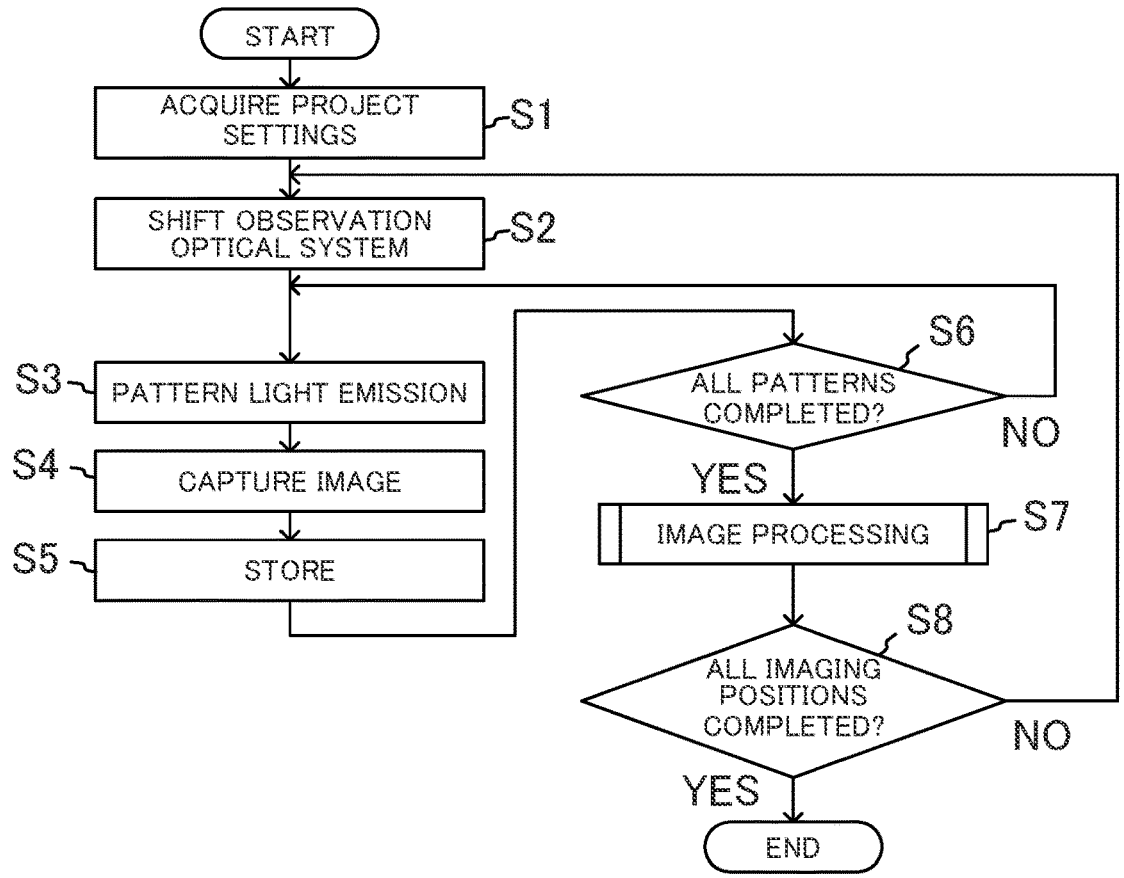
FIG. 21 is a flowchart for multi-point imaging processing performed by a system.
Figure 22:
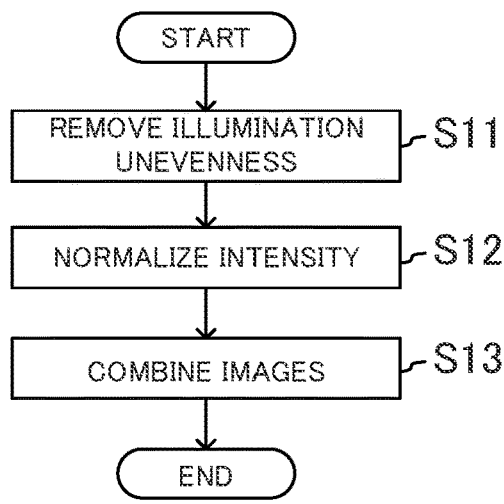
FIG. 22 is a flowchart for image processing performed by a system.
Figures 23A, 23B:
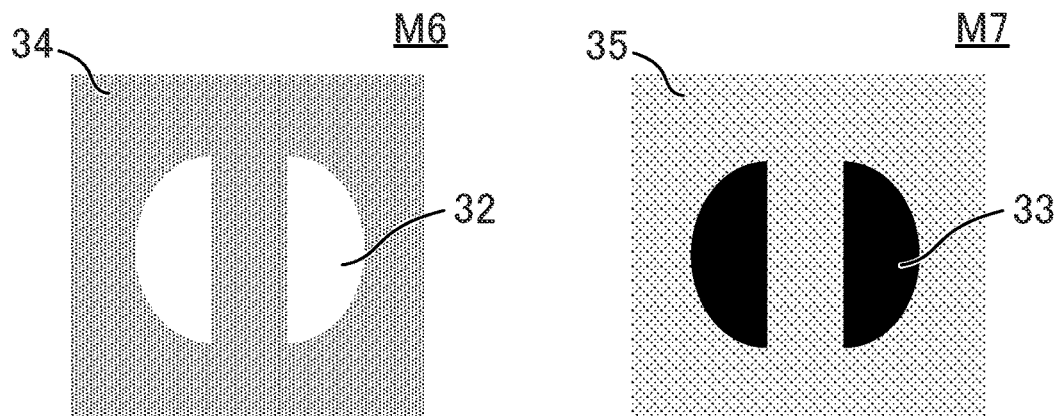
FIGS. 23A and 23B are diagrams exemplifying oblique illumination images generated by the image processing depicted in FIG. 22.

FIG. 21 is a flowchart for multi-point imaging processing performed by a system. FIG. 22 is a flowchart for image processing performed by a system. FIGS. 23A and 23B are diagrams exemplifying oblique illumination images generated by the image processing depicted in FIG. 22. Multi-point imaging processing performed by the present system will be described below with reference to FIGS. 21 to 23B.

In the present system, when the multi-point imaging processing illustrated in FIG. 21 is started, the control device 120 first acquires project settings (step S1). Here, the project is a plan such as when, where, and under what conditions imaging is performed, and the project settings include at least information on imaging point (observation position) for the multi-point imaging. Further, the project settings may include information on scheduled photographing time in addition to the information on imaging point (observation position).

The control device 120 shifts the observation optical system 20 (step S2). Here, the observation optical system 20 is shifted to the position designated in the project settings acquired in step S1, and the observation position is changed.

Thereafter, the control device 120 causes the surface light source 60 to emit light in the periodic light emission pattern (step S3), captures an image of the sample with the imaging element 30 (step S4), and further stores the acquired image (step S5). The processing from step S3 to step S5 is repeated a plurality of times corresponding to the number of periodic light emission patterns. When finishing the repetition of the processing from step S3 to step S5 by a plurality of times corresponding to the number of periodic light emission patterns (YES in step S6), the control device 120 executes image processing depicted in FIG. 22 (step S7).

In the image processing depicted in FIG. 22, the control device 120 outputs an oblique illumination image based on the plurality of images acquired in the plurality of periodic light emission patterns by the repetition of the processing described above. The oblique illumination image is an image in which a sample as a phase object is visualized with good contrast, and may be an image itself acquired in a state where the oblique illumination is achieved. The oblique illumination image may be an image subjected to image processing like the image acquired in a state where the oblique illumination is achieved, and for example, may be a new image generated based on a plurality of images including at least one image acquired in a state where the oblique illumination is achieved.

Specifically, as illustrated in FIG. 22, the control device 120 performs processing of removing the illumination unevenness (step S11), processing of normalizing the intensity of the image (step S12), and processing of combining the images (step S13).

In step S11, the control device 120 performs filter processing of cutting a low-frequency cut component on each of the plurality of images. This filter processing is performed on the entire image region. As a result, the plurality of images obtained by the imaging (hereinafter, also referred to as a plurality of original images) is converted into a plurality of images from which the illumination unevenness has been removed (hereinafter, referred to as a plurality of filtered images). Hereinafter, the intensity of each pixel of the plurality of original images is referred to by $I_{o,k,x,y}$, and the intensity of each pixel of the plurality of filtered images is referred to by $I_{LCF,k,x,y}$. k represents the image number, x represents the row number of the pixel, and y represents the column number of the pixel.

In step S12, the control device 120 normalizes the plurality of filtered images and converts the resultant into a plurality of normalized images having the same average intensity. Specifically, for example, the control device 120 is required to generate the plurality of normalized images so that each pixel of the plurality of normalized images has intensity calculated by the following formula.

$$I_{nml,k,x,y} = \left(\frac{n \cdot I_{ave}}{\sum_{x,y} I_{LFC,k,x,y}}\right) I_{LFC,k,x,y} \quad (13)$$

Here, $I_{nml,k,x,y}$ represents the intensity of each pixel of the plurality of normalized images. $I_{ave}$ represents average pixel intensity of the plurality of normalized images. n represents the number of pixels of the filtered image.

In step S13, the control device 120 combines the plurality of normalized images to generate an oblique illumination image. Specifically, for example, the control device 120 is required to generate the oblique illumination image so that each pixel of the oblique illumination image has intensity calculated by the following formula. That is, the oblique illumination image is generated such that each pixel has intensity different from background intensity by a value proportional to the sum of differences between pixel intensities of the plurality of normalized images and the pixel average intensity.

$$I_{dm,x,y} = A \sum_{k=1}^{N} |I_{nml,k,x,y} - I_{ave}| + I_{bg} \quad (14)$$

Here, $I_{dm,x,y}$ represents the intensity of each pixel of the oblique illumination image. $I_{bg}$ represents the background intensity. A represents a contrast adjustment value. N represents the number of normalized images.

By performing the image processing illustrated in FIG. 22, the contrast generated in the plurality of original images is substantially added up, and thus, an oblique illumination image having high contrast can be generated, as illustrated in an image M6 illustrated in FIG. 23A or an image M7 illustrated in FIG. 23B. When A>0 is satisfied, the oblique illumination image is a positive contrast image in which the sample is represented by the bright part 32, such as the image M6. On the other hand, when A<0 is satisfied, the oblique illumination image is a negative contrast image in which the sample is represented by the dark part 33, such as the image M7.

Figure 24:
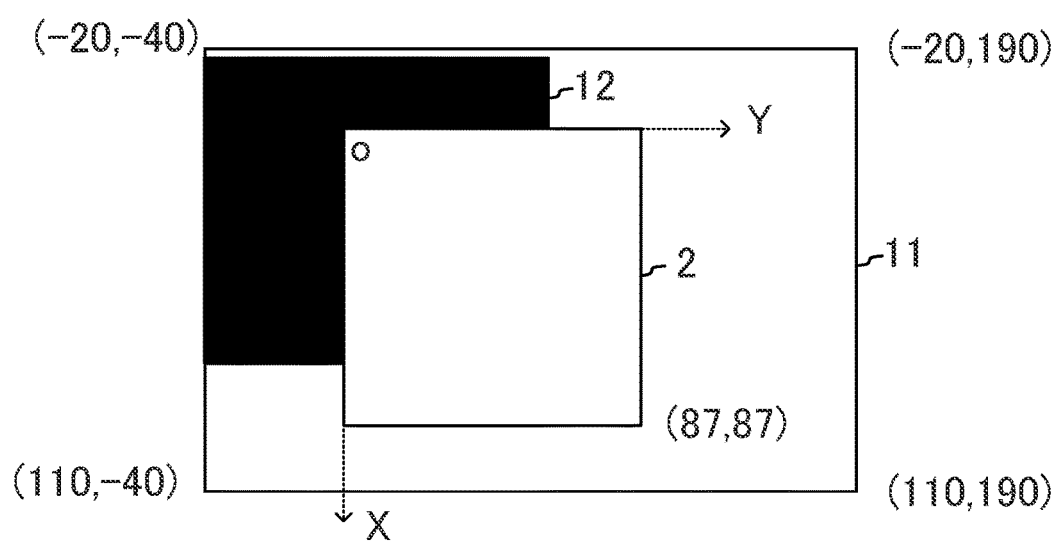
FIG. 24 is an explanatory view for XY coordinates in an observation device according to the second embodiment.
Figure 25:
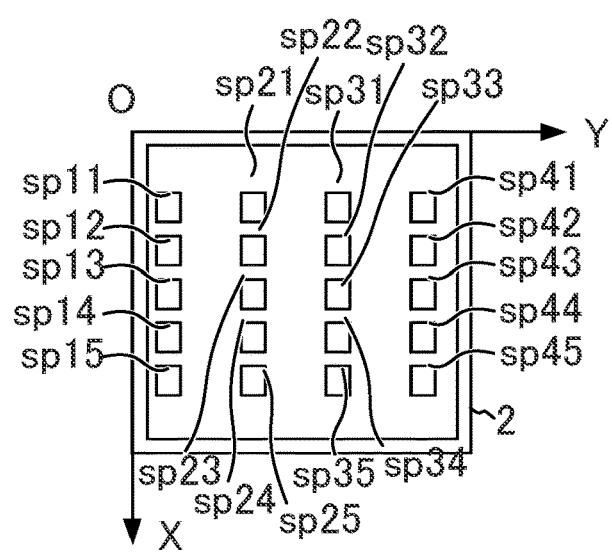
FIG. 25 is an explanatory view for the arrangement of observation positions according to the second embodiment.

FIG. 24 is an explanatory view for XY coordinates in an observation device according to the present embodiment. FIG. 25 is an explanatory view for the arrangement of observation positions according to the present embodiment. As illustrated in FIG. 24, a coordinate system having a corner in contact with a positioning member 12 among the four corners of a container 2 as the origin. The container 2 illustrated in FIG. 25 is a square petri dish and has a size of 87 mm×87 mm Therefore, the coordinates of the corner farthest from the origin of the container 2 are (87, 87).

Hereinafter, a specific example of the second light emission pattern control will be described. The second light emission pattern control is performed by the present system in a case where images of the sample are acquired at a total of 20 observation positions of 4×5 (sp11 to sp15, sp21 to sp25, sp31 to sp35, sp41 to sp45) in the container 2 of FIG. 25 in the coordinate system illustrated in FIG. 24. In each of the specific examples, H is 50 mm, NA is 0.25, and the size of the actual field of view is 2.8 mm×2.1 mm.

Figure 30:
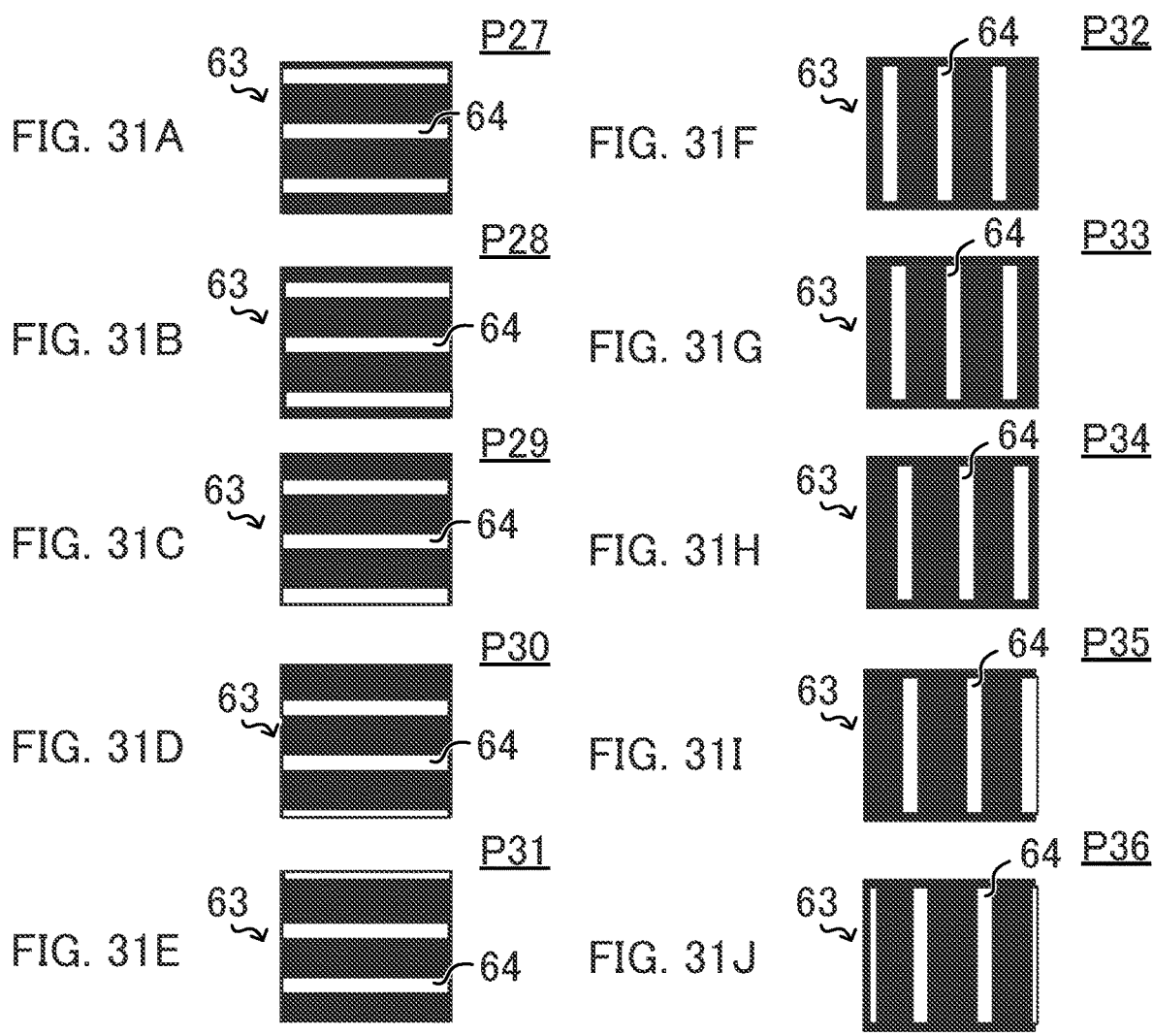
FIG. 30 is a table illustrating applicability of a predetermined condition of a system.

FIGS. 26A to 26F are diagrams illustrating specific examples of a plurality of periodic light emission patterns. FIG. 27 is a table T4 illustrating parameter values of the system. FIG. 28 is a table T5 illustrating details of the plurality of periodic light emission patterns illustrated in FIGS. 26A to 26F. FIGS. 29A to 29F are graphs for explaining an illumination state on a specimen surface in each of the plurality of periodic light emission patterns illustrated in FIGS. 26A to 26F. FIG. 30 is a table T6 illustrating applicability of a predetermined condition of the system.

As illustrated in FIGS. 26A to 26F, the system according to the present embodiment acquires an image while switching between six periodic light emission patterns (light emission pattern P21 to light emission pattern P26) at each observation position. As illustrated in FIGS. 26A to 26F, the periodic light emission patterns have the light emitting region 63 including six fringe regions 64. Incidentally, the detailed parameters of the present system are as indicated in FIG. 27. The Y coordinates of the fringe regions 64 of each periodic light emission pattern are as indicated in FIG. 28. As illustrated in FIG. 30, the present system satisfies all of conditional expressions (9) to (12).

The second light emission pattern control for switching between the periodic light emission patterns is executed under the above conditions, and thereby, as illustrated in FIGS. 29A to 29F, the region where the oblique illumination is achieved is moved in the Y direction every time the periodic light emission pattern is switched, and all the periodic light emission patterns are executed, so that the entire container is covered as the region where the oblique illumination is achieved. As a result, an arbitrary observation position can be observed with good contrast.

The horizontal axis of each of the graphs illustrated in FIGS. 29A to 29F represents the observation position (Y coordinate), and the vertical axis thereof represents the sine of the incident angle of the illumination light at the observation position. A solid line indicates $S_{min}$, and a broken line indicates $S_{max}$. A shaded region surrounded by a solid line and a broken line indicates the incident angle range of the illumination light. Further, the solid line arrow indicates a range of an observation position where the oblique illumination from the positive side is achieved, and the broken line arrow indicates a range of an observation position where the oblique illumination from the negative side is achieved.

According to the present system also, similarly to the system 100 of the first embodiment, since the oblique illumination is achieved regardless of the observation position, it is possible to observe the sample in a large area of the container with high contrast. Further, according to the present system, the control device 120 does not need to change the control content for each observation position, and it is possible to obtain an image with high contrast at an arbitrary observation position. Furthermore, according to the present system, adjustment for each observation position is unnecessary, which realizes high robustness.

Although the processing including the image synthesis as depicted in FIG. 22 has been exemplified as the image processing of step S7, the content of the image processing is not limited to the example depicted in FIG. 22. The control device 120 may include processing of selecting an oblique illumination image from a plurality of images.

In such a case, in step S12, the control device 120 normalizes the plurality of filtered images and converts the resultant into a plurality of normalized images having the same average intensity. Specifically, for example, the control device 120 is required to generate the plurality of normalized images so that each pixel of the plurality of normalized images has intensity calculated by the following formula. $I'_{nml,k,x,y}$ represents the intensity of each pixel of the plurality of normalized images.

$$I'_{nml,k,x,y} = \left( \frac{n}{\sum_{x,y} I_{LFC,k,x,y}} \right) I_{LFC,k,x,y} \quad (15)$$

Thereafter, the control device 120 calculates the variance of the intensity of each normalized image using the following formula. $s^2_k$ represents the variance of the intensity of the normalized image.

$$s_k^2 = \frac{1}{n} \sum_{x,y} \left( I'_{nml,k,x,y} - \frac{\sum_{x,y} I_{LFC,k,x,y}}{n} \right)^2 \quad (16)$$

Finally, the control device 120 selects an oblique illumination image based on the calculated variance. Specifically, the control device 120 is required to select an image having the largest variance as the oblique illumination image. The oblique illumination image may be a normalized image having the largest variance, may be a filtered image corresponding to the normalized image having the largest variance, or may be the original image corresponding to the normalized image having the largest variance. For example, in the case of analyzing the number of cells, the cell density, and the like, the filtered image corresponding to the normalized image having the largest variance is most desirable from the viewpoint of stability of the analysis result.

In the present system, the oblique illumination is achieved at the observation position in at least any of the plurality of periodic light emission patterns by the second light emission pattern control. Therefore, even in a case where the processing including the image selection described above is performed as the image processing, it is possible to obtain an oblique illumination image and to obtain an effect similar to that in a case where the processing including the image synthesis depicted in FIG. 22 is performed.

Third Embodiment

FIGS. 31A to 31J are explanatory views for switching between a plurality of periodic light emission patterns according to the present embodiment. The system according to the present embodiment (hereinafter, simply referred to as the present system) is similar to the system according to the second embodiment in that the control device 120 executes the second light emission pattern control. As illustrated in FIGS. 31A to 31J, the present system is different from the system according to the second embodiment in that the plurality of periodic light emission patterns include a plurality of first periodic light emission patterns (light emission patterns P27 to P31) having phases different from each other and a plurality of second periodic light emission patterns (light emission patterns P32 to P36) having phases different from each other.

The light emitting regions 63 corresponding to the plurality of first periodic light emission patterns include a plurality of first fringe regions (fringe regions 64) aligned in a first direction (X direction, for example) at regular intervals, whereas the light emitting regions 63 corresponding to the plurality of second periodic light emitting patterns include a plurality of second fringe regions (fringe regions 64) aligned in a second direction (Y direction, for example), different from the first direction, at regular intervals. In this example, the first direction and the second direction are orthogonal to each other.

Figure 32:
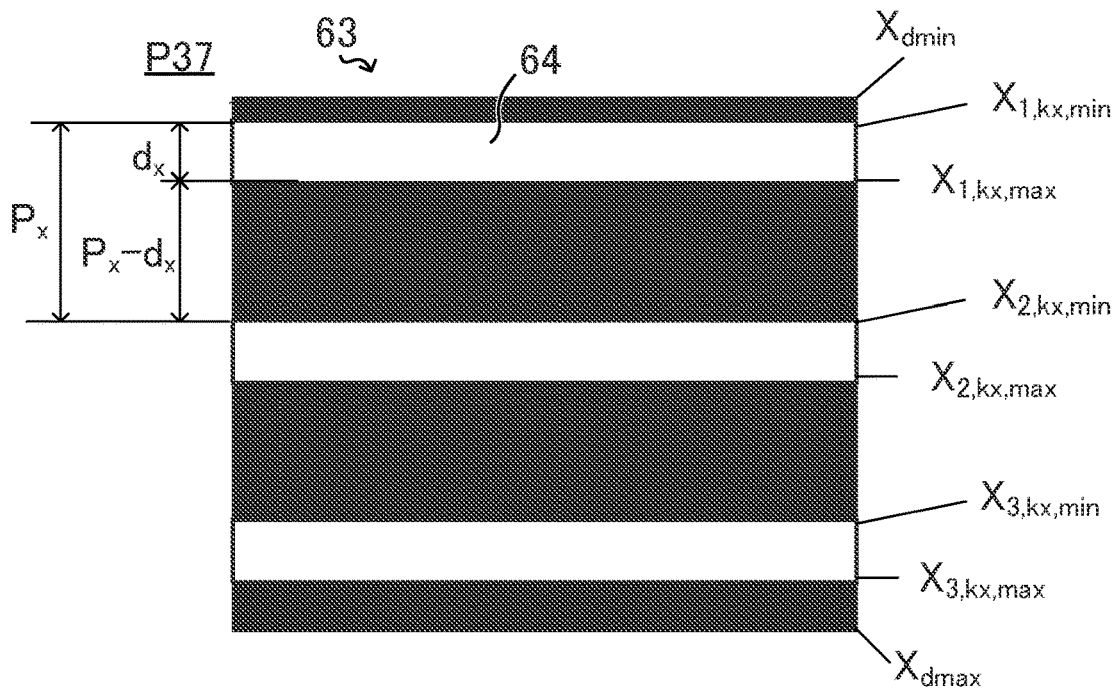
FIG. 32 is an explanatory view for parameters of a first periodic light emission pattern.
Figure 33:
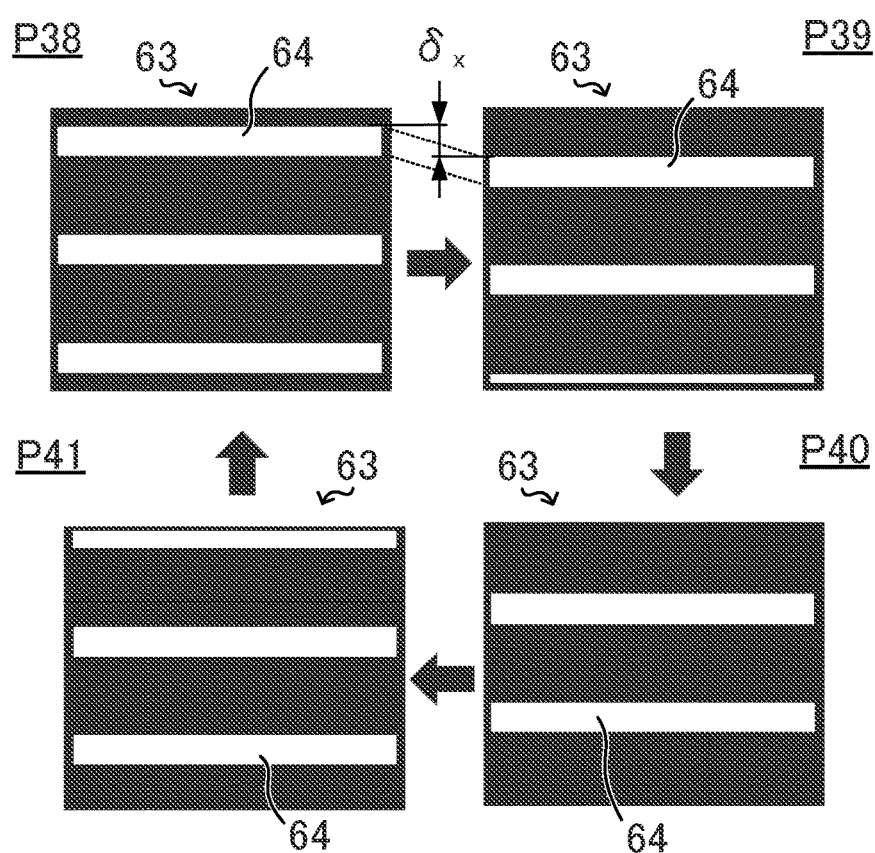
FIG. 33 is an explanatory view for a relationship between first periodic light emission patterns.
Figure 34:
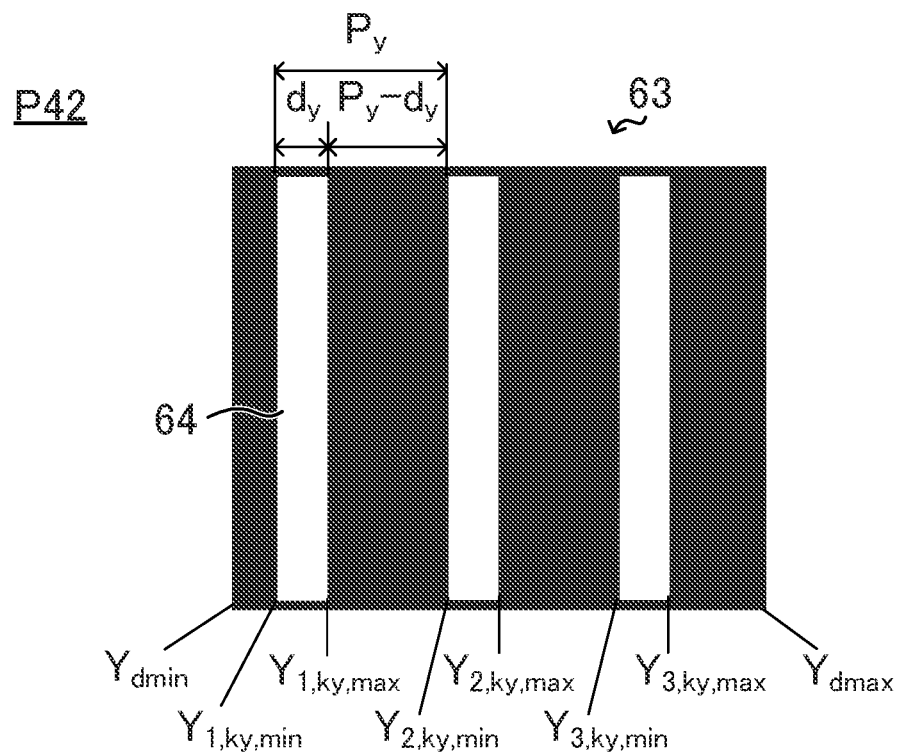
FIG. 34 is an explanatory view for parameters of a second periodic light emission pattern.
Figures 35A, 35B:
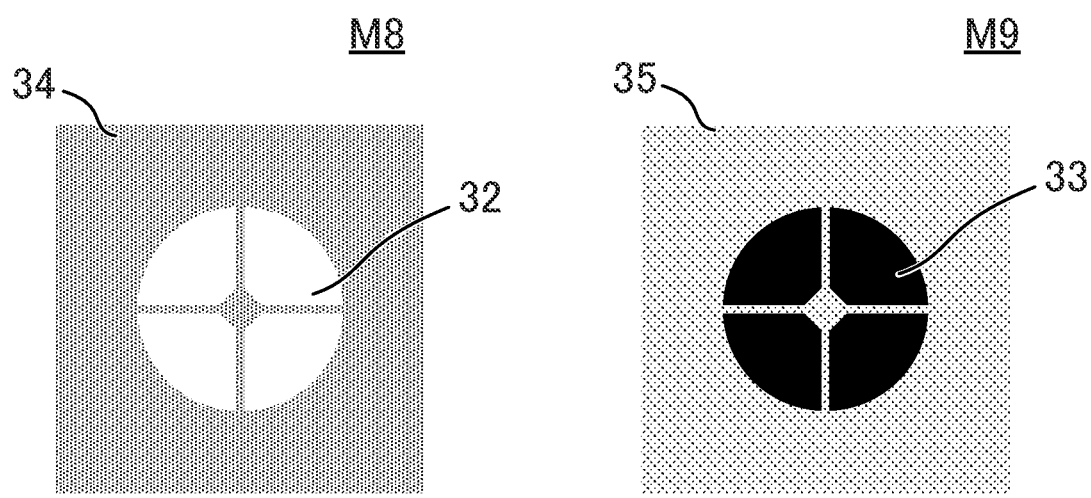
FIGS. 35A and 35B are diagrams exemplifying oblique illumination images generated by image processing.
Figures 40A, 40B, 40C:
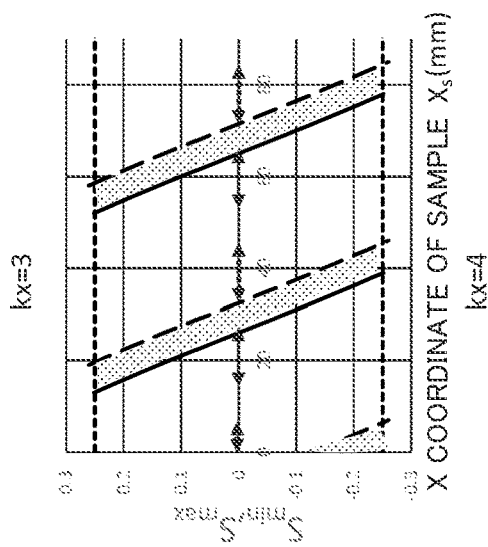
FIGS. 40A to 40F are graphs for explaining an illumination state on a specimen surface in each of the plurality of first periodic light emission patterns illustrated in FIGS. 36A to 36L.
Figures 40D, 40E, 40F:
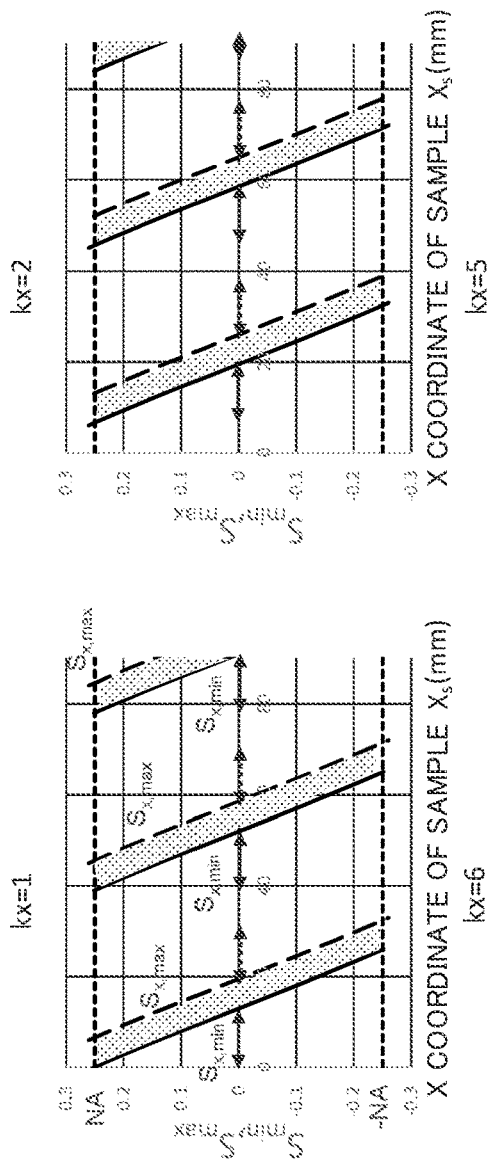

FIG. 32 is an explanatory view for parameters of a first periodic light emission pattern. FIG. 33 is an explanatory view for a relationship between first periodic light emission patterns. FIG. 34 is an explanatory view for parameters of a second periodic light emission pattern. FIGS. 35A and 35B are diagrams exemplifying oblique illumination images generated by image processing. Hereinafter, conditions that are desirably satisfied by the system in the second light emission pattern control will be described with reference to FIGS. 32 to 35B.

First, the definition of parameters related to the first periodic light emission pattern will be described. NA represents the numerical aperture on the object side of the observation optical system 20. $P_x$ represents a pitch of the plurality of fringe regions 64 included in the first periodic light emission pattern. $d_x$ represents the width of each of the plurality of fringe regions 64 included in the first periodic light emission pattern. H represents the air-converted length of a distance between the light emitting plane 61 and the observation position. $\delta_x$ represents a distance on the light emitting plane 61 corresponding to a phase difference between the plurality of first periodic light emission patterns. That is, $\delta_x$ corresponds to an amount of movement of the fringe region 64 caused at the time of switching between the first periodic light emission patterns.

In this case, an X coordinate $X_{L,kx,min}$ of the negative end and an X coordinate $X_{L,kx,max}$ of the positive end of each fringe region 64 in the first periodic light emission pattern (light emission pattern P37) illustrated in FIG. 32 are defined by the following formulas.

$$X_{L,kx,min} = \delta_{x0} + (k_x - 1)\delta_x + L \cdot P_x \qquad (17)$$

$$X_{L,kx,max} = X_{L,kx,min} + d_x \qquad (18)$$

Here, L specifies a fringe region 64 of the plurality of fringe regions 64 included in the first periodic light emission pattern, and is the fringe region number. kx specifies a first periodic light emission pattern of the plurality of first periodic light emission patterns (for example, a light emission pattern P38 to a light emission pattern P41 illustrated in FIG. 33), and is the first periodic light emission pattern number. $\delta_{x0}$ represents an X coordinate of the negative end of the first fringe region in one of the first periodic light emission patterns which comes first. Note that $X_{dmin}$ and $X_{dmax}$ are the minimum X coordinate and the maximum Y coordinate on the light emitting plane 61 respectively, and $X_{dmin} < X_{L,kx,min} < X_{dmax}$ and $X_{dmin} < X_{L,kx,max} < X_{dmax}$ are established.

The present system desirably satisfies the following conditional expression.

$$\frac{2NA}{\sqrt{1-NA^2}} < \frac{P_x - d_x}{H} \qquad (19)$$

$$0 < \frac{|\delta_x|}{H} < \frac{NA}{\sqrt{1-NA^2}} \qquad (20)$$

$$0 < \frac{d_x}{H} < \frac{NA}{\sqrt{1-NA^2}} \qquad (21)$$

$$|\delta_x| = \frac{P_x}{N_x} \qquad (22)$$

$$N_x > \frac{P_x\sqrt{1-N^2}}{H \cdot NA} \qquad (23)$$

Conditional expressions (19) to (22) correspond to the above-described conditional expressions (9) to (12), and the same applies to the meanings thereof. Conditional expression (23) is derived from the conditional expression (20) and the conditional expression (22).

Next, the definition of parameters related to the second periodic light emission pattern will be described. $P_y$ represents a pitch of the plurality of fringe regions 64 included in the second periodic light emission pattern. $d_y$ represents the width of each of the plurality of fringe regions 64 included in the second periodic light emission pattern. $\delta_y$ represents a distance on the light emitting plane 61 corresponding to a phase difference between the plurality of second periodic light emission patterns. That is, $\delta_y$ corresponds to an amount of movement of the fringe region 64 caused at the time of switching between the second periodic light emission patterns.

In this case, a Y coordinate $Y_{M,ky,min}$ of the negative end and a Y coordinate $Y_{M,ky,max}$ of the positive end of each fringe region 64 in the second periodic light emission pattern (light emission pattern P42) illustrated in FIG. 34 are defined by the following formulas.

$$Y_{M,ky,min} = \delta_{y0} + (k_y - 1)\delta_y + M \cdot P_y \quad (24)$$

$$Y_{M,ky,max} = Y_{M,ky,min} + d_y \quad (25)$$

Here, M specifies a fringe region 64 of the plurality of fringe regions 64 included in the second periodic light emission pattern, and is the fringe region number. ky specifies a second periodic light emission pattern of the plurality of second periodic light emission patterns, and is the second periodic light emission pattern number. $\delta_{y0}$ represents a Y coordinate of the negative end of the first fringe region in one of the second periodic light emission patterns which comes first. $Y_{dmin}$, $Y_{dmax}$ are the minimum Y coordinate and the maximum Y coordinate on the light emitting plane 61 respectively, and $Y_{dmin} < Y_{M,ky,min} < Y_{dmax}$ and $Y_{dmin} < Y_{M,ky,min} < Y_{dmax}$ are established.

The present system desirably satisfies the following conditional expression.

$$\frac{2NA}{\sqrt{1-NA^2}} < \frac{P_y - d_y}{H} \quad (26)$$

$$0 < \frac{|\delta_y|}{H} < \frac{NA}{\sqrt{1-NA^2}} \quad (27)$$

$$0 < \frac{d_y}{H} < \frac{NA}{\sqrt{1-NA^2}} \quad (28)$$

$$|\delta_y| = \frac{P_y}{N_y} \quad (29)$$

$$N_y > \frac{P_y\sqrt{1-NA^2}}{H \cdot NA} \quad (30)$$

Conditional expressions (26) to (29) correspond to the above-described conditional expressions (9) to (12), and the same applies to the meanings thereof. Conditional expression (30) is derived from the conditional expression (27) and the conditional expression (29).

In the present embodiment also, as illustrated in FIG. 22, the control device 120 is similar to that of the second embodiment in performing processing of removing the illumination unevenness (step S11), processing of normalizing the intensity of the image (step S12), and processing of combining the images (step S13).

In step S11, the control device 120 performs filter processing of cutting a low-frequency cut component on each of the plurality of first images acquired in the plurality of first periodic light emission patterns and the plurality of second images acquired in the plurality of second periodic light emission patterns. This filter processing is performed on the entire image region. As a result, the plurality of first images (hereinafter, also referred to as a plurality of first original images) and the plurality of second images (hereinafter, also referred to as a plurality of second original images) are converted into the plurality of first images and the plurality of second images from which the illumination unevenness has been removed (hereinafter, referred to as the plurality of first filtered images and the plurality of second filtered images).

Hereinafter, the intensity of each pixel of the plurality of first original images is referred to by $I_{o,kx,x,y}$, and the intensity of each pixel of the plurality of first filtered images is referred to by $I_{LCF,kx,x,y}$. Further, the intensity of each pixel of the plurality of second original images is referred to by $I_{o,ky,x,y}$, and the intensity of each pixel of the plurality of second filtered images is referred to by $I_{LCF,ky,x,y}$. kx represents the first image number, ky represents the second image number, x represents the row number of the pixel, and y represents the column number of the pixel.

In step S12, the control device 120 normalizes the plurality of first filtered images and the plurality of second filtered images, and converts the resultant into a plurality of first normalized images and a plurality of second normalized images having the same average intensity.

Specifically, for example, the control device 120 is required to generate the plurality of first normalized images so that each pixel of the plurality of first normalized images has intensity calculated by the following formula.

$$I_{nml,kx,x,y} = \left( \frac{n \cdot I_{ave}}{\sum_{x,y} I_{LFC,kx,x,y}} \right) I_{LFC,kx,x,y} \quad (31)$$

Here, $I_{nml,kx,x,y}$ represents the intensity of each pixel of the plurality of first normalized images. $I_{ave}$ represents average pixel intensity of the plurality of first normalized images (second normalized images). n represents the number of pixels of the first filtered image (second filtered image).

Further, the control device 120 is required to generate the plurality of second normalized images so that each pixel of the plurality of second normalized images has intensity calculated by the following formula.

$$I_{nml,ky,x,y} = \left( \frac{n \cdot I_{ave}}{\sum_{x,y} I_{LFC,ky,x,y}} \right) I_{LFC,ky,x,y} \quad (32)$$

Here, $I_{nml,kx,x,y}$ represents the intensity of each pixel of the plurality of second normalized images.

In step S13, the control device 120 combines the plurality of first normalized images with the plurality of second normalized images to generate an oblique illumination image. Specifically, for example, the control device 120 is required to generate the oblique illumination image so that each pixel of the oblique illumination image has intensity calculated by the following formula. That is, the oblique illumination image is generated such that each pixel has intensity different from background intensity by a value proportional to the sum of differences between pixel intensities of the plurality of normalized images (first normalized image and second normalized image) and the pixel average intensity.

$$I_{dm,x,y} = A\left( \sum_{kx=1}^{N_x} |I_{nml,kx,x,y} - I_{ave}| + \sum_{ky=1}^{N_y} |I_{nml,ky,x,y} - I_{ave}| \right) + I_{bg} \quad (33)$$

Here, $I_{dm,x,y}$ represents the intensity of each pixel of the oblique illumination image. $I_{bg}$ represents the background intensity. A represents a contrast adjustment value. $N_x$ represents the number of first normalized images. $N_y$ represents the number of second normalized images.

The image processing described above is performed, so that the contrast generated in the plurality of first original images and the contrast generated in the plurality of second original images are substantially added up. Therefore, in the present embodiment also, it is possible to generate an oblique illumination image having high contrast such as an image M8 illustrated in FIG. 35A or an image M9 illustrated in FIG. 35B. Further, in the present embodiment, an image obtained with illumination from the X direction is combined with an image obtained with illumination from the Y direction to thereby obtain an oblique illumination image with symmetry improved as compared with the second embodiment. When A>0 is satisfied, the oblique illumination image is a positive contrast image in which the sample is represented by the bright part 32, such as the image M8. On the other hand, when A<0 is satisfied, the oblique illumination image is a negative contrast image in which the sample is represented by the dark part 33, such as the image M9.

FIGS. 36A to 36L are diagrams illustrating specific examples of a plurality of periodic light emission patterns. FIG. 37 is a table T7 illustrating parameter values of the system. FIG. 38 is a table T8 illustrating details of the plurality of first periodic light emission patterns among the plurality of periodic light emission patterns illustrated in FIGS. 36A to 36L. FIG. 39 is a table T9 illustrating details of the plurality of second periodic light emission patterns among the plurality of periodic light emission patterns illustrated in FIGS. 36A to 36L. FIGS. 40A to 40F are graphs for explaining an illumination state on a specimen surface in each of the plurality of first periodic light emission patterns illustrated in FIGS. 36A to 36L. FIG. 41 is a table T10 illustrating applicability of a predetermined condition regarding the first periodic light emission pattern of the system. FIG. 42 is a table T11 illustrating applicability of a predetermined condition regarding the second periodic light emission pattern of the system.

As illustrated in FIGS. 36A to 36L, the system according to the present embodiment acquires an image while switching between 12 periodic light emission patterns (light emission pattern P43 to light emission pattern P54) at each observation position. The twelve periodic light emission patterns include six of the first periodic light emission patterns (light emission patterns P43 to P48) periodic in the X direction and six of the second periodic light emission patterns (light emission patterns P49 to P54) periodic in the Y direction. The first periodic light emission pattern has a light emitting region 63 including three fringe regions 64. The second periodic light emission pattern has a light emitting region 63 including six fringe regions 64.

Incidentally, the detailed parameters of the present system are as indicated in FIG. 37. The X-coordinates of the fringe regions 64 in each of the first periodic light emission patterns are as illustrated in FIG. 38, and the Y-coordinates of the fringe regions 64 in each of the second periodic light emission patterns are as illustrated in FIG. 39. As illustrated in FIGS. 41 and 42, the present system satisfies all of the conditional expression (19) to the conditional expression (21), the conditional expression (23), the conditional expression (26) to the conditional expression (28), and the conditional expression (30).

The second light emission pattern control is executed under the above conditions, and thereby, the region where the oblique illumination is achieved is moved in the X direction every time the first periodic light emission pattern is switched, and all the first periodic light emission patterns are executed, so that the entire container is covered as the region where the oblique illumination is achieved, and further, the region where the oblique illumination is achieved is moved in the Y direction every time the second periodic light emission pattern is switched, and all the second periodic light emission patterns are executed, so that the entire container is covered as the region where the oblique illumination is achieved. FIGS. 40A to 40F illustrate the movement in the X direction described above. How to view the graphs of FIGS. 40A to 40F is similar to that for the graphs of FIGS. 29A to 29F. As a result, an arbitrary observation position can be observed with good contrast.

According to the present system also, similarly to the system of the embodiment described above, since the oblique illumination is achieved regardless of the observation position, it is possible to observe the sample in a large area of the container with high contrast. In addition, the present system is similar to the system according to the second embodiment in that it is not necessary to change the control content for each observation position and high robustness can be realized. Further, the system according to the present embodiment enables obtaining an image with higher symmetry than the system according to the embodiment described above.

Fourth Embodiment

Figure 43:
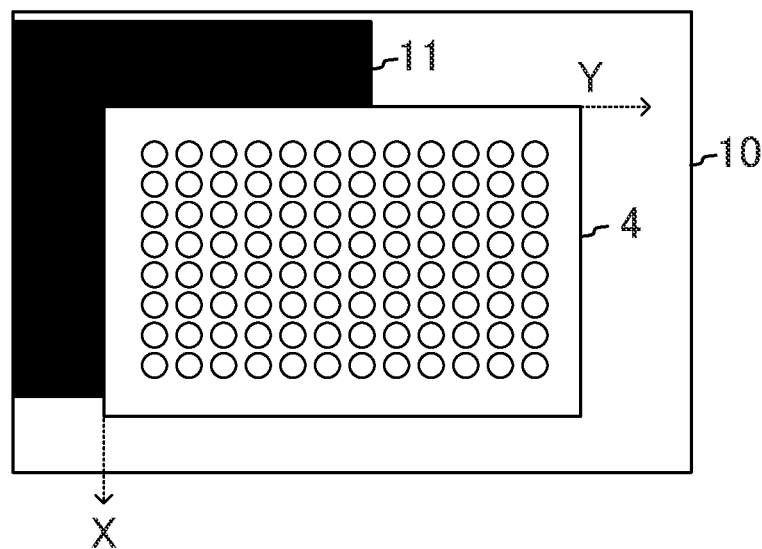
FIG. 43 is an explanatory view for a container used in a fourth embodiment.
Figure 44:
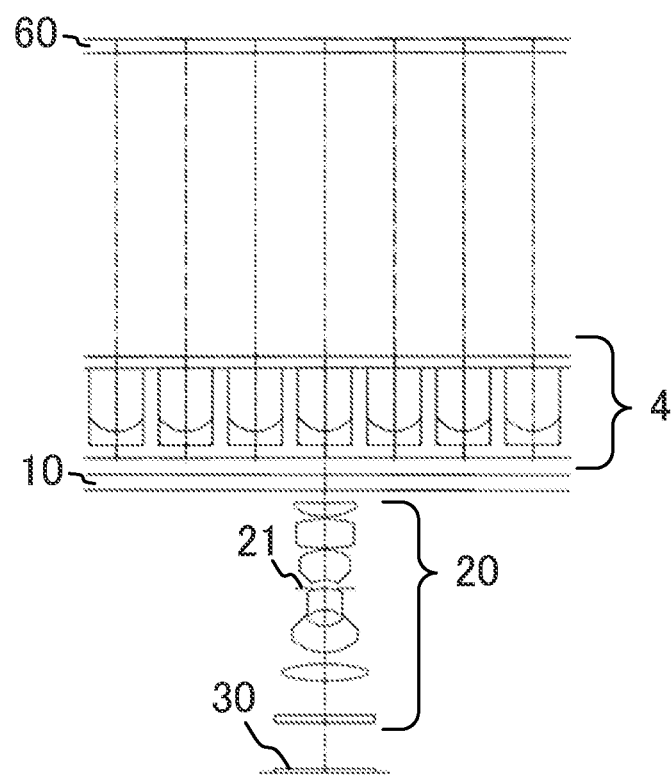
FIG. 44 is a cross-sectional view of an observation optical system, a container, and a light source in a cross section along an optical axis of the observation optical system.
Figure 46D:
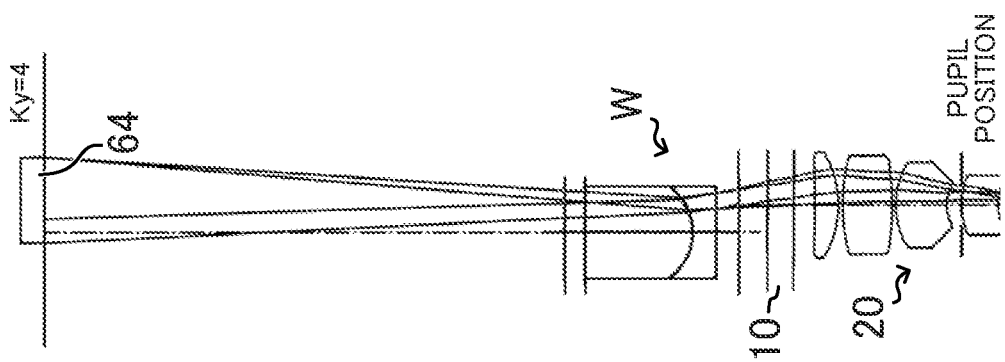
FIGS. 46A to 46D are light ray diagrams of light incident on a well from a fringe light emitting region in a second periodic light emission pattern.
Figure 46C:
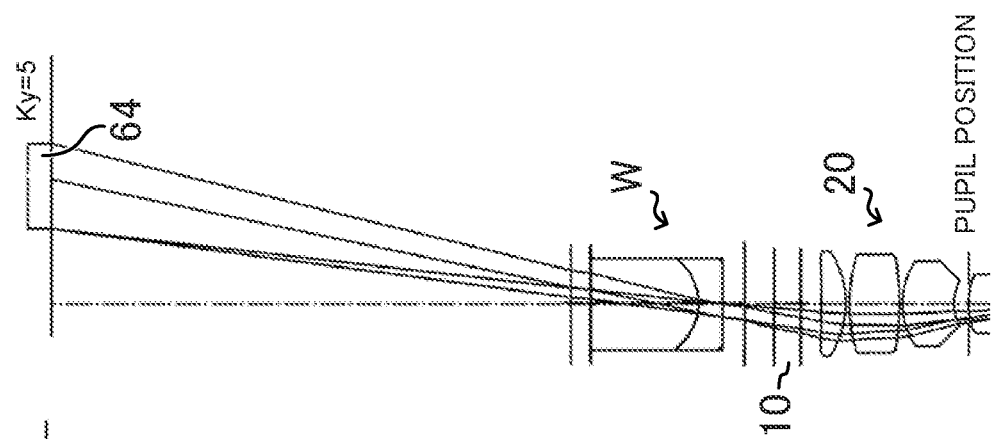
Figure 46B:
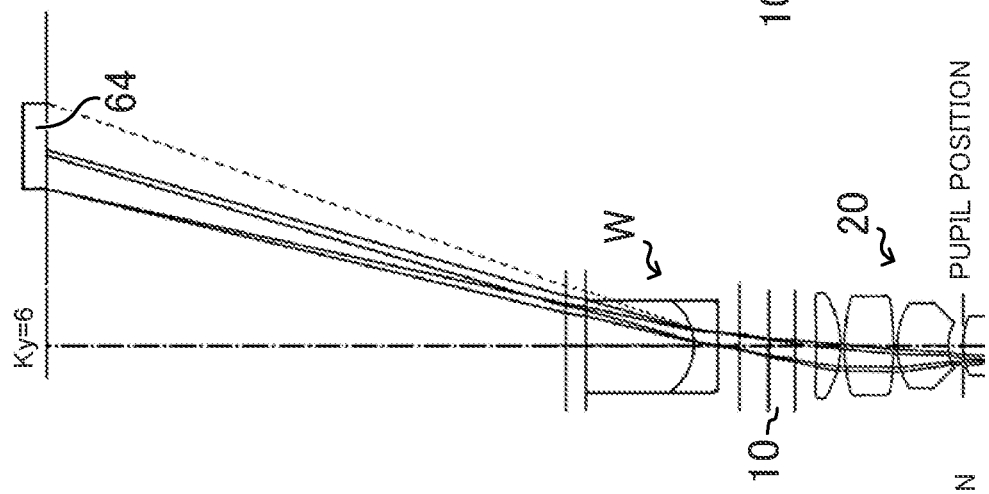
Figure 46A:
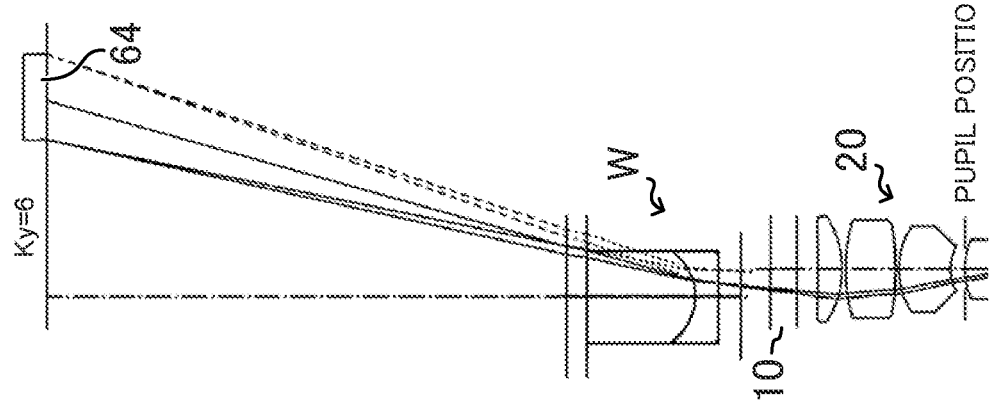
Figure 47C:
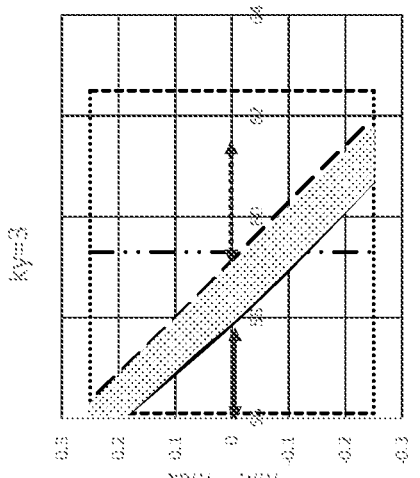
FIGS. 47A to 47F are graphs for explaining an illumination state on a specimen surface in each of a plurality of second periodic light emission patterns.
Figure 47D:
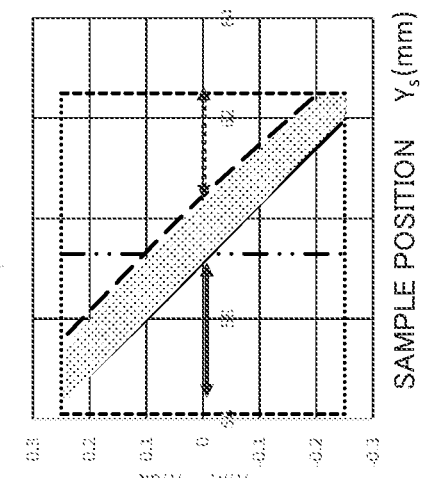
Figure 47B:
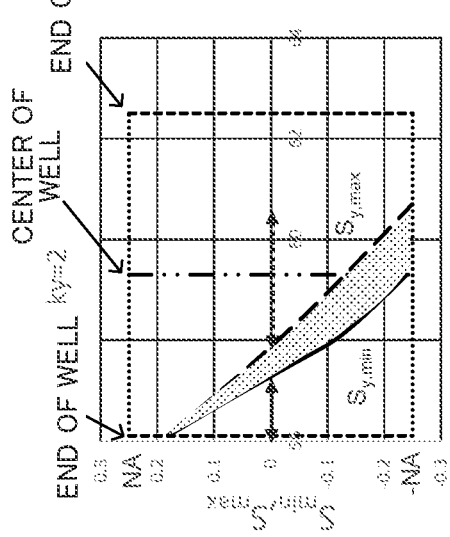
Figure 47E:
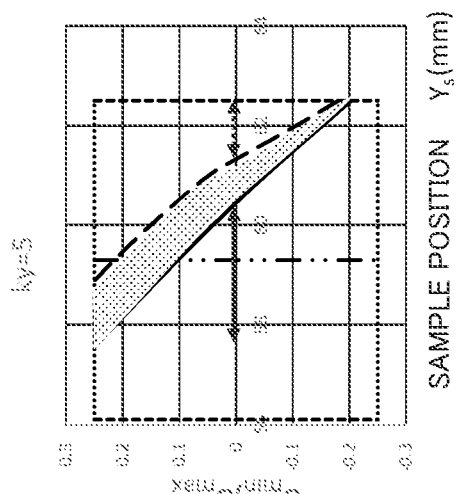
Figure 47A:
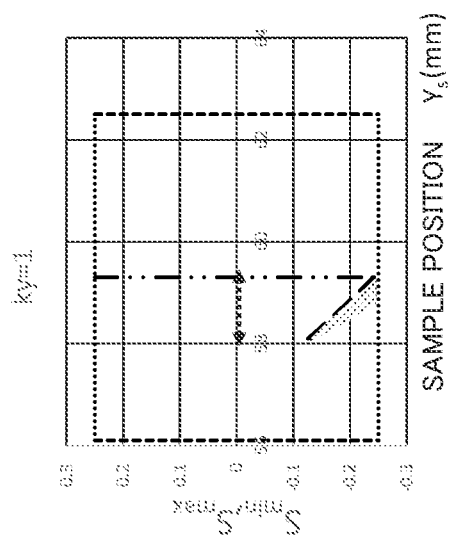
Figure 47F:
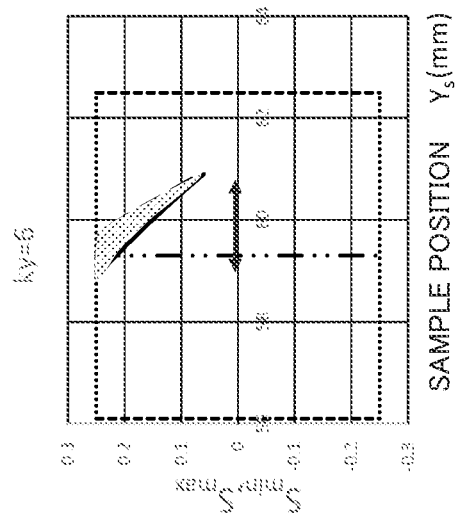
Figure 48A:
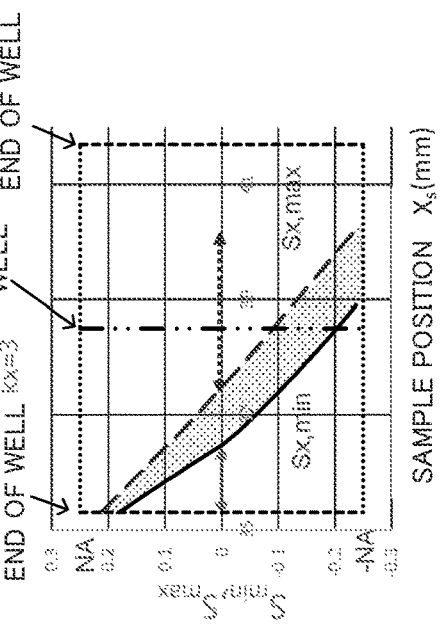
FIGS. 48A to 48F are graphs for explaining an illumination state on a specimen surface in each of a plurality of first periodic light emission patterns.
Figure 48B:
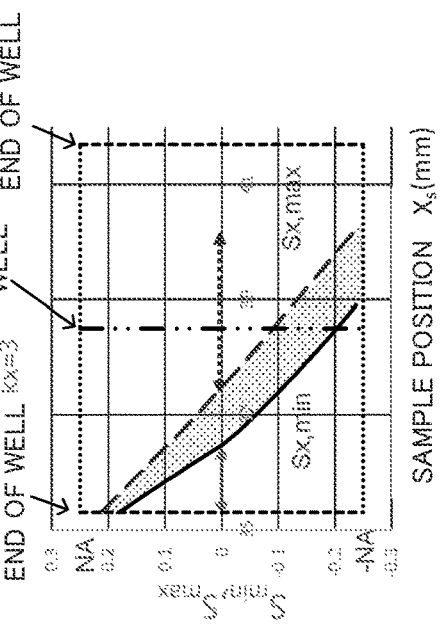
Figure 48C:
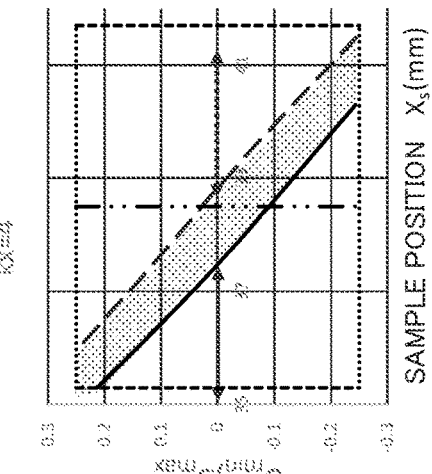
Figure 48D:
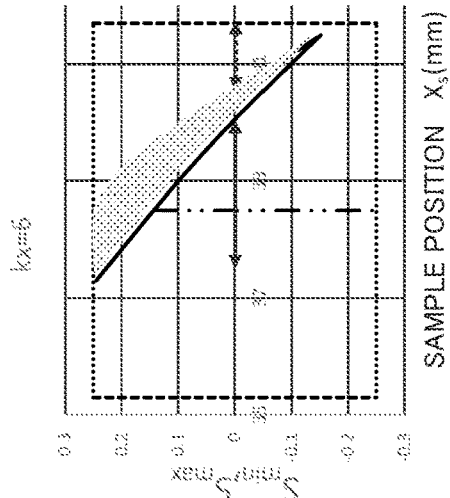
Figure 48E:
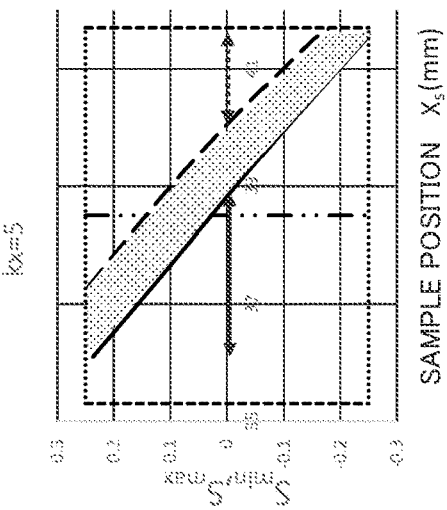
Figure 48F:
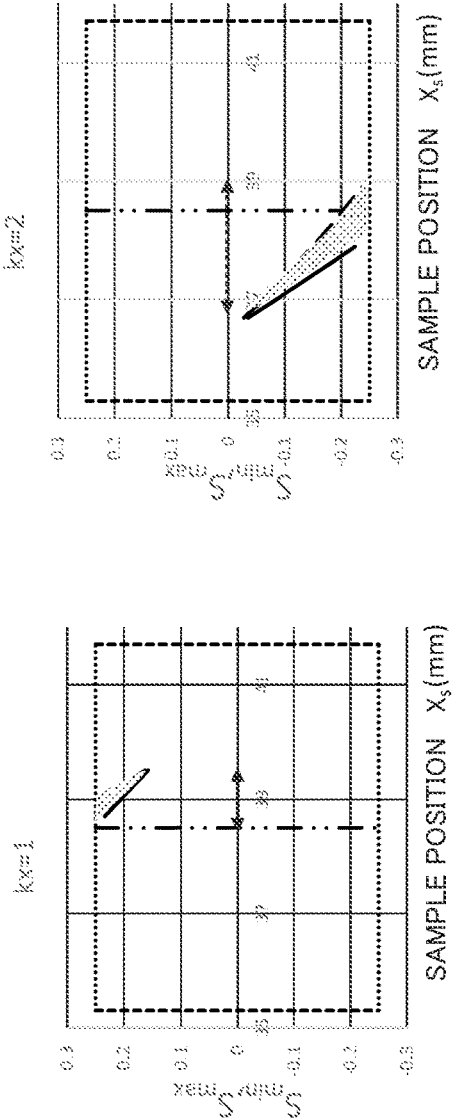

FIG. 43 is an explanatory view for a container used in the present embodiment. FIG. 44 is a cross-sectional view of an observation optical system, a container, and a light source in a cross section along an optical axis of the observation optical system. The system according to the present embodiment (hereinafter, simply referred to as the present system) is different from the system according to the third embodiment in that a container 4 which is a microplate illustrated in FIGS. 43 and 44 is used instead of the container 2 which is a petri dish. The other points including the control of the illumination pattern are similar to those of the system according to the third embodiment. The container 4 is a 96 well microplate in which the well top diameter is 7 mm, the well bottom diameter is 6.45 mm, and the center-to-center distance of the wells is 9 mm.

Figure 49:
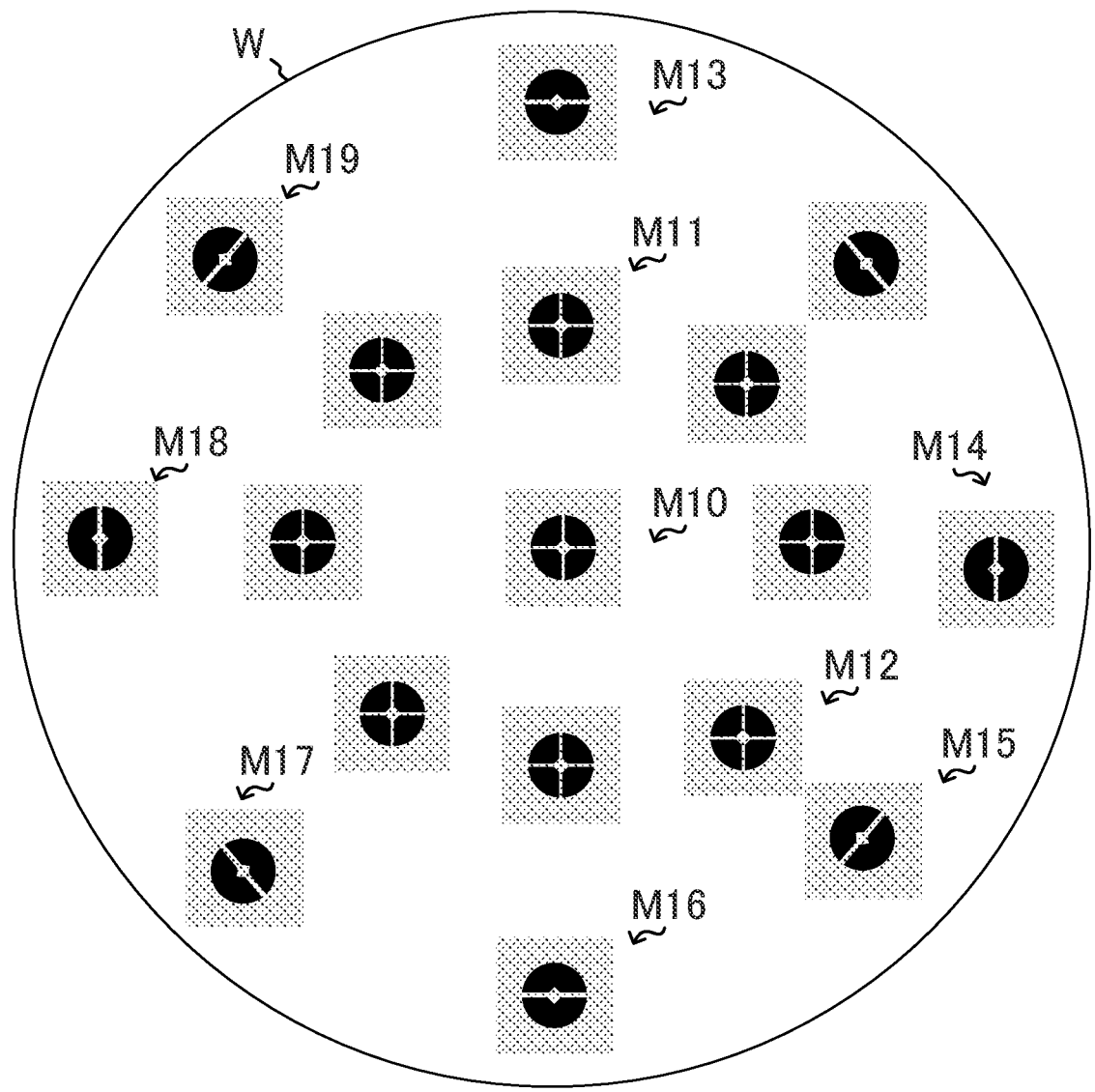
FIG. 49 is an explanatory view for contrast of an oblique illumination image generated for each position in a well.

FIGS. 45A to 45D and FIGS. 46A to 46D are light ray diagrams of light incident on a well from a fringe light emitting region in the second periodic light emission pattern. More specifically, a state for a case where the well center coordinates (X, Y)=(38.1, 59.3) are set as the observation position is exemplified. FIGS. 47A to 47F are graphs for explaining an illumination state on a specimen surface in each of a plurality of second periodic light emission patterns. FIGS. 48A to 48F are graphs for explaining an illumination state on a specimen surface in each of a plurality of first periodic light emission patterns. FIG. 49 is an explanatory view for contrast of an oblique illumination image generated for each position in a well.

With reference to FIGS. 45A to 45D and FIGS. 46A to 46D, the following influences can be confirmed in the 96 well microplate: the illumination light is vignetted on the wall surface of the well (light rays indicated by broken lines) and the illumination light due to the surface tension of a culture solution is greatly bent on the liquid surface. As a result, as illustrated in FIGS. 47A to 47F, the illumination region 22 (that is, $S_{min}$ and $S_{max}$) on the pupil plane is not moved regularly according to the switching between the second periodic light emission patterns, and widens or narrows. Accordingly, the region in which the oblique illumination is achieved is not regularly changed according to the switching between the second periodic light emission patterns. However, although the regularity is disturbed in this way, it is possible to achieve the oblique illumination in the entire region from the negative end to the positive end of the well by switching between the plurality of second periodic light emission patterns. Regarding the X direction also, as illustrated in FIGS. 48A to 48F, it is possible to achieve the oblique illumination in the entire region from the negative end to the positive end of the well by switching between the plurality of first periodic light emission patterns.

Therefore, according to the present system, unlike the conventional system, even in a container having a narrow housing portion such as the 96 well microplate, an arbitrary observation position can be observed with good contrast without causing an unobservable position. In the vicinity of the well end (well peripheral portion), the illumination light on the wall of the well W is disturbed and uneven in the illumination direction due to the vignetting or the curvature of the liquid surface. As a result, as illustrated in FIG. 49, in the images (images M13 to M19) acquired in the well peripheral portion, the direction in which the contrast is applied is limited as compared with the images (images M10 to M12) acquired in the central portion. However, an image can be acquired with high contrast over the entire circumference of the well W, which is a great advantage compared to the conventional system.

Fifth Embodiment

Figure 50:
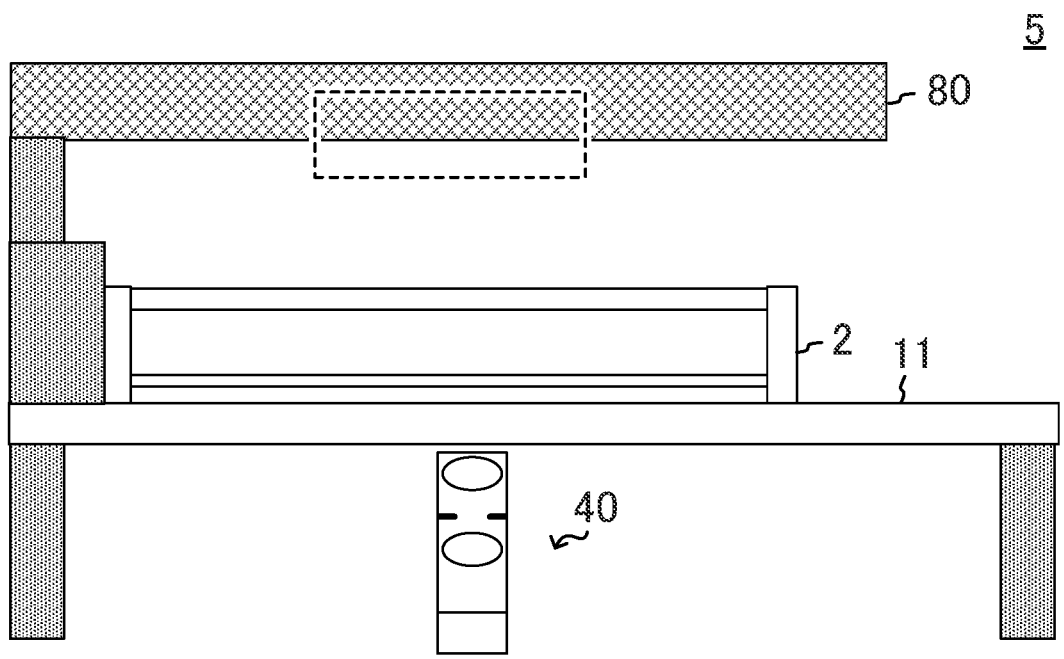
FIG. 50 is an explanatory view for the configuration of an observation device according to a fifth embodiment.
Figure 51:
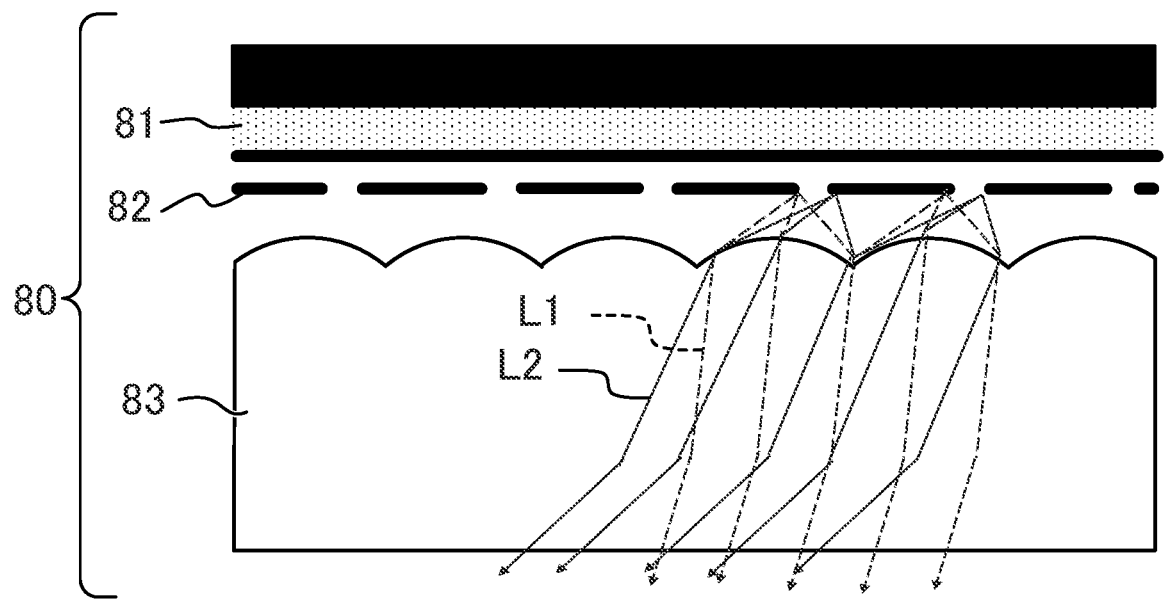
FIG. 51 is an explanatory view for the configuration of a light emitting unit.
Figure 52:
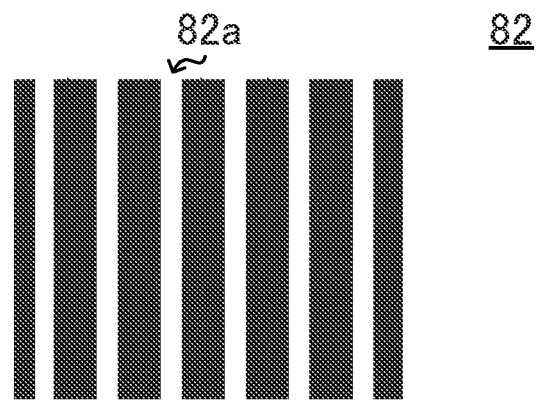
FIG. 52 is an explanatory view for the configuration of a slit plate.
Figure 53:
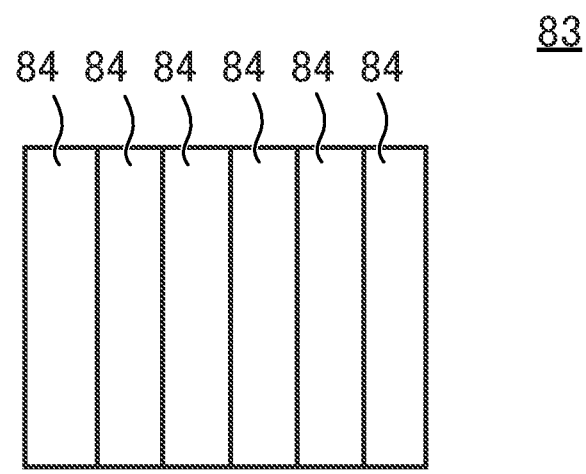
FIG. 53 is an explanatory view for the configuration of a lenticular lens.

FIG. 50 is an explanatory view for the configuration of an observation device according to the present embodiment. FIG. 51 is an explanatory view for the configuration of a light emitting unit. FIG. 52 is an explanatory view for the configuration of a slit plate. FIG. 53 is an explanatory view for the configuration of a lenticular lens. Hereinafter, the configuration of the system according to the present embodiment will be described with reference to FIGS. 50 to 53. The system according to the present embodiment is different from the systems according to the other embodiments described above in that an observation device 5 illustrated in FIG. 50 is included instead of the observation device 1, and in that the control device 120 does not perform the spatial light emission pattern control.

As illustrated in FIG. 50, the observation device 5 is different from the observation device 1 in that a light emitting unit 80 is provided instead of the surface light source 60. The observation device 5 is similar to the observation device 1 in the other respects. Specifically, the observation unit 40 and the conveyance mechanism 50 (not illustrated) are arranged in one of two regions divided by the mounting table 11, and the light emitting unit 80 is arranged in the other region.

As illustrated in FIG. 51, the light emitting unit 80 includes a surface light source 81, a slit plate 82, and a lenticular lens 83. The slit plate 82 is disposed between the surface light source 81 and the lenticular lens 83, and the lenticular lens 83 is disposed between the surface light source 81 and the mounting table 11. FIG. 51 illustrates the configuration of a region indicated by a broken line in FIG. 50.

The surface light source 81 is any light source having a light emitting plane, and may be, for example, a display device having a plurality of pixels, similarly to the surface light source 60 described above. As illustrated in FIG. 52, the slit plate 82 has rectangular openings 82a in a certain direction (first direction, for example, Y direction) at regular intervals. The surface light source 81 and the slit plate 82 included in the light emitting unit 80 constitute a periodic light emission pattern forming unit that forms a light emitting region including a plurality of fringe regions aligned in the first direction at regular intervals on the emission surface. As illustrated in FIG. 53, the lenticular lens 83 includes a plurality of cylindrical lens elements 84 aligned in the first direction at the same intervals as the plurality of fringe regions formed by the periodic light emission pattern forming unit.

In the observation device 5, the plurality of fringe regions (openings 82a) and the cylindrical lens elements 84 are appropriately set, which allows the illumination light emitted from the openings 82a of the slit plate 82 to be emitted at substantially the same angle for each position of the opening 82a by the lenticular lens 83, as illustrated in FIG. 51. Light beam L1 in FIG. 51 indicates the light beam of the illumination light emitted from the negative end of the opening 82a, and light beam L2 indicates the light beam of the illumination light emitted from the positive end of the opening 82a.

Therefore, the observation device 5 can achieve the oblique illumination under substantially the same conditions in a large area of the container, and can obtain an image with high contrast regardless of the observation position. In the observation device 5, the oblique illumination under substantially the same conditions is achieved for each height at various sample heights. Therefore, even when various containers having different heights of the bottom surface 3 are used, it is possible to obtain an image with high contrast regardless of the observation position.

Figure 54:
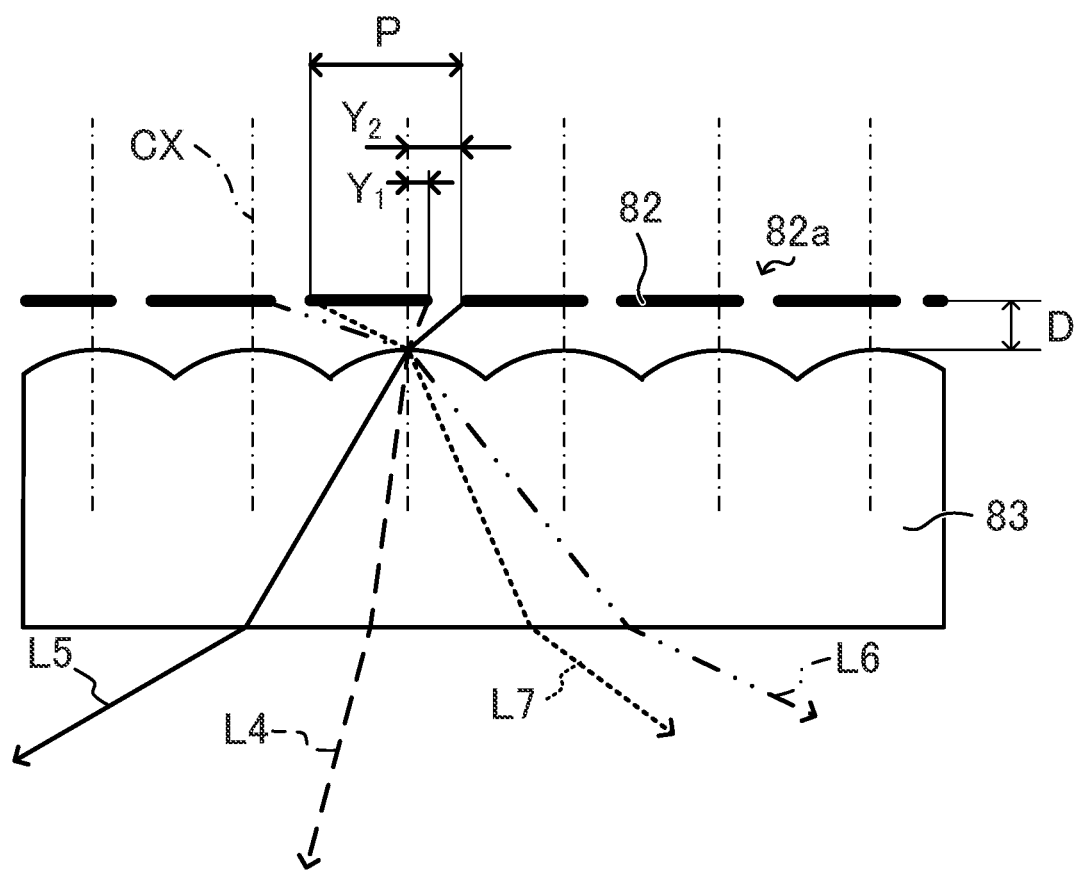
FIG. 54 is an explanatory view for parameters of a light emitting unit.

FIG. 54 is an explanatory view for parameters of a light emitting unit. FIGS. 55A to 55D are explanatory views for a relationship between a focal length of a lenticular lens and emitted light. Hereinafter, conditions that are desirably satisfied by the observation device 5 will be described with reference to FIGS. 54 and 55A to 55D.

First, the definition of parameters of the observation device 5 will be described. NA represents the numerical aperture on the object side of the observation optical system 20. D represents the air-converted length of a distance between the emission surface of the slit plate 82 and the lenticular lens 83. More specifically, D represents the air-converted length of a distance between the emission surface and the surface top of the cylindrical lens element 84. P represents a pitch of the plurality of openings 82a, and also represents a pitch of the plurality of cylindrical lens elements 84. In other words, P represents a pitch of the plurality of fringe regions. $Y_1$ represents the shortest distance in the first direction (Y direction, in this case) between a curved surface central axis CX of the cylindrical lens element 84 and the fringe region closest to the cylindrical lens element 84. $Y_2$ represents the maximum distance in the first direction between the curved surface central axis CX of the cylindrical lens element 84 and the fringe region closest to the cylindrical lens element 84.

In this case, a Y coordinate $Y_{ax,N}$ of the curved surface central axis CX of each cylindrical lens element 84 of the lenticular lens 83 and an effective range $Y_{ef,N}$ of each cylindrical lens element 84 in the Y direction are defined by the following formulas. Here, N is an arbitrary integer. $Y_{ax0}$ represents a Y coordinate of the curved surface central axis CX of the reference cylindrical lens element 84.

$$Y_{ax,N} = N \cdot P + Y_{ax0} \quad (34)$$

$$Y_{ax,N} - P/2 < Y_{ef,N} < Y_{ax,N} + P/2 \quad (35)$$

The range of the N-th fringe region in the Y direction is expressed by the following formula for each of the case of applying the oblique illumination from the positive side and the case of applying the oblique illumination from the negative side.

(Oblique Illumination from Negative Side)

$$Y_{ax,N}+Y_2 \leq Y_{ILL,N} \leq Y_{ax,N}+Y_1 \quad (36)$$

(Oblique Illumination from Positive Side)

$$Y_{ax,N}+Y_1 \leq Y_{ILL,N} \leq Y_{ax,N}+Y_2 \quad (37)$$

The observation device 5 desirably satisfies the following conditional expression.

$$0 < |Y_1| < \frac{D \cdot NA}{\sqrt{1-NA^2}} \quad (38)$$

As a result, the illumination light from the fringe region enters at least the pupil plane. In a case where the absolute value of $Y_1$ exceeds the upper limit value, the illumination light does not enter the pupil of the observation optical system 20, and all the illumination light is vignetted, so that the oblique illumination is not achieved. In a case where the absolute value of $Y_1$ is less than the lower limit value, the effect of the oblique illumination is reduced, leading to the reduction in contrast of the image.

It is desirable that the present system further satisfies the following conditional expression.

$$\frac{D \cdot NA}{\sqrt{1-NA^2}} < |Y_2| < P - \frac{D \cdot NA}{\sqrt{1-NA^2}} \quad (39)$$

As a result, the illumination light from the fringe region is distributed across the outer edge of the pupil. In a case where the absolute value of $Y_2$ exceeds the upper limit value, the illumination light from the adjacent fringe region (opening 82a) enters the pupil of the observation optical system 20. In this case, since the incident direction of the illumination light is opposite to the normal direction, the contrast of the image is reduced. In a case where the absolute value of $Y_2$ is less than the lower limit value, the entire illumination light from the fringe region falls within the pupil of the observation optical system 20. Therefore, good oblique illumination is not obtained, and the image does not have a sufficient contrast.

It is desirable that the observation device 5 further satisfies the following conditional expression. $F_1$ represents a focal length of the lenticular lens.

$$0.5 < \frac{D}{F_I} < 1 \quad (40)$$

The focal length of the lenticular lens 83 is defined by the following formula. R represents a radius of curvature of the cylindrical surface of the cylindrical lens element 84. n represents a refractive index of the lenticular lens 83.

$$F_I = \frac{R}{n-1} \quad (41)$$

Figure 55A:
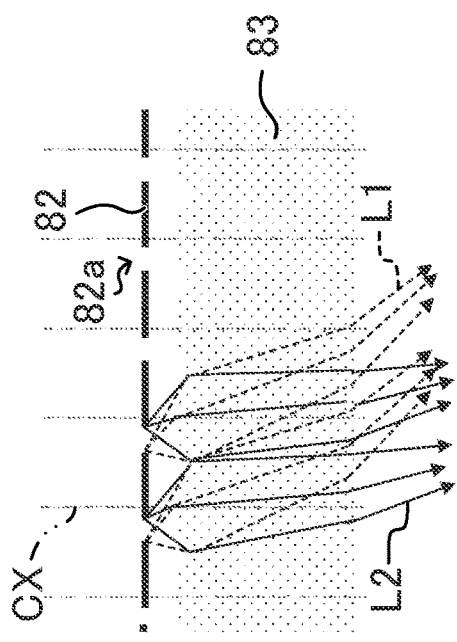
FIGS. 55A to 55D are explanatory views for a relationship between a focal length of a lenticular lens and emitted light.
Figure 55B:
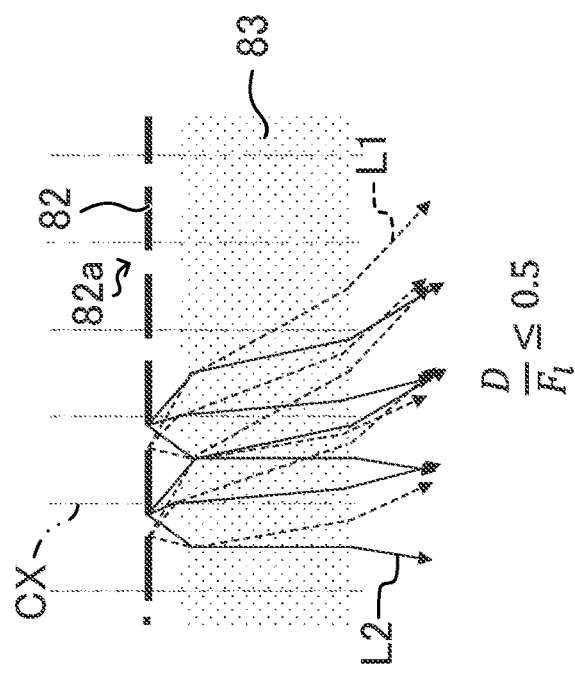
Figure 55C:
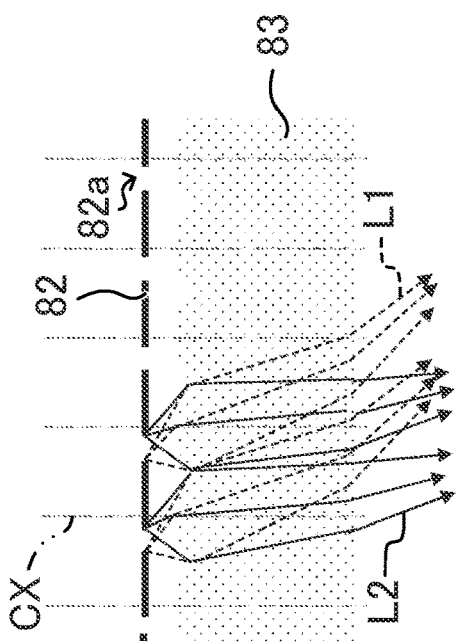
Figure 55D:
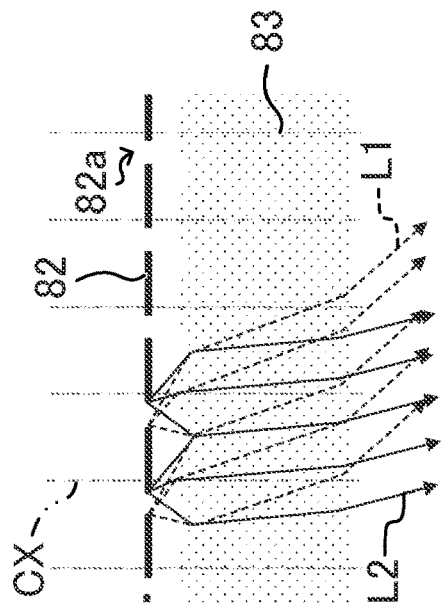

As a result, excessive convergence and divergence of the light flux of the illumination light from the fringe region can be avoided. As illustrated in FIG. 55A, in a case where $D/F_1$ exceeds the upper limit value, the power of the lenticular lens 83 becomes too strong, so that the light flux converges and the illumination state varies depending on the observation position. As illustrated in FIG. 55D, in a case where $D/F_1$ is less than the lower limit value, the power of the lenticular lens 83 becomes too weak, so that the light flux diverges, and in this case also, the illumination state varies depending on the observation position. On the other hand, as illustrated in FIGS. 55B and 55C, excessive convergence and divergence of the illumination light flux can be avoided by satisfying the conditional expression, which realizes a stable illumination state regardless of the observation position.

Figure 56:
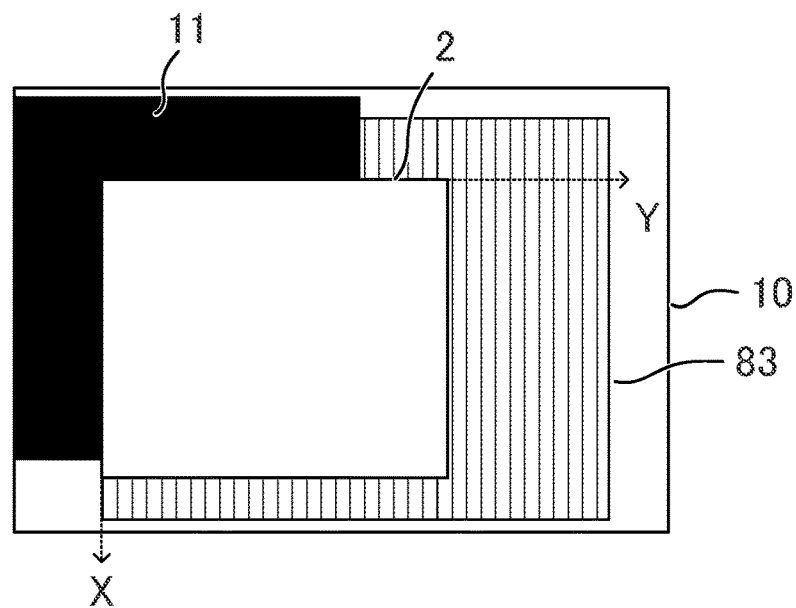
FIG. 56 is an explanatory view for an arrangement relationship between a container and a lenticular lens.
Figure 57:
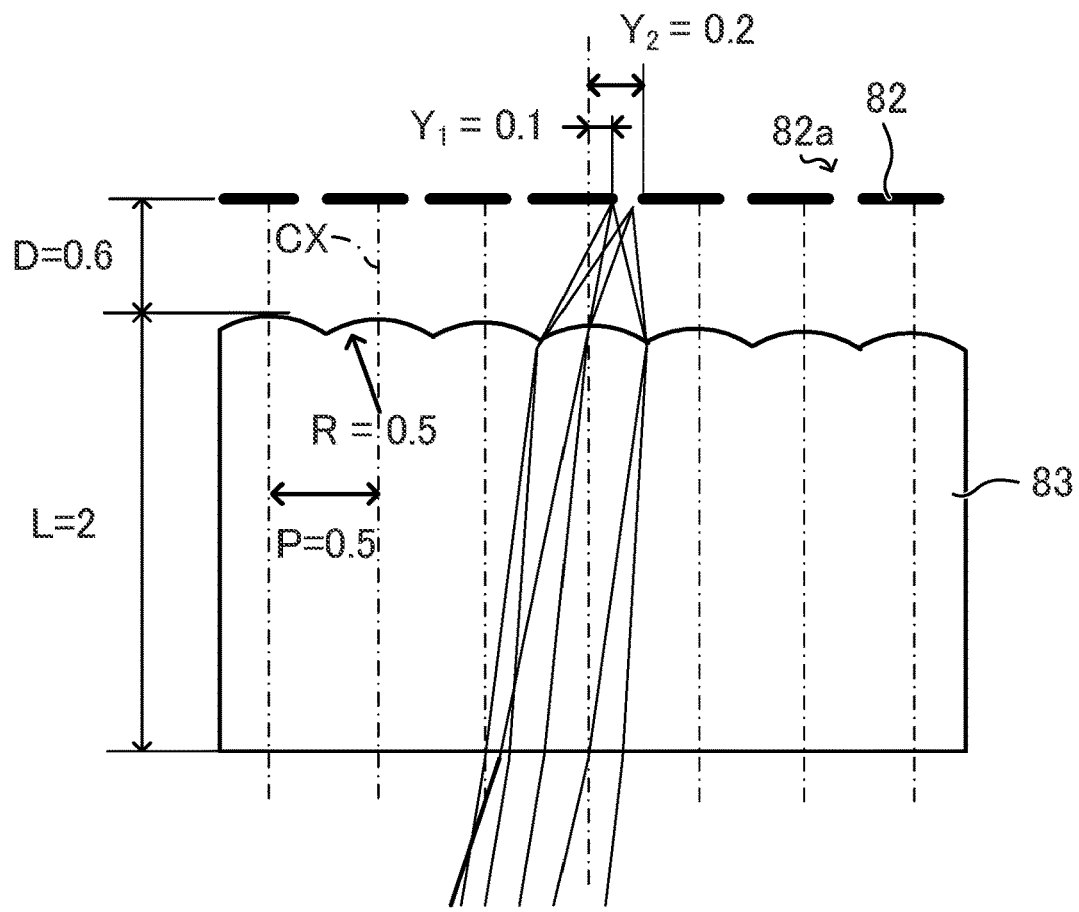
FIG. 57 is a diagram illustrating specific parameter values of a light emitting unit.
Figures 58, 59:
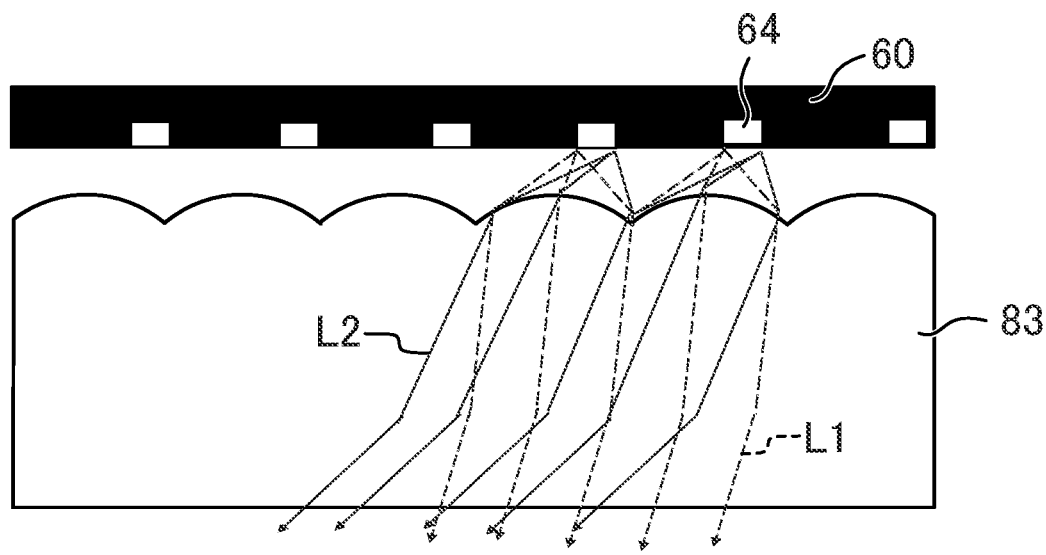
FIG. 58 is a table illustrating applicability of a predetermined condition of an observation device.
FIG. 59 is an explanatory view for the configuration of a light emitting unit of an observation device according to a sixth embodiment.

FIG. 56 is an explanatory view for an arrangement relationship between a container and a lenticular lens. FIG. 57 is a diagram illustrating specific parameter values of a light emitting unit. FIG. 58 is a table T12 illustrating applicability of a predetermined condition of the observation device 5.

As illustrated in FIG. 56, the observation device 5 according to the present embodiment is provided with the lenticular lens 83 over an area larger than the region where the container 2 is disposed. Further, detailed parameters of the observation device 5 are as follows. β represents a magnification of the observation optical system 20. L represents a distance between the surface top of the lenticular lens 83 and the lower plane thereof.

NA=0.25, β=2.2, H=70 mm, D=0.6 mm, P=0.5 mm, $Y_1$=0.1 mm, $Y_2$=0.2 mm, R=0.5 mm, L=2 mm, n=1.493, $F_1$=1.014 mm.

As illustrated in FIG. 58, the observation device 5 satisfies all of the conditional expressions (38) to (40). Therefore, almost uniform oblique illumination is realized regardless of the observation position. According to the observation device 5 and the present system also, similarly to the system of the embodiment described above, since the oblique illumination is achieved regardless of the observation position, it is possible to observe the sample in a large area of the container with high contrast. Further, according to the observation device 5 and the present system, the control device 120 does not control the light emission pattern, and it is possible to obtain an image with high contrast at an arbitrary observation position.

Sixth Embodiment

FIG. 59 is an explanatory view for the configuration of a light emitting unit of an observation device according to the present embodiment. FIGS. 60A to 60D are explanatory views for a state change in emitted light according to a position of a fringe region. As illustrated in FIG. 59, a system according to the present embodiment (hereinafter, simply referred to as the present system) is different from the system according to the fifth embodiment in that the light emitting unit 80 of the observation device 5 includes the surface light source 60 instead of the surface light source 81 and the slit plate 82, and the control device 120 executes second light emission pattern control.

Also in the present system, similarly to the system according to the fifth embodiment, a light emitting region including a plurality of fringe regions 64 aligned in the first direction (Y direction) at regular intervals is formed on the front side of the lenticular lens 83. The present system is different from the system according to the fifth embodiment in that the second light emission pattern control is performed by gradually moving the fringe regions 64 in the first direction.

Figure 60:
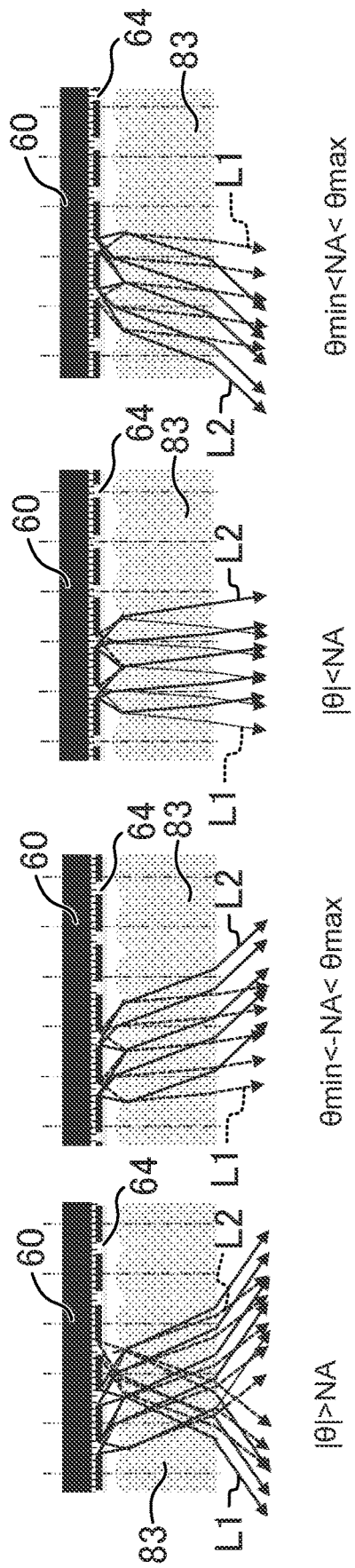
FIGS. 60A to 60D are explanatory views for a state change in emitted light according to a position of a fringe region.

When the fringe regions 64 are moved on the front side of the lenticular lens 83, the illumination state changes depending on the positions of the fringe regions 64 as illustrated in FIGS. 60A to 60D. Specifically, a dark field illumination state as illustrated in FIG. 60A, a negative side oblique illumination state as illustrated in FIG. 60B, a bright field illumination state as illustrated in FIG. 60C, and a positive side oblique illumination state as illustrated in FIG. 60D occur in order. Accordingly, a plurality of images acquired in the plurality of illumination states is used to perform image processing similar to that of the second embodiment, which enables an oblique illumination image with high contrast to be obtained.

Figure 61:
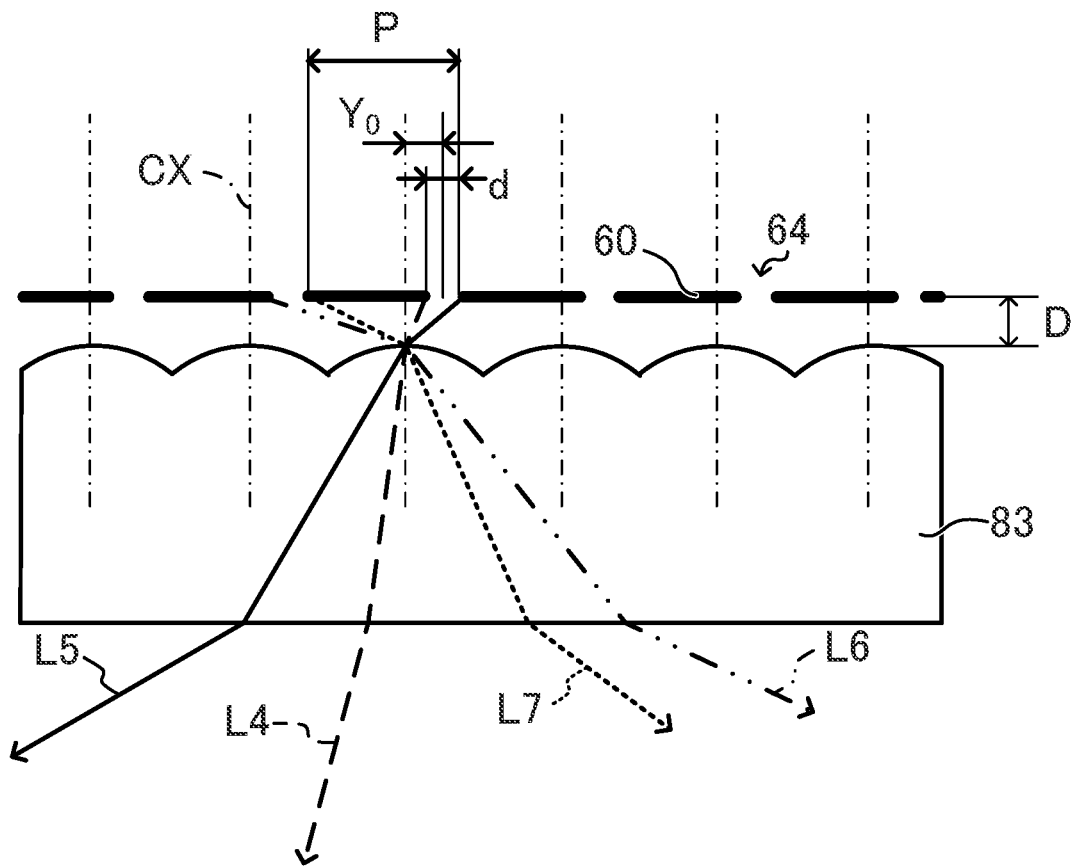
FIG. 61 is an explanatory view for parameters of a light emitting unit.

FIG. 61 is an explanatory view for parameters of a light emitting unit. Hereinafter, conditions that are desirably satisfied by the present system will be described with reference to FIG. 61.

First, the definition of parameters of the present system will be described. In the present system, $Y_0$ and d are defined instead of $Y_1$ and $Y_2$. $Y_0$ represents a distance between the curved surface central axis CX of the cylindrical lens element 84 and the center of the fringe region. $Y_0$ is particularly referred to as $Y_{0+}$ when positioned on the positive side with respect to the curved surface central axis CX, and is particularly referred to as $Y_{0-}$ when positioned on the negative side with respect to the curved surface central axis CX. d represents a width of each of the plurality of fringe regions.

In this case, a Y coordinate $Y_{ax,N}$ of the curved surface central axis CX of each cylindrical lens element 84 of the lenticular lens 83 and an effective range $Y_{ef,N}$ of each cylindrical lens element 84 in the Y direction are as described in the fifth embodiment.

The range of the N-th fringe region in the Y direction is expressed by the following formula for each of the case of applying the oblique illumination from the positive side and the case of applying the oblique illumination from the negative side.

(Oblique Illumination from Positive Side)

$$Y_{ax,N}+Y_{0+}-d/2 \leq Y_{ILL,N} \leq Y_{ax,N}+Y_{0+}+d/2 \quad (42)$$

(Oblique Illumination from Negative Side)

$$Y_{ax,N}+Y_{0-}-d/2 \leq Y_{ILL,N} \leq Y_{ax,N}+Y_{0-}+d/2 \quad (43)$$

It is desirable that the present system further satisfies the following conditional expression.

$$0 < d < P - \frac{D \cdot NA}{\sqrt{1-NA^2}} \quad (44)$$

Accordingly, by appropriately setting $Y_0$, it is possible to realize the oblique illumination while preventing the light from the adjacent fringe region from entering the pupil of the observation optical system 20. In a case where d exceeds the upper limit value, the illumination light from the adjacent fringe region enters the pupil of the observation optical system 20 even if the oblique illumination is achieved by the illumination light from the fringe region. Since the incident direction of the illumination light from the adjacent fringe region is opposite to the normal direction, the contrast of the image is reduced. In a case where d is less than the lower limit value, no illumination light is generated.

Further, in the present system, it is desirable that the following conditional expressions are satisfied in a case where the oblique illumination is applied from the positive side and in a case where the oblique illumination is applied from the negative side.

$$\frac{D \cdot NA}{\sqrt{1-NA^2}} - \frac{d}{2} < Y_{0+} < \frac{D \cdot NA}{\sqrt{1-NA^2}} + \frac{d}{2} \quad (45)$$

$$\frac{-D \cdot NA}{\sqrt{1-NA^2}} - \frac{d}{2} < Y_{0-} < \frac{-D \cdot NA}{\sqrt{1-NA^2}} + \frac{d}{2} \quad (46)$$

As a result, the oblique illumination can be realized. In a case where $Y_{0+}$ exceeds the upper limit value or in a case where $Y_{0-}$ is less than the lower limit value, no illumination light enters the pupil and the oblique illumination is not achieved. In a case where $Y_{0+}$ is less than the lower limit value or in a case where $Y_{0-}$ exceeds the upper limit value, all the illumination light from the fringe regions falls within the pupil, so that the effect of the oblique illumination decreases and the contrast of the image decreases.

Further, in the present system, it is desirable that the following conditional expressions are satisfied in a case where the oblique illumination is applied from the positive side and in a case where the oblique illumination is applied from the negative side.

$$\frac{d}{2} < Y_{0+} < P - \frac{D \cdot NA}{\sqrt{1-NA^2}} - \frac{d}{2} \quad (47)$$

$$-P + \frac{D \cdot NA}{\sqrt{1-NA^2}} + \frac{d}{2} < Y_{0-} < -\frac{d}{2} \quad (48)$$

As a result, it is possible to prevent the illumination light from the adjacent fringe region from entering the pupil. In a case where $Y_{0+}$ exceeds the upper limit value or in a case where $Y_{0-}$ is less than the lower limit value, illumination light from the adjacent fringe region enters the pupil. Since the incident direction of the illumination light from the adjacent fringe region is opposite to the normal direction, the contrast of the image is reduced. In a case where $Y_{0+}$ is less than the lower limit value or in a case where $Y_{0-}$ exceeds the upper limit value, the illumination light spreads across the pupil center of the observation optical system 20, so that the oblique illumination is not achieved and the image does not have contrast.

It is desirable that the present system further satisfies the following conditional expression. The meaning of the formula is similar to that of the fifth embodiment.

$$0.5 < \frac{D}{F_l} \leq 1 \quad (49)$$

Figure 62:
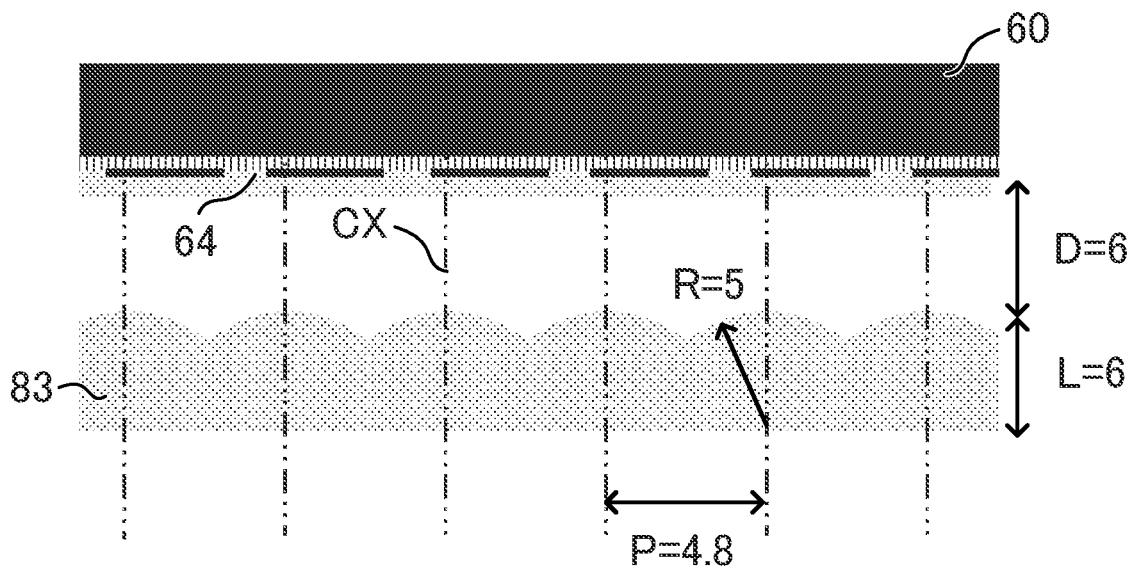
FIG. 62 is a diagram illustrating specific parameter values of a light emitting unit.
Figure 63A:
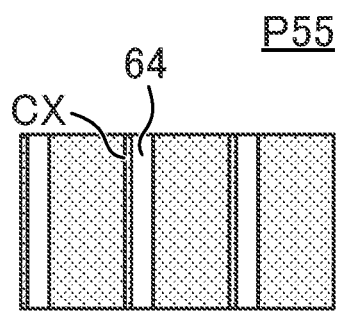
FIGS. 63A to 63F are diagrams illustrating specific examples of a plurality of periodic light emission patterns.
Figure 63B:
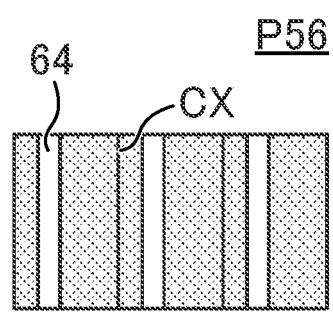
Figure 63C:
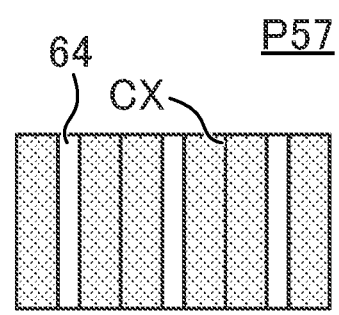
Figure 63F:
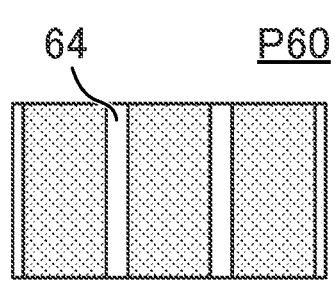
Figure 63E:
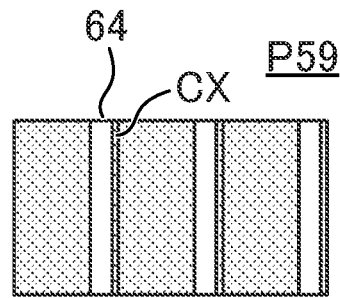
Figure 63D:
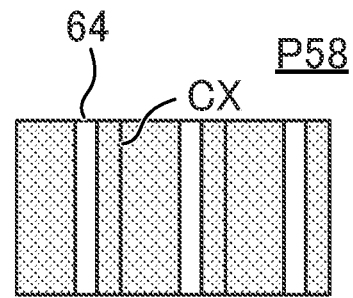

FIG. 62 is a diagram illustrating specific parameter values of a light emitting unit. FIGS. 63A to 63F are diagrams illustrating specific examples of a plurality of periodic light emission patterns. FIG. 64 is a table T13 illustrating applicability of a predetermined condition of a system in the periodic light emission patterns.

Detailed parameters of the system according to the present embodiment are as follows. β represents a magnification of the observation optical system 20.

NA=0.25, β=2.2, H=70 mm, D=6 mm, P=4.8 mm, d=1 mm, R=5 mm, L=6 mm, n=1.493, $F_1$=1.014 mm.

As illustrated in FIGS. 63A to 63F, the system according to the present embodiment acquires an image while switching between six periodic light emission patterns (light emission pattern P55 to light emission pattern P60) at each observation position. Each of the periodic light emission patterns has a light emitting region 63 including three fringe regions 64. $Y_0$ ($Y_{0,k}$) of each of the light emission pattern P55 to the light emission pattern P60 is as follows.

$Y_{0,1}$=−1.6 mm, $Y_{0,2}$=−0.8 mm, $Y_{0,3}$=0.0 mm
$Y_{0,4}$=0.8 mm, $Y_{0,5}$=1.6 mm, $Y_{0,6}$=2.4 mm.

In the system according to the present embodiment, as illustrated in FIG. 64, in the first periodic light emission pattern (light emission pattern P55), the conditional expression (44), the conditional expression (46), the conditional expression (48), and the conditional expression (49) are satisfied, and the oblique illumination from the negative side is achieved. In the fifth periodic light emission pattern (light emission pattern P59), the conditional expression (44), the conditional expression (45), the conditional expression (47), and the conditional expression (49) are satisfied, and the oblique illumination from the positive side is achieved. Thus, according to the present system also, similarly to the system of the embodiment described above, since the oblique illumination is achieved regardless of the observation position, it is possible to observe the sample in a large area of the container with high contrast. Further, similarly to the second embodiment, the control device 120 does not need to change the control content for each observation position, and it is possible to obtain an image with high contrast at an arbitrary observation position. Furthermore, according to the present system, adjustment for each observation position is unnecessary, which realizes high robustness.

Seventh Embodiment

Figure 65:
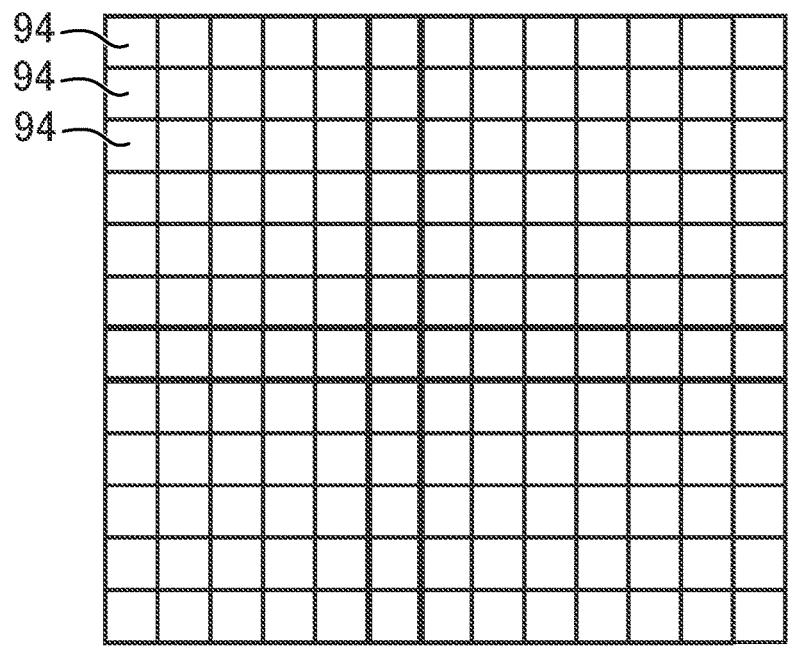
FIG. 65 is an explanatory view for the configuration of a fly-eye lens included in a light emitting unit of an observation device according to a seventh embodiment.

FIG. 65 is an explanatory view for the configuration of a fly-eye lens included in a light emitting unit of an observation device according to the present embodiment. The system according to the present embodiment (hereinafter, simply referred to as the present system) is different from the system according to the sixth embodiment in that the light emitting unit 80 of the observation device 5 includes a fly-eye lens 93 as illustrated in FIG. 65 instead of the lenticular lens 83, and the plurality of periodic light emission patterns switched by the control device 120 includes a plurality of first periodic light emission patterns and a plurality of second periodic light emission patterns.

The fly-eye lens 93 includes a plurality of lens elements 94 that are aligned in the first direction at the same intervals as the plurality of first fringe regions included in the first periodic light emission pattern and are aligned in the second direction at the same intervals as the plurality of second fringe regions included in the second periodic light emission pattern.

Figure 66:
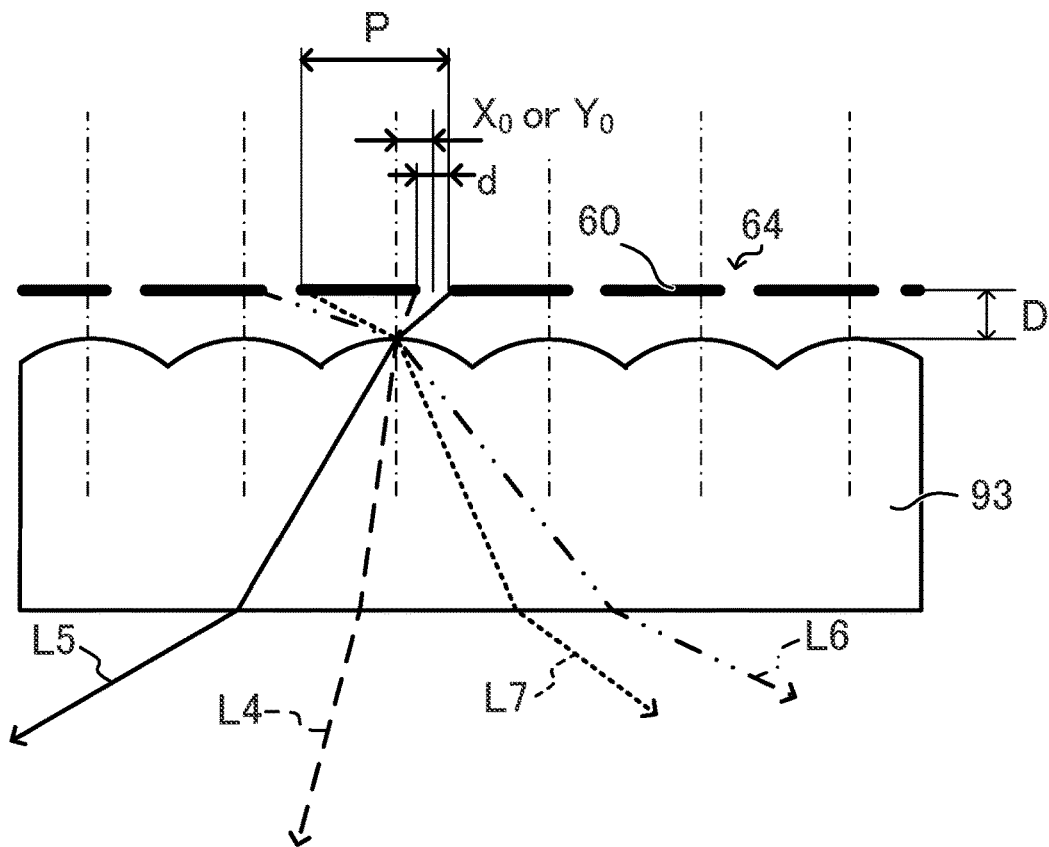
FIG. 66 is an explanatory view for parameters of a light emitting unit.

FIG. 66 is an explanatory view for parameters of a light emitting unit. Hereinafter, conditions that are desirably satisfied by the present system will be described with reference to FIG. 66.

First, the definition of parameters of the present system will be described. The present system is different from that of the sixth embodiment in that $X_0$ is also defined in addition to $Y_0$. $X_0$ and $Y_0$ represent a distance in the X direction between the curved surface central axis CX of the lens element 94 and the center of the fringe region, and a distance in the Y direction therebetween, respectively. $X_0$ is particularly referred to as $X_{0+}$ when positioned on the positive side with respect to the curved surface central axis CX, and is particularly referred to as $X_{0-}$ when positioned on the negative side with respect to the curved surface central axis CX. $Y_0$ is particularly referred to as $Y_{0+}$ when positioned on the positive side with respect to the curved surface central axis CX, and is particularly referred to as $Y_{0-}$ when positioned on the negative side with respect to the curved surface central axis CX.

In this case, an X coordinate $X_{ax,M}$ and a Y coordinate $Y_{ax,N}$ of the curved surface central axis CX of each lens element 94 of the fly-eye lens 93 and an effective range $X_{ef,M}$ in the X direction and an effective range $Y_{ef,N}$ in the Y direction of each lens element 94 of the fly-eye lens 93 are defined by the following formulas. Here, M and N are arbitrary integers. $X_{ax0}$ and $Y_{ax0}$ represent an X coordinate and a Y coordinate of the curved surface central axis CX of the reference lens element 94, respectively.

$$X_{ax,M}=MP+X_{ax0} \tag{50}$$

$$Y_{ax,N}=NP+Y_{ax0} \tag{51}$$

$$X_{ax,M}-P/2 < X_{ef,M} < X_{ax,M}+P/2 \tag{52}$$

$$Y_{ax,N}-P/2 < Y_{ef,N} < Y_{ax,N}+P/2 \tag{53}$$

For each of the case of applying the oblique illumination from the positive side and the case of applying the oblique illumination from the negative side, a range $X_{iLL,M}$ in the X direction of the M-th fringe region in the first periodic light emission pattern and a range $Y_{iLL,N}$ in the Y direction of the N-th fringe region in the second periodic light emission pattern are expressed by the following formulas.

(Oblique Illumination from Positive Side)

$$X_{ax,M}+X_{0+}-d/2 \le X_{ILL,M} \le X_{ax,M}+X_{0+}+d/2 \tag{54}$$

$$Y_{ax,N}+Y_{0+}-d/2 \le Y_{ILL,N} \le Y_{ax,N}+Y_{0+}+d/2 \tag{55}$$

(Oblique Illumination from Negative Side)

$$X_{ax,M}+X_{0+}-d/2 \le X_{ILL,M} \le X_{ax,M}+X_{0+}+d/2 \tag{56}$$

$$Y_{ax,N}+Y_{0-}-d/2 \le Y_{ILL,N} \le Y_{ax,N}+Y_{0-}+d/2 \tag{57}$$

It is desirable that the present system further satisfies the following conditional expression.

$$0 < d < P - \frac{D \cdot NA}{\sqrt{1-NA^2}} \tag{58}$$

$$\frac{D \cdot NA}{\sqrt{1-NA^2}} - \frac{d}{2} < X_{0+} < \frac{D \cdot NA}{\sqrt{1-NA^2}} + \frac{d}{2} \tag{59}$$

$$\frac{d}{2} < X_{0+} < P - \frac{D \cdot NA}{\sqrt{1-NA^2}} - \frac{d}{2} \tag{60}$$

$$\frac{-D \cdot NA}{\sqrt{1-NA^2}} - \frac{d}{2} < X_{0-} < \frac{-D \cdot NA}{\sqrt{1-NA^2}} + \frac{d}{2} \tag{61}$$

$$-P + \frac{D \cdot NA}{\sqrt{1-NA^2}} + \frac{d}{2} < X_{0-} < -\frac{d}{2} \tag{62}$$

$$\frac{D \cdot NA}{\sqrt{1-NA^2}} - \frac{d}{2} < Y_{0+} < \frac{D \cdot NA}{\sqrt{1-NA^2}} + \frac{d}{2} \tag{63}$$

$$\frac{d}{2} < Y_{0+} < P - \frac{D \cdot NA}{\sqrt{1-NA^2}} - \frac{d}{2} \tag{64}$$

$$\frac{-D \cdot NA}{\sqrt{1-NA^2}} - \frac{d}{2} < Y_{0-} < \frac{-D \cdot NA}{\sqrt{1-NA^2}} + \frac{d}{2} \tag{65}$$

$$-P + \frac{D \cdot NA}{\sqrt{1-NA^2}} + \frac{d}{2} < Y_{0-} < -\frac{d}{2} \tag{66}$$

$$0.5 < \frac{D}{F_l} \le 1 \tag{67}$$

Accordingly, by appropriately setting $Y_0$, it is possible to realize the oblique illumination while preventing the light from the adjacent fringe region from entering the pupil of the observation optical system 20. In a case where d exceeds the upper limit value, the illumination light from the adjacent fringe region enters the pupil of the observation optical system 20 even if the oblique illumination is achieved by the illumination light from the fringe region. Since the incident direction of the illumination light from the adjacent fringe region is opposite to the normal direction, the contrast of the image is reduced. In a case where d is less than the lower limit value, no illumination light is generated.

Conditional expressions (58) and (67) are the same as the above-described conditional expressions (44) and (49), and the same applies to the meanings thereof. $F_1$ represents the focal length of the fly-eye lens 93. Conditional expressions (59) to (62) for the X direction and the conditional expressions (63) to (66) for the Y direction correspond to the conditional expressions (45) to (48) described above, and the same applies to the meanings thereof.

FIGS. 67A to 67L are diagrams illustrating specific examples of a plurality of periodic light emission patterns. FIG. 68 is a table T14 illustrating applicability of a predetermined condition of a system in the first periodic light emission pattern. FIG. 69 is a table T15 illustrating applicability of a predetermined condition of a system in the second periodic light emission pattern.

Detailed parameters of the system according to the present embodiment are as follows. β represents a magnification of the observation optical system 20.

NA=0.25, β=2.2, H=70 mm, D=6 mm, P=4.8 mm, d=1 mm, R=5 mm, L=6 mm, n=1.493, $F_1$=1.014 mm.

As illustrated in FIGS. 67A to 67L, the system according to the present embodiment acquires an image while switching between 12 periodic light emission patterns (light emission pattern P61 to light emission pattern P72) at each observation position. The twelve periodic light emission patterns include six of the first periodic light emission patterns (light emission patterns P61 to P66) periodic in the X direction and six of the second periodic light emission patterns (light emission patterns P67 to P72) periodic in the Y direction. The first periodic light emission pattern has a light emitting region 63 including three fringe regions 64. The second periodic light emission pattern has a light emitting region 63 including six fringe regions 64. $X_0$ ($X_{0,k}$) of each of the light emission pattern P61 to the light emission pattern P66 is as follows. $Y_0$ ($Y_{0,k}$) of each of the light emission pattern P67 to the light emission pattern P72 is as follows.

$X_{0,1}$=−1.6 mm, $X_{0,2}$=−0.8 mm, $X_{0,3}$=0.0 mm
$X_{0,4}$=0.8 mm, $X_{0,5}$=1.6 mm, $X_{0,6}$=2.4 mm
$Y_{0,1}$=−1.6 mm, $Y_{0,2}$=−0.8 mm, $Y_{0,3}$=0.0 mm
$Y_{0,4}$=0.8 mm, $Y_{0,5}$=1.6 mm, $Y_{0,6}$=2.4 mm.

In the system according to the present embodiment, as illustrated in FIG. 68, in one of the first periodic light emission patterns which comes first (light emission pattern P61), the conditional expression (58), the conditional expression (61), the conditional expression (62), and the conditional expression (67) are satisfied, and the oblique illumination from the negative side is achieved. In one of the first periodic light emission patterns which comes fifth (light emission pattern P65), the conditional expression (58), the conditional expression (59), the conditional expression (60), and the conditional expression (67) are satisfied, and the oblique illumination from the positive side is achieved. In addition, in the system according to the present embodiment, as illustrated in FIG. 69, in one of the second periodic light emission patterns which comes first (light emission pattern P67), the conditional expression (58), the conditional expression (65), the conditional expression (66), and the conditional expression (67) are satisfied, and the oblique illumination from the negative side is achieved. In one of the second periodic light emission patterns which comes fifth (light emission pattern P71), the conditional expression (58), the conditional expression (63), the conditional expression (64), and the conditional expression (67) are satisfied, and the oblique illumination from the positive side is achieved. Thus, according to the present system also, similarly to the system of the embodiment described above, since the oblique illumination is achieved regardless of the observation position, it is possible to observe the sample in a large area of the container with high contrast. Further, similarly to the third embodiment, the control device 120 does not need to change the control content for each observation position, and it is possible to obtain an image with high contrast at an arbitrary observation position. Furthermore, according to the present system, adjustment for each observation position is unnecessary, which realizes high robustness.

The above-described embodiments are specific examples to facilitate an understanding of the invention, and hence the present invention is not limited to such embodiments. Modifications obtained by modifying the above-described embodiments and alternatives to the above-described embodiments may also be included. In other words, the constituent elements of each embodiment can be modified without departing from the spirit and scope of the embodiment. Moreover, new embodiments can be implemented by appropriately combining a plurality of constituent elements disclosed in one or more of the embodiments. Furthermore, some constituent elements may be omitted from the constituent elements in each embodiment, or some constituent elements may be added to the constituent elements in each embodiment. Further, the order of the processing procedure disclosed in each embodiment may be changed as long as no contradiction results. In other words, the observation system and the observation device of the present invention can be variously modified and changed without departing from the scope of the invention defined by the claims.

In the embodiments described above, the case where the observation device and the control device are separate devices has been exemplified, but the observation device and the control device may be configured as a single device. In other words, the observation device itself may operate as the control device, and may function as the control unit (controller) that performs the above-described light emission control and the image processing unit (image processor) that performs the image processing. In addition, the control device, which is a separate device from the observation device, may realize only one function of the control unit (controller) that performs the light emission control and the image processing unit (image processor) that performs the image processing, and the other function may be realized by the observation device. In other words, the observation device alone may operate as the above-described observation system.

Figure 70:
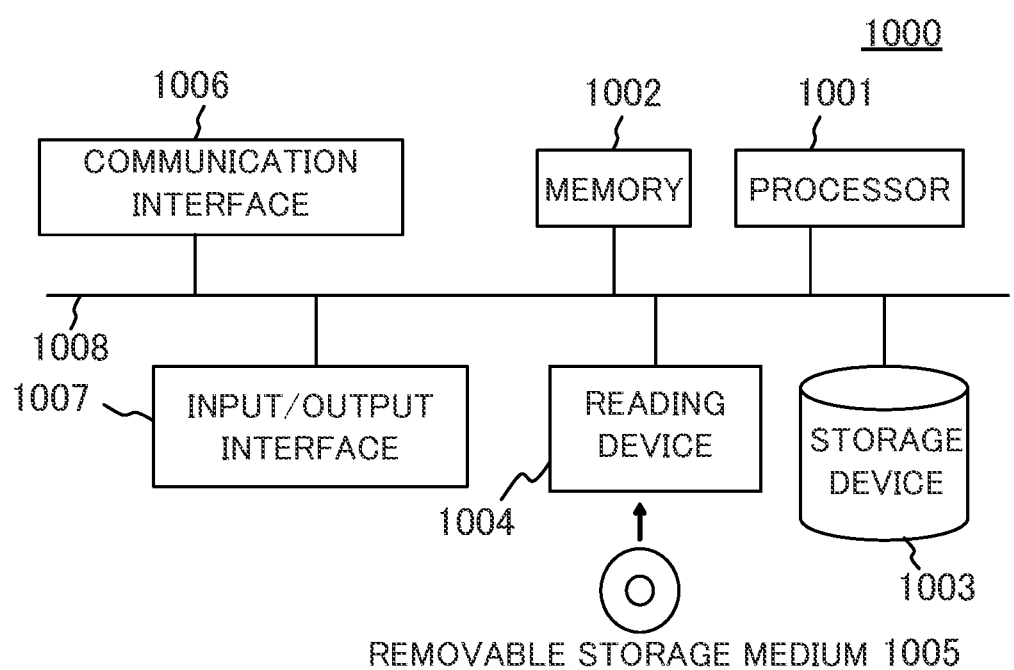
FIG. 70 is a diagram exemplifying the hardware configuration of a computer for implementing a control device.

FIG. 70 is a diagram exemplifying the hardware configuration of a computer for implementing a control device. The hardware configuration illustrated in FIG. 70 includes, for example, a processor 1001, a memory 1002, a storage device 1003, a reading device 1004, a communication interface 1006, and an input/output interface 1007. The processor 1001, the memory 1002, the storage device 1003, the reading device 1004, the communication interface 1006, and the input/output interface 1007 are connected to one another, for example, via a bus 1008.

The processor 1001 is any electric circuit. For example, the processor 1001 may be a single processor, a multiprocessor, or a multi-core processor. The processor 1001 reads out a program stored in the storage device 1003 and executes the program, to execute the above-described light emission control and image processing.

The memory 1002 is, for example, a semiconductor memory and may include a RAM area and a ROM area. The storage device 1003 is, for example, a hard disk, a semiconductor memory, such as a flash memory, or an external storage device.

For example, the reading device 1004 accesses a storage medium 1005, in accordance with an instruction from the processor 1001. For example, the storage medium 1005 is implemented by a semiconductor device, a medium to or from which information is input or output due to a magnetic effect, or a medium to or from which information is input or output due to an optical effect. Note that such a semiconductor device is, for example, a universal serial bus (USB) memory. Such a medium to and from which information is input and output by a magnetic effect is, for example, a magnetic disk. Such a medium to and from which information is input and output by an optical effect is, for example, a compact disc (CD)-ROM, a digital versatile disk (DVD), or a Blu-ray disc (Blu-ray is a registered trademark).

For example, the communication interface 1006 communicates with other devices, in accordance with an instruction from the processor 1001. The input/output interface 1007 is, for example, an interface between an input device and an output device. For example, the input device may be a device that receives an instruction from a user, such as a keyboard, a mouse, or a touch panel. The output device is, for example, a display device such as a display, or a sound device such as a speaker.

For example, the program that the processor 1001 executes is provided to the computer 1000 in the following forms:
(1) Installed in the storage device 1003 in advance
(2) Provided by the storage medium 1005.
(3) Provided from a server such as a program server Note that the hardware configuration of the computer 1000 for implementing the control device described with reference to FIG. 70 is exemplary and thus the embodiment is not limited thereto. For example, a part of the configuration described above may be omitted or a new configuration may be added to the configuration described above. In another embodiment, for example, some or all of the functions of the electric circuit described above may be implemented as hardware based on a field programmable gate array (FPGA), a system-on-a-chip (SoC), an application specific integrated circuit (ASIC) or a programmable logic device (PLD).

In the present specification, the expression "based on A" does not indicate "based on only A" but indicates "based on at least A" and further indicates "based partially on at least A". That is, "based on A" may indicate "based on B in addition to A" or "based on a part of A".

What is claimed is:
1. An observation comprising:
a mounting table on which a sample container is placed;
a surface light source disposed in one of two regions divided by the mounting table, the surface light source having a light emitting plane;
an observation optical system disposed in another one of the two regions;
a conveyance mechanism configured to move the observation optical system in a direction orthogonal to an optical axis of the observation optical system to change an observation position at which a bottom surface of a housing portion of the sample container and the optical axis intersect; and
a controller comprising hardware, the controller being configured to control a light emission pattern defined by a light emitting region where light is emitted on the light emitting plane,
wherein the controller executes:
first light emission pattern control in which the light emission pattern is changed according to the observation position, or, alternatively,
second light emission pattern control in which the light emission pattern is switched between a plurality of periodic light emission patterns having phases different from each other; and
the first light emission pattern control so as to change at least one of a position and a width of the light emitting region according to the observation position; and
in a case where a part of an end of the light emitting region closest to the optical axis is located in a positive region, a conditional expression for the light emitting region

$$0.2\ NA < S_{min} < 0.9\ NA \qquad (1)$$

is satisfied, and
in a case where the part of the end of the light emitting region closest to the optical axis is located in a negative region, a conditional expression for the light emitting region $$-0.9\ NA < S_{max} < -0.2\ NA \qquad (3)$$

is satisfied,
where $S_{min}$ represents a sine of an incident angle of illumination light from one end of the light emitting region to the observation position, $S_{max}$ represents a sine of an incident angle of illumination light from another end of the light emitting region located on a positive side with respect to the one end to the observation position, and NA represents a numerical aperture on an object side of the observation optical system.
2. The observation system according to claim 1, wherein in a case where the part of the end of the light emitting region closest to the optical axis is located in the positive region, a conditional expression for the light emitting region $$NA < S_{max} < 1 \qquad (2)$$

is satisfied, and
in a case where the part of the end of the light emitting region closest to the optical axis is located in the negative region, a conditional expression for the light emitting region $$-1 < S_{min} < -NA \qquad (4)$$

is satisfied.
3. An observation comprising:
a mounting table on which a sample container is placed;
a surface light source disposed in one of two regions divided by the mounting table, the surface light source having a light emitting plane;
an observation optical system disposed in another one of the two regions;

a conveyance mechanism configured to move the observation optical system in a direction orthogonal to an optical axis of the observation optical system to change an observation position at which a bottom surface of a housing portion of the sample container and the optical axis intersect; and a controller comprising hardware, the controller being configured to control a light emission pattern defined by a light emitting region where light is emitted on the light emitting plane, wherein the controller executes:
first light emission pattern control in which the light emission pattern is changed according to the observation position, or, alternatively,
second light emission pattern control in which the light emission pattern is switched between a plurality of periodic light emission patterns having phases different from each other;

wherein the light emitting region corresponding to each of the plurality of periodic light emission patterns includes a plurality of fringe regions aligned in a first direction at regular intervals, the controller executes the second light emission pattern control so as to sequentially switch the light emission pattern to the plurality of periodic light emission patterns; and conditional expressions $$\frac{2NA}{\sqrt{1-NA^2}} < \frac{P-d}{H} \qquad (9)$$

$$0 < \frac{|\delta|}{H} < \frac{NA}{\sqrt{1-NA^2}} \qquad (10)$$

are satisfied,
where NA represents a numerical aperture on an object side of the observation optical system, P represents a pitch of the plurality of fringe regions, d represents a width of each of the plurality of fringe regions, H represents an air-converted length of a distance between the light emitting plane and the observation position, and δ represents a distance on the light emitting plane corresponding to a phase difference between the plurality of periodic light emission patterns.

4. The observation system according to claim 3, wherein a conditional expression $$0 < \frac{d}{H} < \frac{NA}{\sqrt{1-NA^2}} \qquad (11)$$

is satisfied.

5. The observation system according to claim 4, wherein a conditional expression $$|\delta| = \frac{P}{N} \qquad (12)$$

is satisfied,
where N is an integer of 1 or more.

6. An observation comprising:
a mounting table on which a sample container is placed;
a surface light source disposed in one of two regions divided by the mounting table, the surface light source having a light emitting plane;
an observation optical system disposed in another one of the two regions;
a conveyance mechanism configured to move the observation optical system in a direction orthogonal to an optical axis of the observation optical system to change an observation position at which a bottom surface of a housing portion of the sample container and the optical axis intersect; and
a controller comprising hardware, the controller being configured to control a light emission pattern defined by a light emitting region where light is emitted on the light emitting plane,
wherein the controller executes:
first light emission pattern control in which the light emission pattern is changed according to the observation position, or, alternatively,
second light emission pattern control in which the light emission pattern is switched between a plurality of periodic light emission patterns having phases different from each other;
wherein the light emitting region corresponding to each of the plurality of periodic light emission patterns includes a plurality of fringe regions aligned in a first direction at regular intervals,
the controller executes the second light emission pattern control so as to sequentially switch the light emission pattern to the plurality of periodic light emission patterns; and
further comprising a lenticular lens that is disposed between the mounting table and the surface light source and is provided with a plurality of cylindrical lens elements aligned in the first direction at same intervals as the plurality of fringe regions.

7. The observation system according to claim 6, wherein conditional expressions $$0 < d < P - \frac{D \cdot NA}{\sqrt{1-NA^2}} \qquad (44)$$

$$0.5 < \frac{D}{F_l} \leq 1 \qquad (49)$$

are satisfied,
where NA represents a numerical aperture on an object side of the observation optical system, P represents a pitch of the plurality of fringe regions, d represents a width of each of the plurality of fringe regions, D represents an air-converted length of a distance between the light emitting plane and the lenticular lens, and $F_l$ represents a focal length of the lenticular lens.

* * * * *